(12) United States Patent
Ohtomo et al.

(10) Patent No.: US 7,022,962 B2
(45) Date of Patent: Apr. 4, 2006

(54) POSITION DETERMINING APPARATUS

(75) Inventors: Fumio Ohtomo, Tokyo (JP); Kunihiro Hayashi, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 339 days.

(21) Appl. No.: 10/338,705

(22) Filed: Jan. 9, 2003

(65) Prior Publication Data

US 2003/0136901 A1 Jul. 24, 2003

(30) Foreign Application Priority Data

Jan. 21, 2002 (JP) ............................. 2002-011679

(51) Int. Cl.
*G01B 11/26* (2006.01)

(52) U.S. Cl. ................. 250/206.1; 356/141.1
(58) Field of Classification Search ............ 250/206.1, 250/206.2; 356/139.1, 139.07, 141.1, 141.3, 356/152.1, 152.2
See application file for complete search history.

(56) References Cited

U.S. PATENT DOCUMENTS

| 4,218,138 A | * | 8/1980 | Robertsson | ............... 356/141.1 |
| 4,218,834 A | * | 8/1980 | Robertsson | .................. 434/21 |
| 5,100,229 A | | 3/1992 | Lundberg et al. | |
| 5,294,970 A | | 3/1994 | Dornbusch et al. | |
| 6,286,607 B1 | * | 9/2001 | Ohtomo et al. | ............... 172/4.5 |
| 6,756,581 B1 | * | 6/2004 | Ohtomo et al. | ........ 250/231.13 |
| 2002/0033940 A1 | * | 3/2002 | Hedges et al. | ............ 356/141.4 |
| 2002/0057426 A1 | * | 5/2002 | Ohtomo et al. | ........... 356/141.4 |

FOREIGN PATENT DOCUMENTS

| DE | 199 41 030 C1 | 4/2001 |
| EP | 1 174 682 A2 | 1/2002 |
| JP | 09292218 A | 11/1997 |

* cited by examiner

*Primary Examiner*—Stephone B. Allen
(74) *Attorney, Agent, or Firm*—Jacobson Holman PLLC

(57) ABSTRACT

The present invention provides a position determining apparatus that has a simplified configuration adapted to produce a horizontal reference plane and an inclined reference plane simultaneously. A position determining apparatus (100) according to the present invention comprises a rotary laser apparatus (151) that emits at least two fan-shaped laser beams diverting in a plane other than horizontal plane while rotating the laser beams about a given optical axis, and an optical sensor (154) that has at least one light receiving section receiving the fan-shaped laser beams. One of the fan-shaped laser beams is different in inclination angle from the other, and in terms of a state of the laser beams received at the light receiving section, a relative position of the optical sensor to the rotary laser apparatus can be determined.

9 Claims, 38 Drawing Sheets

POSITION DETERMINING APPARATUS

BACKGROUND OF THE INVENTION

1. Field of the Invention

The present invention relates to a position determining apparatus that reciprocally moves or rotates a laser source emitting laser beam to produce an inclined plane meeting a horizontal reference plane at a certain inclination angle, and a rotary laser apparatus used with the same. The position determining apparatus according to the present invention is useful to produce a reference point, a reference line, and a measurement reference plane.

2. Prior Art

In order to produce a horizontal reference level that covers a wide range, a rotary laser apparatus has been increasingly replaced with an optical leveling apparatus.

For recent years, the rotary laser apparatus has been used to determine an elevation in relation with some directions, especially, to produce line, plane, and so forth based upon a reference elevation. The rotary laser apparatus emits horizontal laser beam while having the laser beam circularly or reciprocally sweep and then interrupt, so as to produce a rotation reference plane, a partial reference line, a reference plane, a reference line, a reference point, or the like.

The rotary laser apparatus is suitable for applications where it is used to produce a reference horizontal line based on which an area is designated in reserve for a window frame of a building under construction and where it is used to build a mount and produce a reference horizontal plane based on which the mount is cut and sectioned to create exposed faces of soil. In another application, the rotary laser apparatus is used to predetermine reference points to build inclined structures such as stairs, and in some other application, the rotary laser apparatus can produce reference plane inclined in one direction or even in two directions.

An example of the prior art rotary laser apparatus, which is capable of creating inclined reference plane, is disclosed in Japanese Patent Laid-Open No. H06-26861. Configuration and features of the prior art rotary laser apparatus will be outlined below.

Referring to FIG. 44, a rotary laser apparatus 951 has a casing 901 and a laser projector 903. The casing 901 has its upper center portion provided with a recessed portion 902 shaped in a frustum of a cone. The laser projector 903 vertically extends through the center of the recessed portion 902. The laser projector 903 supported by the recessed portion 902 can be tilted on and around a spherical mount 904 formed in the middle thereof. A rotary unit 905 provided with a pentaprism 909 is mounted in an upper portion of the laser projector 903. The rotary unit 905 is rotated through a drive gear 907 and a sweep gear 908 powered by a sweep motor 906.

Two units of inclination mechanism (only one of them is illustrated) are attached around the laser projector 903. Either of the units 910 of the inclination mechanism includes a motor 911, a screw 912, and a nut 913 that are all cooperatively work to make inclination. The motor 911 is capable of turning the screw 912 through a drive gear 914 and a tilting gear 915. The laser light projector 903 is coupled to the nut 913 with the arm 916 intervening between them. Turns of the screw 912 cause the nut 913 to move up and down, which brings about inclination of the laser light projector 903.

Two fixed sensors 918 and 919 are positioned in the middle of the laser light projector 903 in the same plane orthogonal to a rotation axis of the rotary unit 905. One of the fixed sensors, the sensor 918, is positioned in parallel with the tilting arm 916 while the other, the sensor 919, is oriented orthogonal to the tilting arm 916. A flange 920 having a pivot pin 921 is fixed to a lower end of the laser projector 903. An upper end of the pivot pin 921 pivotally supports an L-shaped tilting plate 922 at one point thereon, and an angle-determining sensor 929 and an angle-determining sensor 930 are incorporated in the L-shaped tilting plate 922. The angle-determining sensor 929 is positioned in the same direction as the fixed sensor 918 while the angle-determining sensor 930 is positioned in the same direction as the fixed sensor 919. The tilting plate 922 is connected to a couple of units of inclining mechanism (only one unit is shown).

Each of the units 925 of inclining mechanism includes a motor 926, a screw 927 rotated by the motor 926, and a nut block 928 through which the tilting screw 927 is screwed down, all of these components being cooperative to make the reference to inclination. One end of the tilting plate 922 is fitted on the nut block 928. The motor 926 is actuated to rotate the screw 927 and vertically move the nut block 928, and thus, the tilting plate 922 can be inclined.

A laser illuminator (not shown) and a projector optical system (not shown) including optics such as a collimator lens that refracts incident rays from the laser illuminator into parallel rays are built in the laser projector 903. Laser beam emitted from the projector optical system is deflected in horizontal direction by the pentaprism 909 and projected out of a projector window 931.

Functional features of the rotary laser apparatus will now be described. Determination of an inclination angle is carried out by the inclining mechanism 925. First, the inclination mechanism 910 is actuated to regulate postures of the fixed sensors 918 and 919 so that both of the sensors indicate they are horizontal. The motor 926 is then actuated to rotate the screw 927 and lift the nut block 928, and consequently, the tilting plate 922 is inclined at an angle θ relative to the flange 920 in a reverse angular direction to the desired predetermined angle θ. The inclination angle θ is detected by a component such as an encoder (not shown) linked to the motor 926.

Then, the inclination mechanism 910 is actuated to tilt the laser projector 903 so that the tilting plate 922 is detected as being horizontal. At this posture, an emission direction of light from the laser projector 903 inclines at the predetermined angle θ relative to the horizontal plane. After the inclination angle in the emission direction of the laser light is determined, the laser beam deflected at the pentaprism 909 in a direction orthogonal to the rotation axis of the rotary unit 905 is projected through the laser projector 903 while the rotary unit 905 is being rotated or the rotary unit 905 is reciprocally sweeping within a range equivalent to the predetermined angle, so as to create an inclined reference plane.

Japanese Patent Laid-Open No. H11-94544 discloses a post-construction elevation display apparatus and a post-construction elevation determining apparatus both of which are comprised of a laser device rotating simultaneous with irradiating laser beam and a finished elevation display. The post-construction elevation determining apparatus can determine a desired post-construction elevation by using the post-construction elevation display to receive laser beam irradiated by the laser device so as to detect a distance from the laser device to the display device and a deviation between the display device and a reference horizontal plane against which the laser beam is directed.

Furthermore, Japanese Patent Laid-Open No. H11-118487 discloses a reference irradiated beam detecting apparatus incorporated with an inclination angle sensor, which is used in combination with a laser apparatus.

Additionally, Japanese Patent Laid-Open No. H7-208990 discloses a 3-dimensional coordinate determining apparatus including an irradiating means rotating and irradiating a plurality of plane beams and more than one reflecting means. The 3D coordinate determining means uses the plurality of reflecting means to reflect light emitted from the irradiating means and uses the irradiated means to receive the reflected beams to determine 3-dimensional coordinates in relation with the reflecting means.

The prior art rotary laser device as in the above statement must have two pairs of units of inclining mechanism which support the laser projector 903 in a manner where the laser projector can have a full freedom of tilting in two ways, in order to produce inclined reference planes. Such a prior art embodiment is disadvantageous in that it needs two of the fixed sensors 918 and 919 and two of the tilting sensors 929 and 930 and in that it requires a complicated configuration, i.e., it needs a control circuit to control an actuation of two of the pairs of the units of inclining mechanism, which results in an increased manufacturing cost. Moreover, the prior art rotary laser device disadvantageously produces only one reference plane but can never produce horizontal and inclined reference planes simultaneously, which disturbs determining a relative relation between the horizontal and inclined reference planes, or which disturbs determining a relative relation between two inclined reference planes different in inclination angle from each other.

The prior art embodiment of the 3-dimensional coordinate determining device as disclosed in Japanese Patent Laid-Open No. H7-208990 should be further improved by accurately regulating an angular position of the reflecting means so as to return beams reflected from the reflecting means to the irradiating means assuredly. Additionally, the reflecting means must be moved in producing the predetermined reference plane, and a determination value also must be monitored at the irradiation means, which disadvantageously results in requesting more than one operators to dedicate themselves in handling the device.

In order to overcome the aforementioned disadvantage, the present invention provides an improvement of a rotary laser apparatus that permits a simultaneous determination of an inclined plane and a horizontal reference plane at any elevation without tilting a laser projector and without precisely positioning a light receiving section.

Accordingly, it is an object of the present invention to provide a position determining apparatus of a simplified mechanism that is capable of producing a horizontal reference plane and an inclined plane simultaneously.

It is another object of the present invention to provide a position determining system of simplified manipulation which permits a single operator to work sufficiently.

It is still another object of the present invention to provide a rotary laser apparatus that is capable of emitting a fans-shaped laser beam diverging in a plane other than horizontal plane.

In an aspect of the present invention, a position determining apparatus is comprised of a rotary laser apparatus that emits two or more fan-shaped laser beams while rotating the laser beams about a given axis, and an optical sensor that has one or more light receiving sections receiving the fan-shaped laser beams, where the two or more fan-shaped laser beams diverge in a plane other than horizontal plane. At least one of the fan-shaped laser beams is different in inclination angle from the remaining beams, and the optical sensor determines a relative position of itself to the rotary laser apparatus, relying upon a state of the fan-shaped laser beams received at the light receiving section. At least two of the fan-shaped laser beams preferably intersect each other in the horizontal plane. Preferably, the optical sensor determines the relative position of itself to the rotary laser apparatus, depending upon a delay of time between detections of two of the fan-shaped laser beams at the light receiving section, and also preferably, the optical sensor includes two ore more light receiving sections that receives the fan-shaped laser beams.

In another aspect of the present invention, the position determining apparatus has a rotary laser apparatus that emits two of the fan-shaped laser beams different in polarization from each other. Preferably, two of the fan-shaped laser beams are modulated into different frequencies from each other, and also preferably, two of the fan-shaped laser beams are of different wavelengths from each other. With the rotary laser apparatus configured in this fashion, two of the fan-shaped laser beams can be distinguished from each other, and a measurement can be attained with accuracy in the event of short delay of time between detections of the laser beams.

In still another aspect of the present invention, the rotary laser apparatus in the position determining apparatus includes a detector means for detecting emission directions of the fan-shaped laser beams and a transmitter for transferring angular data detected by the detector means to the optical sensor, and alternatively, the optical sensor may include a receiver unit that receives signals of the angular data.

Moreover, in the position determining apparatus according to the present invention, the optical sensor may have a position sensor that detects a relative position of the rotary laser apparatus to the optical sensor. Preferably, the position sensor is a GPS. With the position determining apparatus configured in this manner, the relative position of the optical sensor to the rotary laser apparatus in the horizontal plane can be determined.

Furthermore, each of the fan-shaped laser beams may be varied in intensity from one part to another. Preferably, the rotary laser apparatus emits three or more of the fan-shaped laser beams which intersect the horizontal plane equidistant from one another. With the position determining apparatus configured in this way, influence on a measurement due to a rotation error of the rotary laser apparatus can be minimized.

It is preferable that three or more of the fan-shaped laser beams do not intersect one another within a range where they are to be optically sensed. In this manner, the fan-shaped laser beams are sensed at a certain delay of time from one another, and hence, interference among the fan-shaped beams can be avoided. Thus, a measurement can be attained with accuracy without polarizing the laser beams differently or without modulating them into different frequencies from one another.

DETAILED DESCRIPTION OF THE PREFERRED EMBODIMENTS

A position determining apparatus according to the present invention will be described in detail in conjunction with the accompanying drawings.

(1) Embodiment 1

(1.1) Entire Structure of Position Determining Apparatus

Figure 1:
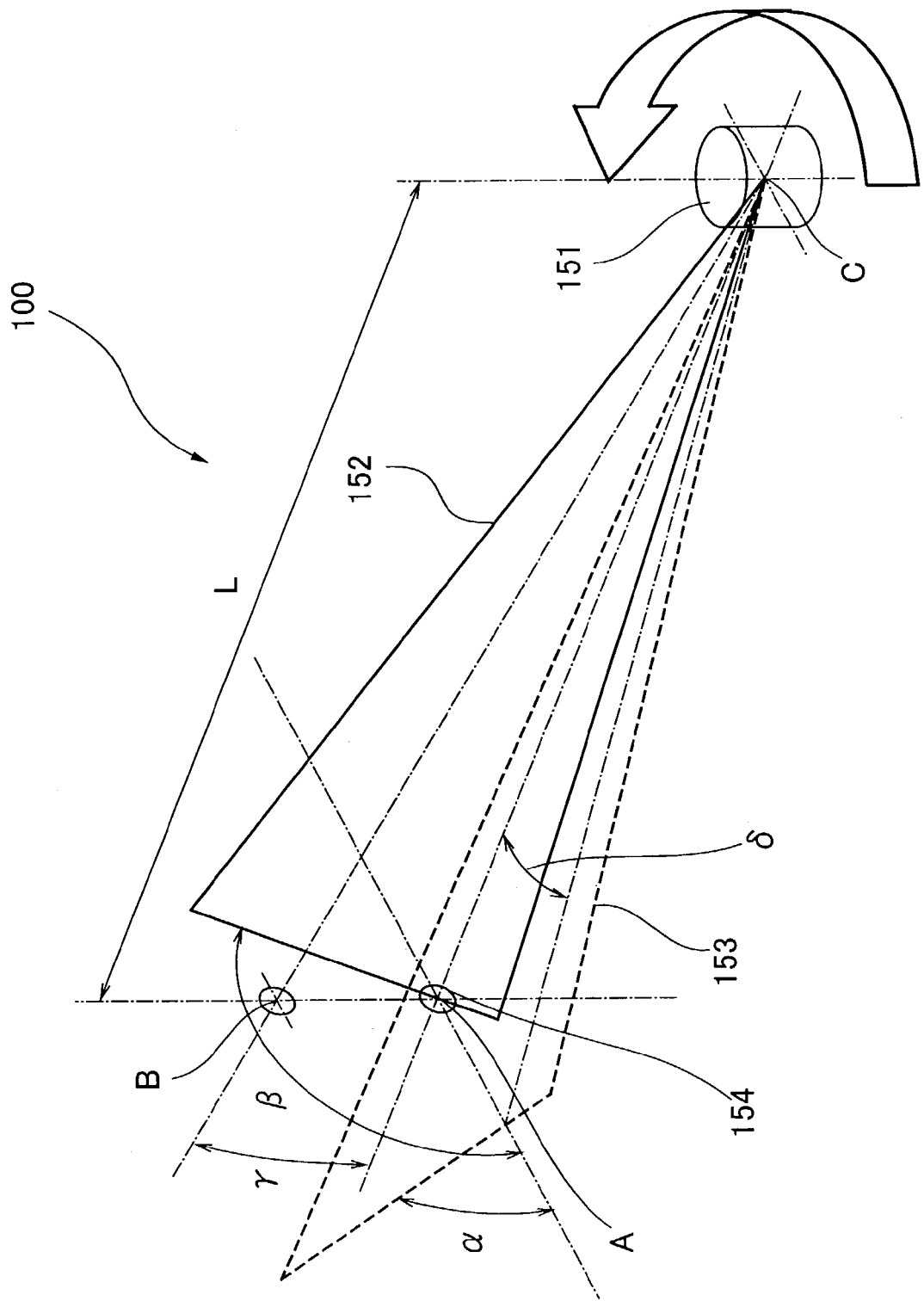
FIG. 1 is a schematic perspective diagram showing a position determining apparatus according to the present invention.
Figure 2:
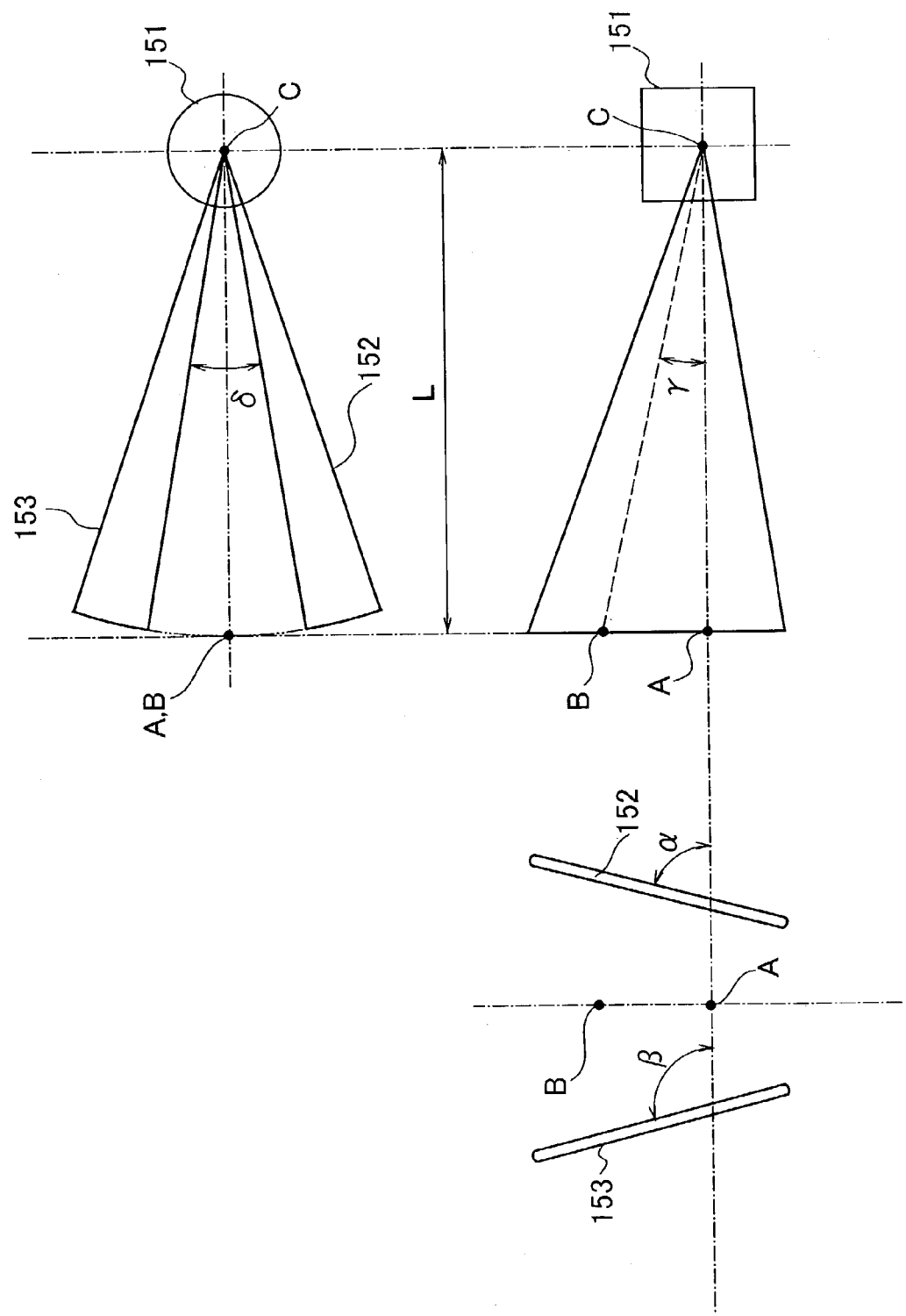
FIG. 2 is a three-fold exploded view illustrating divergence of fan-shaped beam emitted from the rotary laser apparatus.

An outline of a structure of the position determining apparatus of the present invention will first be described. As shown in FIG. 1, a position determining apparatus 100 of the present invention has a rotary laser apparatus 151 and an optical sensor 154. The rotary laser apparatus 151 emits two fan-shaped beams 152 and 153, namely, laser beams diverging into fan-like plane, while rotating the beams about a point C. As shown in FIG. 2, the fan-shaped beam 152 is emitted at an angle a from the horizontal plane while the fan-shaped beam 153 is emitted at an angle β from the horizontal plane. An intersection of the fan-shaped beam 152 with the horizontal plane and an intersection of the fan-shaped beam 153 with the same meet at an angle δ. The two fan-shaped beams 152 and 153, keeping such mutual relations, revolve respectively, and then respectively sweep the optical sensor 154 at a certain delay of time. The position determining apparatus of the present invention is designed to use the delay to determine an elevation angle toward the optical sensor 154 from the horizontal plane.

(1.2) Rotary Laser Apparatus (1.2.1) Rotary Laser Apparatus Emitting Two Fan-Shaped Laser Beams Discussed now will be the rotary laser apparatus that emits two fan-shaped laser beams inclined at angle to the horizontal plane while rotating the laser beams about a vertical axis.

Figure 3:
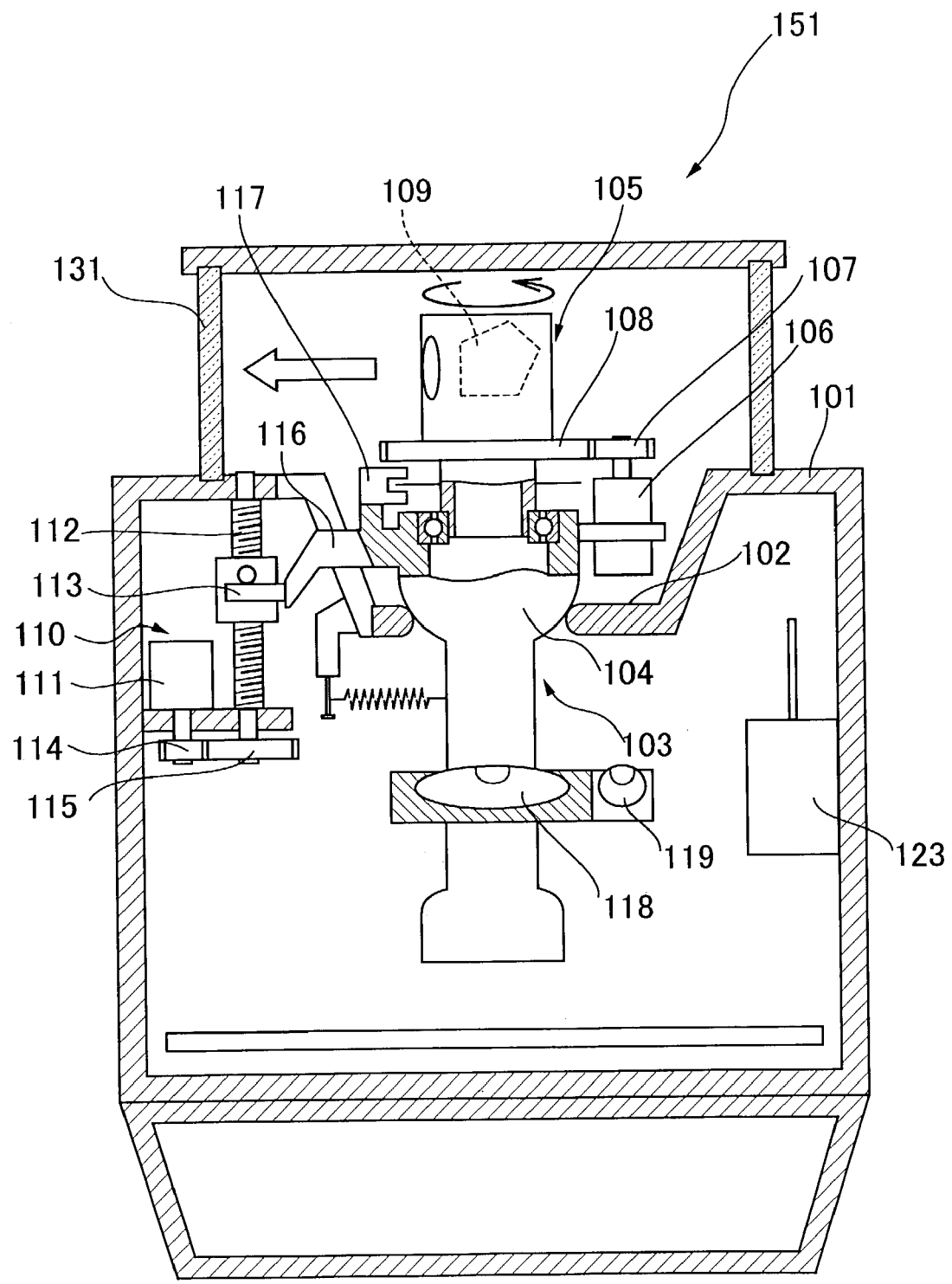
FIG. 3 is a sectional view showing the rotary laser apparatus.

As shown in FIG. 3, the rotary laser apparatus 151 according to the present invention includes a casing 101 and a laser light projector 103. A concavity 102 defined in a shape of truncated cone is provided in the center of a top of the casing 101. The laser light projector 103 extends vertically through the center of the concavity 102. The laser light projector 103 is provided with a spherical mount 104 seated and hung on the concavity 102 so that the projector 103 can tilt itself. The laser light projector 103 includes a rotary unit 105 capable of revolving and having a pentaprism 109. The rotary unit 105 is revolved through a drive gear 107 and a sweep gear 108 actuated by a motor 106.

The rotary laser device 151 has two pairs of units of inclination mechanism (only one of the pairs is illustrated) that are attached around the laser projector 103. Either of the units 110 of the inclination mechanism includes a motor 111, a screw 112, and a nut 113 that are all cooperative to make inclination. The screw 112 is rotated through a driving gear 114 and a tilting gear 115 both powered by the motor 111. Turns of the screw 112 permits the nut 113 to move up and down. The nut 113 is coupled to the laser projector 103 by a tilting arm 116 intervening therebetween. Vertical movement of the nut 113, in turn, causes the laser projector 103 to tilt. The other of the pairs not shown in the drawing uses a similar manner to the above-mentioned one of the units 110 and tilts the projector 103 in a direction perpendicular to the inclination direction of the above-mentioned unit 110.

A fixed sensor 118 in parallel with the tilting arm 116 and a fixed sensor 119 orthogonal to the tilting arm 116 are located in the middle of the laser projector 103. One of the units 110 of the inclination mechanism controls a tilt of the tilting arm 116 to always keep the fixed sensor 118 in horizontal orientation. Similarly, at the same time, the other of the units 110 can control the fixed sensor 119 to permanently keep its horizontal orientation.

The laser projector 103 and the rotary unit 105 will now be described. As will be recognized in FIG. 4, a laser illuminator 132 and a projector optical system including optics such as a collimator lens 133 that refracts incident rays from the laser illuminator 132 into parallel rays are built in the laser projector 103. Laser beam emitted from the projector optical system is split into two diverging or fan-shaped beams 152 and 153 by a diffraction grating (BOE) 134 in the rotary unit 105. The fan-shaped beams 152 and 153 are respectively deflected in a horizontal direction by a pentaprism 109 and projected out of a projector window 131.

Figure 4:
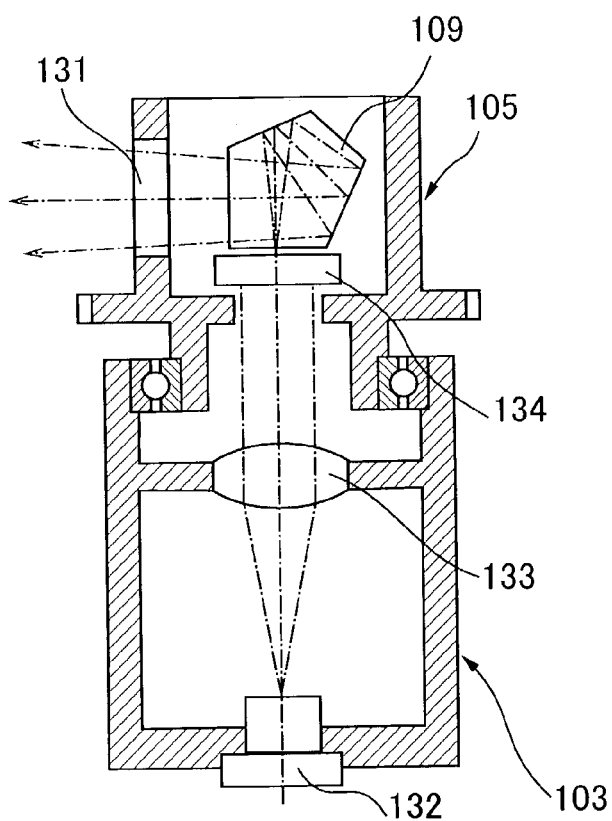
FIG. 4 depicts another embodiment of the rotary laser apparatus.
Figure 5:
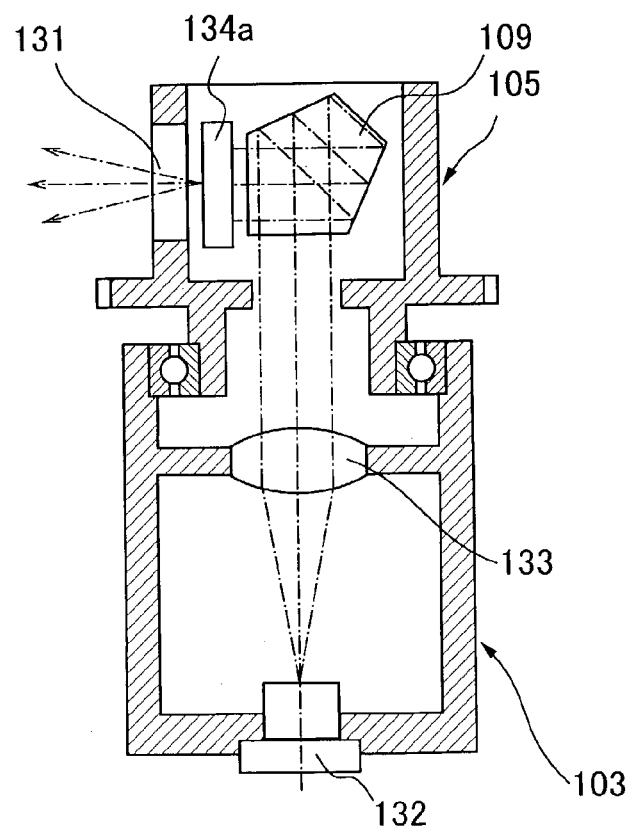
FIG. 5 depicts still another embodiment of the rotary laser apparatus.

As shown in FIG. 5, a diffraction grating (BOE) 134a may be placed in a position at which laser beam is transmitted after being deflected by the pentaprism 109. Such a configuration as depicted in FIG. 5 is identical that depicted in FIG. 4 except for a location of the diffraction grating 134a.

Figure 6:
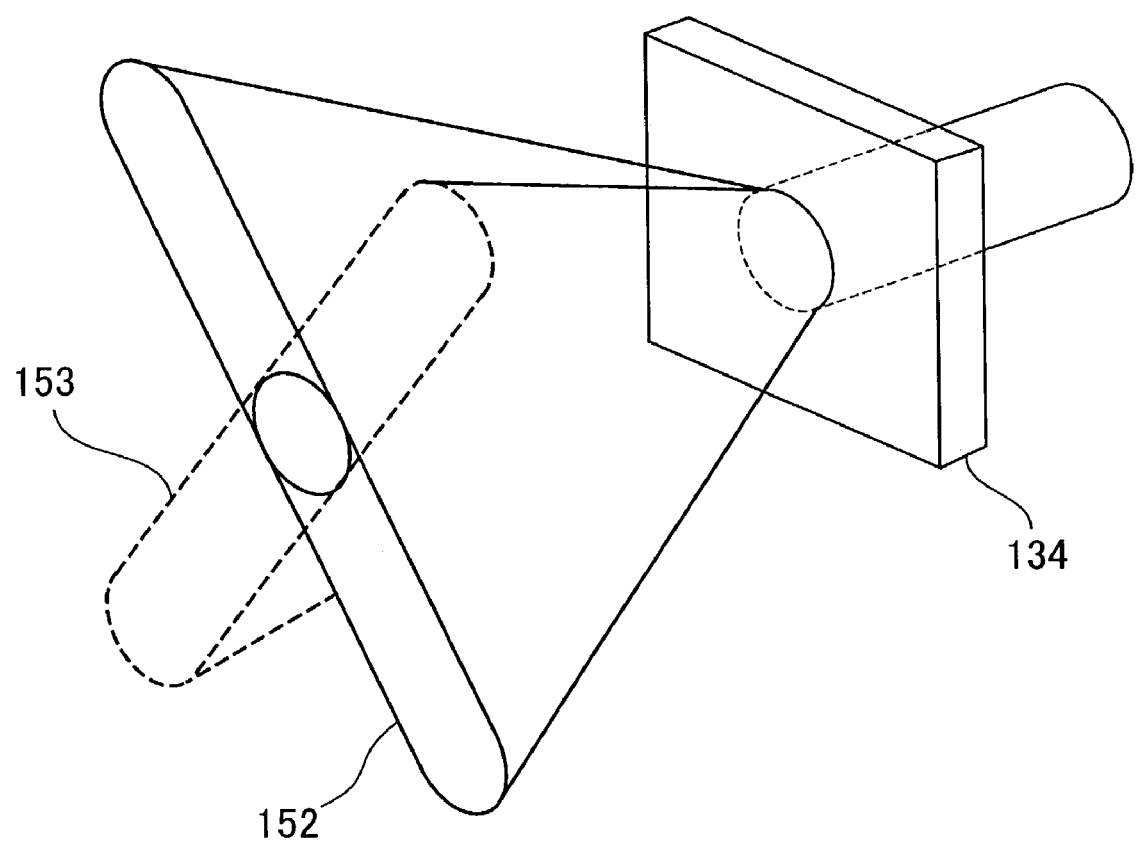
FIG. 6 illustrates a diffraction grating transmits and spreads laser beam into diverging fan-shaped beam in the rotary laser apparatus.

As can be seen in FIG. 6, the laser beam, after transmitted by the diffraction grating (BOE) 134, is split into the two fan-shaped beams 152 and 153.

As has been stated, the laser projector 103 irradiates laser beams that are originally emitted from the laser illuminator 132 and then split into the three diverging fan-shaped beams 152 and 153 by the diffraction grating (BOE) 134. The laser beams are respectively deflected in a horizontal direction by the pentaprism 109 while the rotary unit 105 is being rotated, so as to produce a reference plane.

(1.2.2) Rotary Laser Apparatus Emitting Two Diverging Laser Beams of Varied Polarizations from One Another Described below will be the rotary laser apparatus that emits two fan-shaped laser beams of different polarizations.

Figure 7:
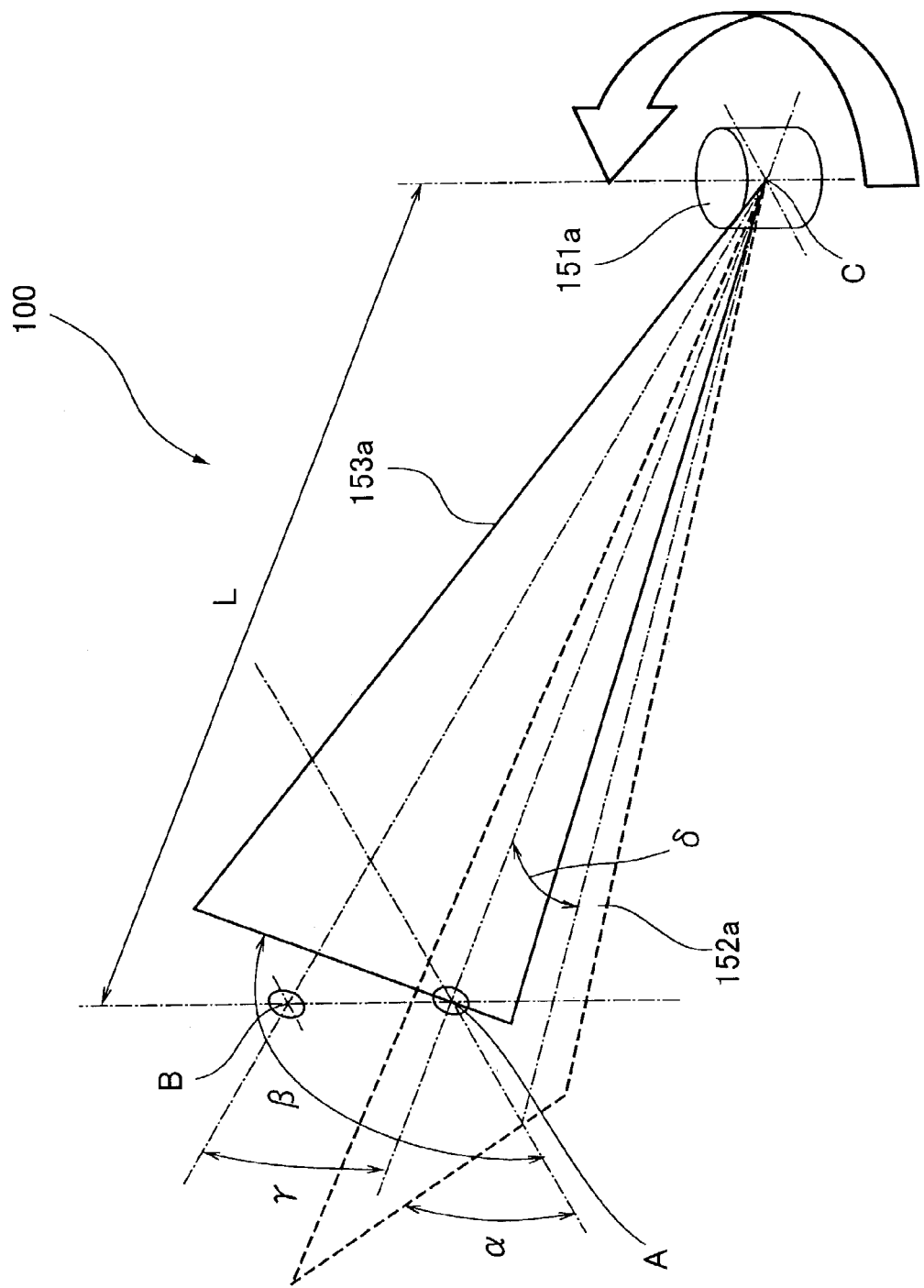
FIG. 7 is a schematic perspective view showing the position determining apparatus according to the present invention where two fan-shaped beams of different polarizations are emitted.

As detailed later, to obtain measurements with accuracy, it is advantageous to use the rotary laser apparatus that emits two fan-shaped laser beams of different polarizations. As can be seen in FIG. 7, a rotary laser apparatus 151a emits two diverging or fan-shaped laser beams 152a and 153a. Since the two beams 152a and 153a are polarized different from each other, the light receiving section of an optical sensor 154a can distinguish the two fan-shaped beams 152a and 153a one from the other.

Figure 8:
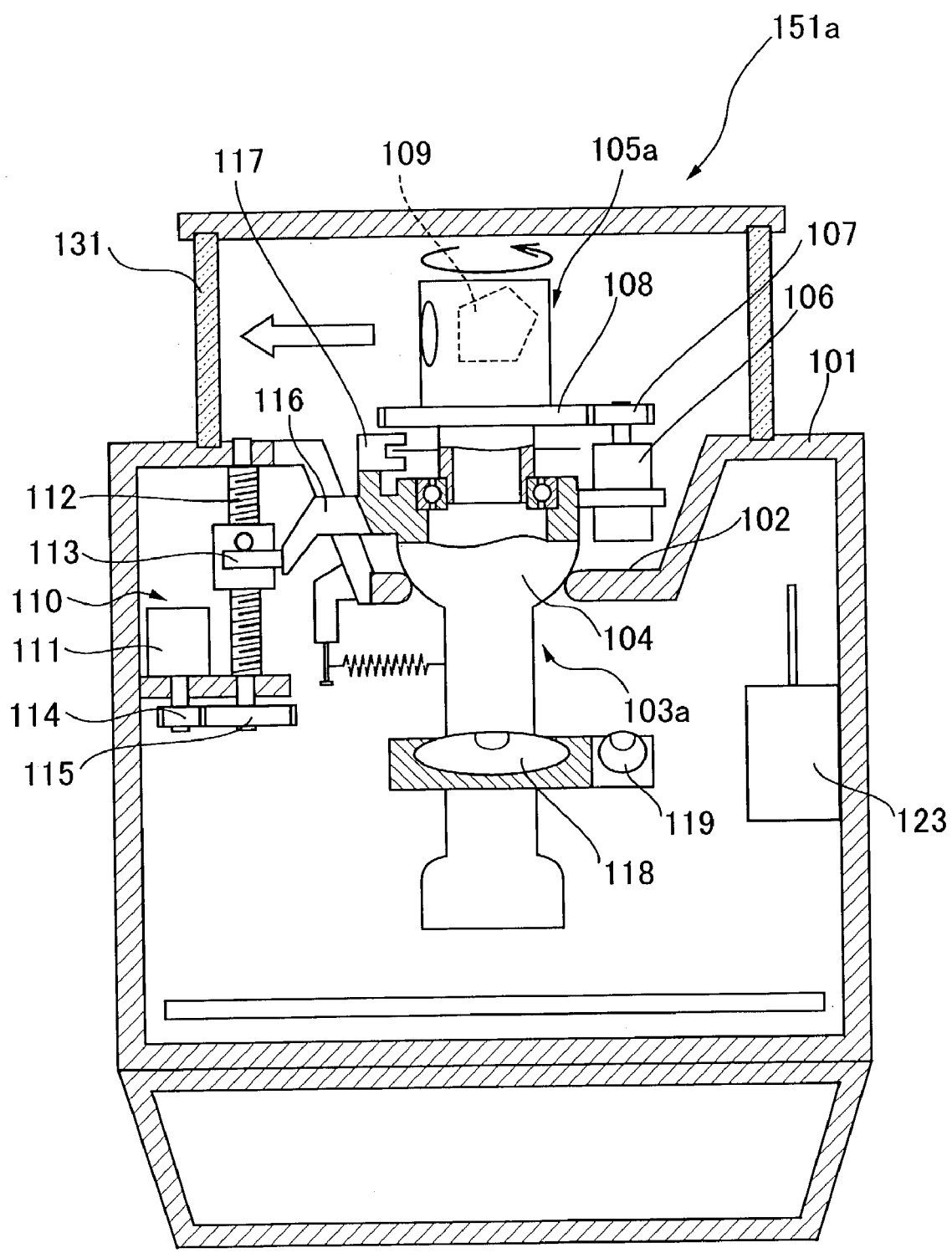
FIG. 8 is a sectional view showing the rotary laser apparatus that emits fan-shaped beams of different polarizations.

As shown in FIG. 8, a mechanism inclining the laser projector is almost similar to that in FIG. 4 except for a laser beam projector 103 built in the rotary laser apparatus 151a and a rotary unit 105a attached thereto. Thus, in the following discussion, only the laser projector 103a and the rotary unit 105a are explained.

Figure 9:
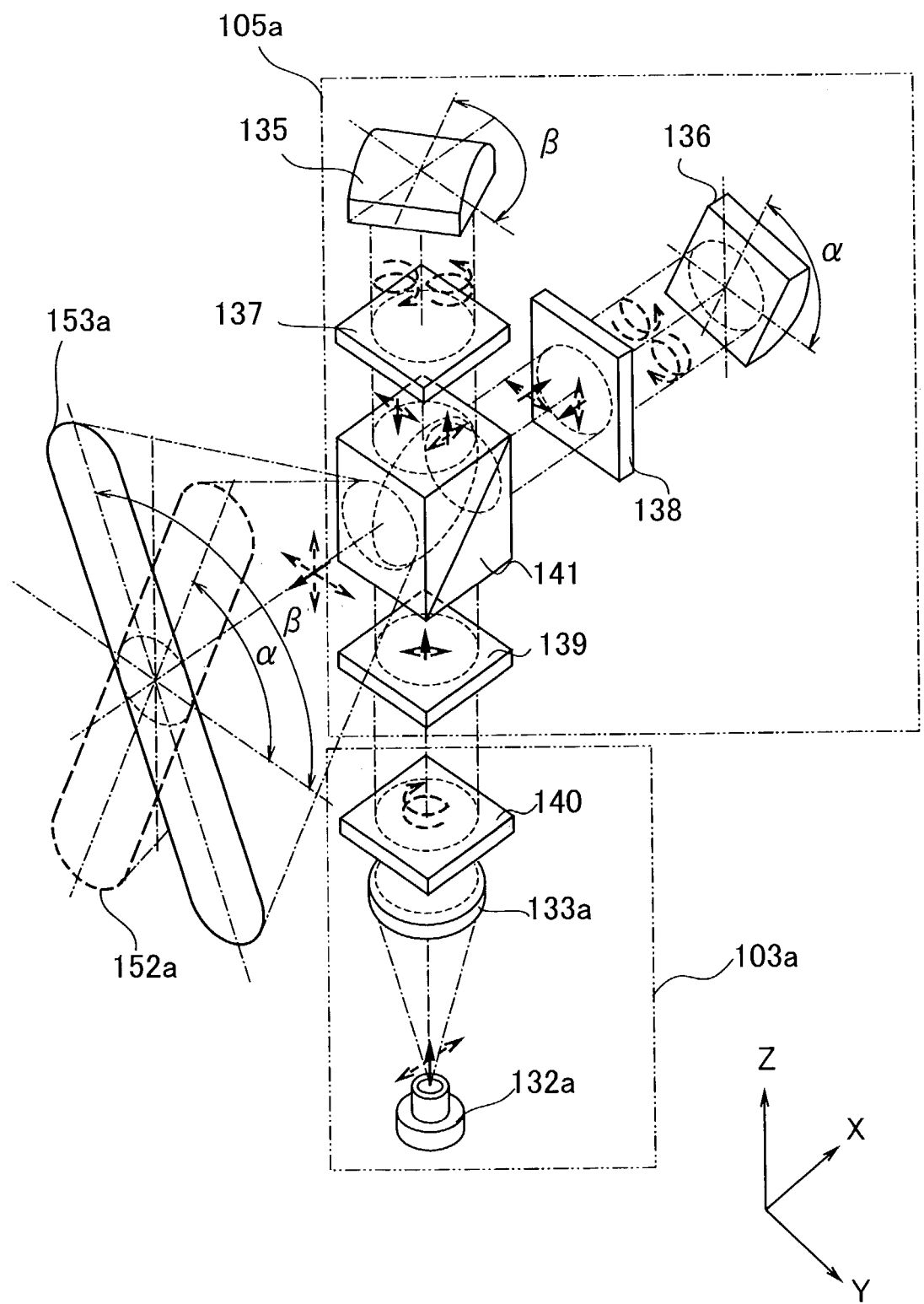
FIG. 9 is an exploded view of a laser light projector, a laser illuminator, and a rotary unit.

As can be seen in FIG. 9, the rotary laser apparatus 151a, which emits the fan-shaped laser beams 152a and 153a of different polarizations, includes the laser projector 103a and the rotary unit 105a. Trajectories of the laser beams transmitted through the optical devices are denoted by arrows and solid line while directions of polarization of the laser beams are designated by arrows and broken line.

When a laser illuminator 132a incorporated in the laser projector 103a is a laser diode, generated laser beam assumes linear polarization. Hereinafter, it is assumed that the laser beam is deflected in an X-direction, the laser beam is emitted in a Z-direction, and a direction orthogonal to an X-Z plane is a Y-direction. The laser beam emitted from the laser illuminator 132a is collimated by a collimator lens 133a and falls upon a one-quarter (¼) wave plate 140. The one-quarter wave plate 140 is oriented so that the laser beam from the laser illuminator 132a, after linearly polarized in the X-direction, turns to circularly polarized light. The laser beam, after passing the one-quarter wave plate 140, is transmitted through another one-quarter wave plate 139 again, and then, it is linear polarized in a direction meeting an axis in the X-direction at an angle of 45°, as shown in FIG. 9. Since the rotary unit 105a is rotatably supported, a relative position of the one-quarter wave plate 140 to the one-quarter wave plate 139 is varied. However, the laser beam after being passed through the one-quarter wave plate 140 assumes circular polarization, and hence, a deflection direction of the linearly polarized light after passing the one-quarter wave plate 139 again is not affected by a variation in the relative position of the wave plates but is determined by the one-quarter wave plate 139. The laser beam passes a polarized beam splitter 141. The polarized beam splitter 141 reflects polarization components in the Y-direction while transmitting polarization components in the X-direction. Thus, the Y-direction components of the laser beam that are linearly polarized in a direction meeting an axis in the X-direction at an angle of 45° by the one-quarter wave plate 139 are reflected by the polarized beam splitter 141 and deflected by 90°. The X-direction components of the laser beam are passed through the polarized beam splitter 141.

The laser beam reflected by the polarized beam splitter 141 falls upon an additional one-quarter wave plate 138 to turn to circularly polarized light, and then it is reflected by a cylinder mirror 136. The cylinder mirror 136 is oriented so that the laser beam, when emitted from the rotary unit 105a, is advanced at an angle α from the horizontal plane. Since the laser beam reflected by the cylinder mirror 136 is transmitted through the one-quarter wave plate 138 again and then linearly polarized in the Z-direction, the laser beam then can be transmitted through the polarized beam splitter 141 and then exits from the rotary unit 105a.

On the other hand, the laser beam transmitted through the polarized beam splitter 141 falls upon another one-quarter wave plate 137 to turn to circular polarized light, and thereafter, it is reflected by a cylinder mirror 135. The cylinder mirror 135 is oriented so that the laser beam, when exiting from the rotary unit 105a, meets the horizontal plane at an angle of β. Since the laser beam reflected by the cylinder mirror 135 is transmitted through the one-quarter wave plate 137 again and then linearly polarized in the Y-direction, the laser beam then can be reflected by the polarized beam splitter 141 that has transmitted it in the earlier stage, and it exits from the rotary unit 105a.

Alternative to the cylinder mirrors 135 and 136, any diffraction grating having similar effects may be taken place of them. When the diffraction grating is substituted, an intensity distribution of the fan-shaped beams can be varied as required. Light of the fan-shaped beams in the vicinity of the horizontal plane, even after propagated considerably far, must be of sufficiently higher luminous energy to be received at the optical sensor 154a. Light deviating significantly apart from the horizontal plane, as propagated farther, interferes with the ground or spreads to an elevation where it can no longer be received at the optical sensor 154a. Thus, the light diverged too far does not have to have high luminous energy because it is beyond a near range covered by the sensitivity of the optical sensor 154a.

The optical system is characterized as follows. Since the rotary unit 105a rotates relative to the laser projector 103a, it is unavoidable that maladjustment takes place between them. When laser light is deflected after being reflected once, such maladjustment causes an error in a deflection direction of the laser light. In this embodiment, either of the fan-shaped laser beams is, after emitted from the laser projector 103a, twice reflected by the polarized beam splitter 141 and the cylinder mirror 135 or 136 in the rotary unit 105a. Hence, an angle of deflection of the emergent laser beam simply depends upon a deflection angle in transmission through the rotary unit 105a regardless of malalignment of the rotary unit 105a due to the maladjustment. Thus, no error is caused in the deflection direction of the emergent beams due to the maladjustment of the rotary unit 105. This attains the same effect as in the case where a typical pentaprism is used for the optical system.

(1.2.3) Unit for Determining Angular Position of Optical Sensor Relative to Rotary Laser Apparatus Now, described below will be an angular position determining unit which is used to determine an angular position of the optical sensor 154a relative to the rotary laser apparatus 151a, or to determine which angular position the optical sensor 154a is positioned in circular trajectories at which the rotational laser apparatus 151a directs laser light. The angular position determining unit described herein can also be combined with the aforementioned rotary laser apparatus 151 in the similar manner.

The rotary laser apparatus 151a includes, as illustrated in FIG. 8, an emission direction detecting means, or namely, an encoder 117 detecting an angle of emitted laser beam and an angle signal transmitter 123 transmitting the detected emission angle to the optical sensor 154a. The encoder 117 detects an angle of beam emission from the rotary unit 105a. Data on the detected emission angle are successively sent to the light receiving and sensing device 154a by the angle signal transmitter 123.

Figure 10:
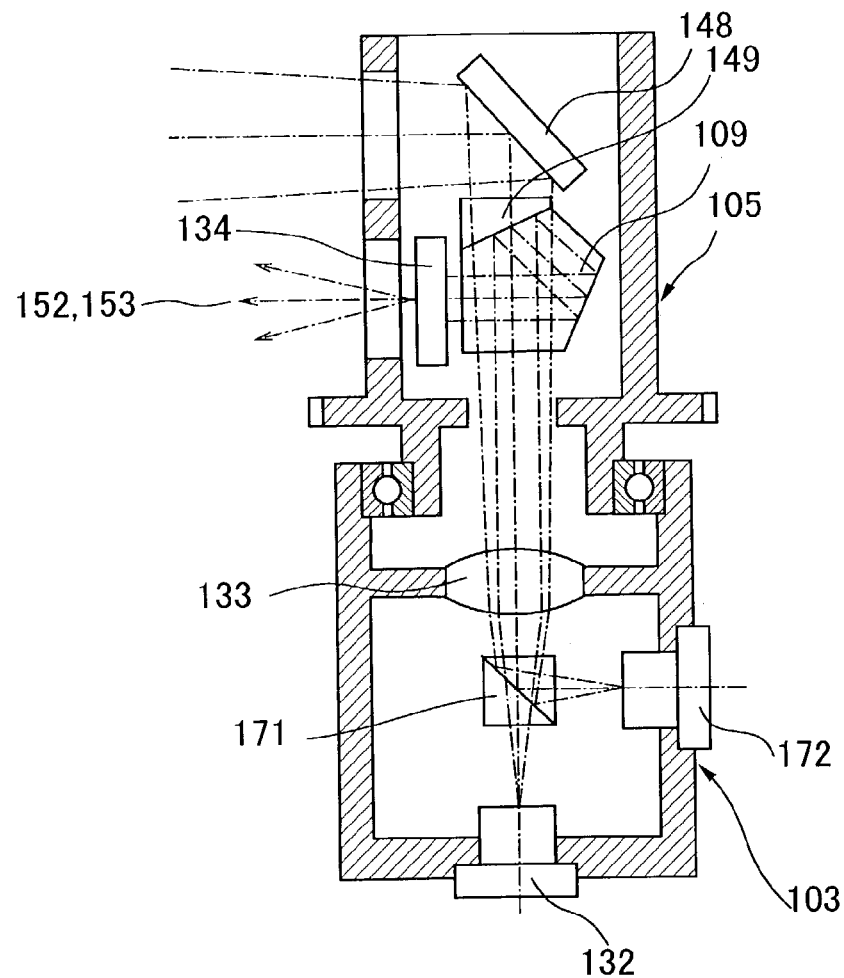
FIG. 10 is a diagram showing an embodiment of the rotary laser apparatus according to the present invention, having an angular signal projector utilizing laser light of varied wavelengths.

Combined with the rotary laser device 151 shown in FIG. 3 for the laser projector 103 (see FIG. 5), an embodiment shown in FIG. 10 can determine an angular position of the optical sensor. In such an embodiment, a beam projector 172, which emits light carrying angle data, is used to modulates light emitting diode (LED) or laser diode and vary wavelength (color) from those of the diverging beams 152 and 153a to project light representing angular data onto the optical sensor 154.

Referring to FIG. 10, the laser beam emitted from the laser projector 172 is reflected at a die clock prism 171 and then refracted into diverging beam. A degree of divergence depends upon a relative relation of the collimator lens 133 with the laser projector 172. The beam transmitted through the collimator lens 133 is, after being transmitted by the pentaprism 109 and then reflected at a mirror 148, projected out of the rotary unit 105 in a direction orthogonal to a rotation axis thereof Receiving the projected beams at the optical sensor, an angular position is determined.

The beam emitted from the laser beam projector 132 is transmitted through the die clock prism 171 and refracted into collimated beam by the collimator lens 133. The collimated beam is reflected by a die clock mirror 149 and deflected by the pentaprism 109. The deflected light is passed through the diffraction grating 134 and split into two fan-shaped beams 152 and 153.

Figure 11:
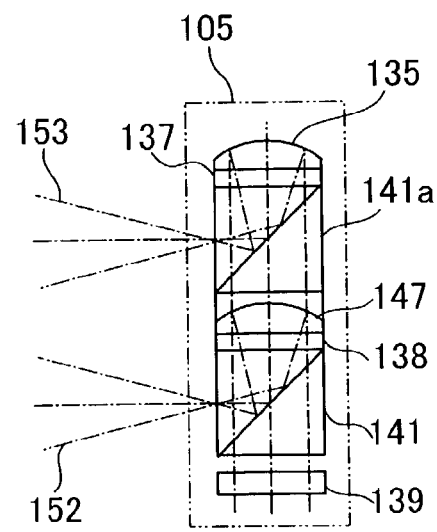
FIG. 11 shows another embodiment of the rotary laser apparatus emitting two fan-shaped beams.

FIGS. 11 to 13 depict other manners of generating two diverging or fan-shaped beams.

FIG. 11 depicts another embodiment of the rotary unit 105. As will be recognized in FIG. 11, the circularly polarized laser beam incident upon the one-quarter wave plate 139 is transmitted through the polarized beam splitter 141. The light transmitted through the beam splitter 141 is transmitted through the one-quarter wave plate 138. Part of the transmitted laser beam is reflected by a cylinder half mirror 147 and thereafter transmitted through the one-quarter wave plate 138 again. The laser beam transmitted through the one-quarter wave plate 138 is then reflected by the beam splitter 141, and thus, the resultant beam or the fan-shaped beam 152 is emitted. The cylinder half mirror 147 is oriented so that the fan-shaped beam 152 propagates at an inclination angle α.

The beam transmitted through the half mirror 147 is transmitted through a polarized beam splitter 141a, and then, it falls upon the one-quarter wave plate 137. The beam is, after transmitted through the one-quarter wave plate 137, directed to the cylinder mirror 135. The beam incident upon the mirror 135 is reflected by the mirror 135 and then transmitted through the one-quarter wave plate again. Then, the beam is reflected by the beam splitter 141a, and thus, the resultant beam or the fan-shaped beam 153 is emitted. The mirror 135 is oriented so that the fan-shaped beam 153 propagates at an inclination angle β.

Figure 12A:
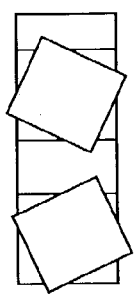
FIGS. 12A, 12B show further another embodiment of the rotary laser apparatus that emits two fan-shaped beams.
Figure 12B:
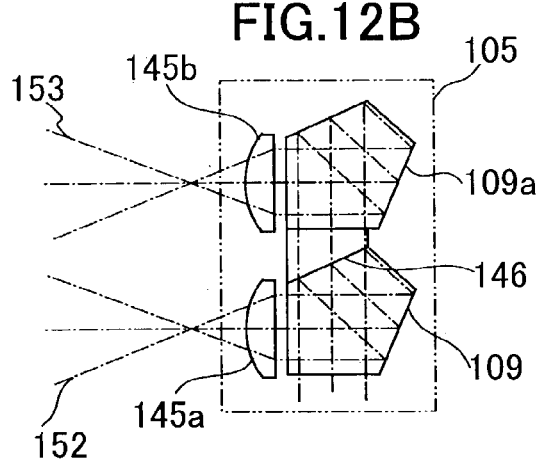

FIGS. 12A, 12B depict further another embodiment of the rotary unit 105. As will be recognized in FIGS. 12A, 12B, the beam guided into the rotary unit 105 falls upon the pentaprism 109. Part of the beam incident upon the pentaprism 109 is reflected by a half mirror 146 in an upper side of the pentaprism 109 and then deflected by the pentaprism 109. The deflected beam is shaped into the diverging beam by a cylinder lens 145a, and thus, the fan-shaped beam 152 is emitted. The cylinder lens 145a is oriented so that the fan-shaped beam 152 propagates at an inclination angle α.

The beam transmitted through the half mirror 146 in the pentaprism 109 falls on a pentaprism 109a and is deflected. The beam deflected in the pentaprism 109a is shaped into the diverging beam by a cylinder lens 145b, and thus, the fan-shaped beam 153 is emitted. The cylinder lens 145b is oriented so that the fan-shaped beam 153 propagates at an inclination angle β.

Figure 13A:
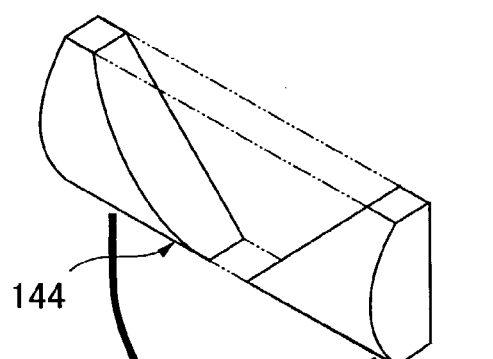
FIGS. 13A to 13C show an embodiment of a cylinder lens that generates two fan-shaped beams in the rotary laser apparatus.
Figure 13B:
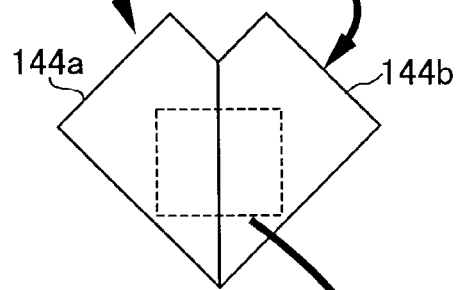
Figure 13C:
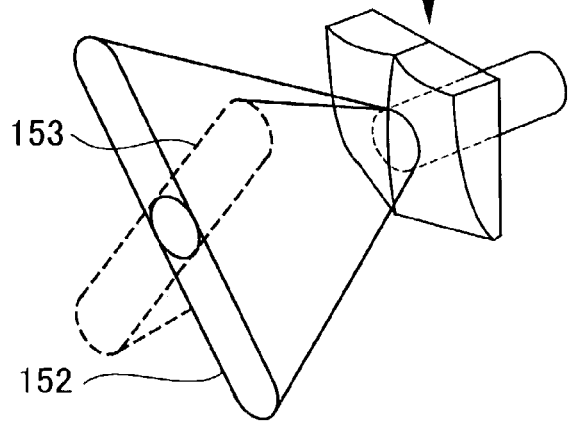

FIGS. 13A to 13C depict still another embodiment of producing the two fan-shaped beams 152 and 153. As shown in FIG. 13A, a cylinder rod lens 144 is cut into pieces, and the pieces 144a and 144b are joined together again (see FIG. 13B). When light is directed at the cylinder lens, exiting light is spread into two diverging beams or the fan-shaped beams 152 and 153 (see FIG. 13C).

Figure 14:
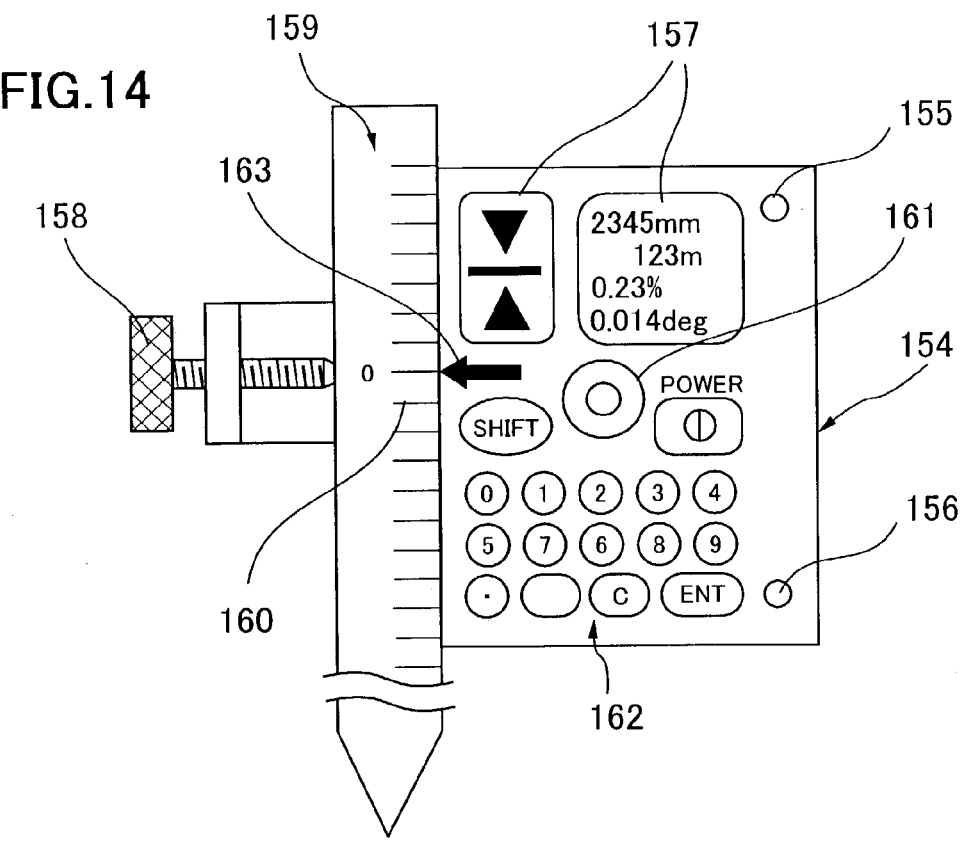
FIG. 14 is a front view showing the optical sensor included in the position determining apparatus according to the present invention.
Figure 15:
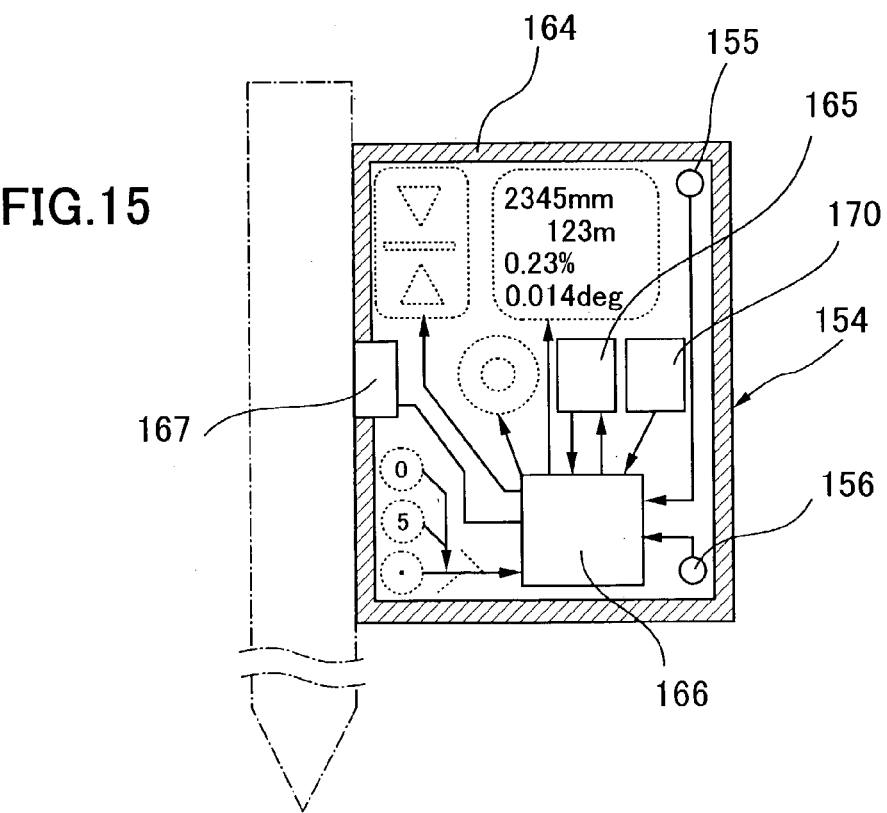
FIG. 15 a sectional mimetic diagram of the optical sensor included in the position determining apparatus according to the present invention.

(1.3) Optical Sensor (1.3.1) Optical Sensor for Rotary Laser Apparatus Emitting Two Diverging Laser Beams The optical sensor 154, which is used to receive two of the diverging or fan-shaped beams 152 and 153 emitted respectively from the rotary laser apparatuses 151 will now be described. As shown in FIGS. 14 and 15, light receiving sections 155 and 156, which sense the fan-shaped beams 152 and 153, are fixed to a box 164 of the optical sensor 154. The box 164 includes a display 157, an alarm 161 such as a buzzer, entry keys 162, an index 163, and a level rod 159. Additionally, the box 164 is incorporated with a memory 165, an arithmetic operation unit 166 determining a state of received light, and a scale reader 167, and an angle signal receiving unit 170. The display 157 gives an elevation from the horizontal reference plane to the optical sensor 154, a distance between the rotary laser device 151 and the optical sensor 154, and an angular position of the optical sensor 154 relative to the rotary laser apparatus 151.

(1.3.1.1) Principle of Measuring Angles by Means of Optical Sensor

As stated above, the rotary laser apparatus 151 emits the diverging or fan-shaped beams 152 and 153 while rotating about the center C. As shown in FIG. 3, the fan-shaped beam 152 is emitted, meeting the horizontal plane at an angle β. An intersecting line of the fan-shaped beam 152 with the horizontal plane meets an intersecting line of the fan-shaped beam 153 with the horizontal plane at an angle δ. The two fan-shaped beams 152 and 153 spin under such conditions, and hence, those diverging beams sweep the light receiving section in the optical sensor 154 one after another with some delay of time.

Figure 16A:
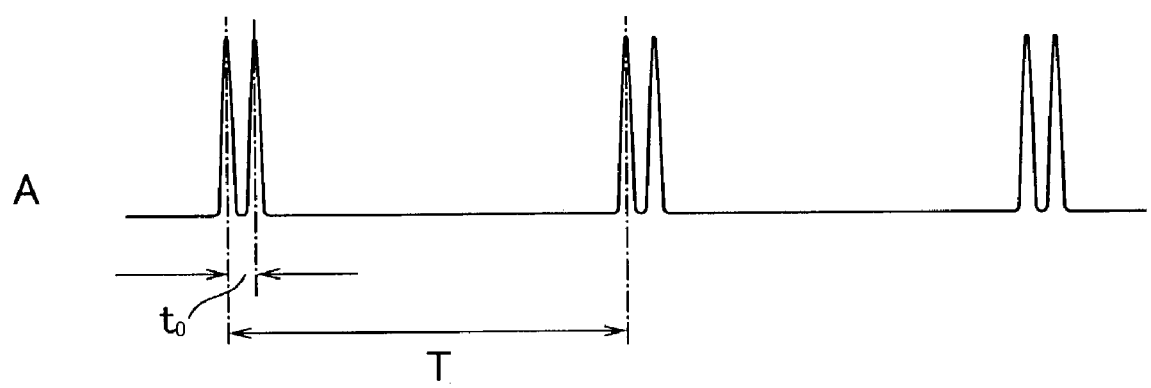
FIGS. 16A, 16B are graphs of signals detected by the optical sensor in the position determining apparatus according to the present invention.
Figure 16B:
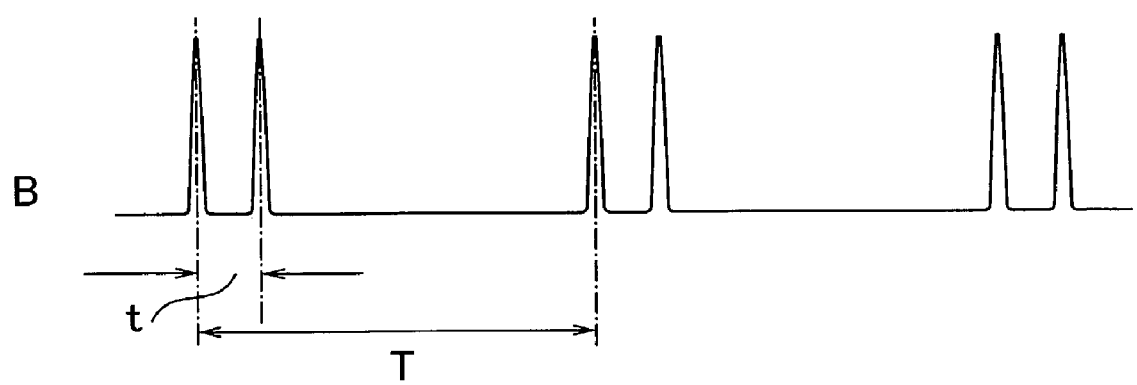

When the light receiving section in the light sensor 154 is in a position A within the horizontal plane, light detected by the optical sensor 154 can be depicted as in FIG. 16A. Otherwise, when the light receiving section 156 is in a position B translated vertically upward from the position A, the fan-shaped beams can resultantly be detected as in FIG. 16B. As illustrated in FIG. 16A, assuming now that the fan-shaped beams are sequentially detected with a time delay of to when the light receiving section is located in the point A and that the rotary laser apparatus 151 rotates at cycle T, the time delay between detections of the two beams is given by the following equation (1):

$$t_o = T \frac{\delta}{2\pi} \quad (1)$$

When the light receiving section 156 is in the position B at an arbitrary elevation, the time delay t from one detection to another is in proportion to ∠BCA=γ that is an angle at which a straight line passing the position B of the light receiving unit 156 and the laser beam emitting point C meets the horizontal plane, and hence, as y takes a larger value, the time delay t becomes accordingly longer. Thus, determining the time delay t in the position B, the angle γ defined by the strait line passing the position B and point C and the horizontal plane can be expressed by the following formulae (2) and (3):

$$\gamma = \frac{t - t_0}{T\left(\frac{1}{2\pi\tan(\pi - \beta)} + \frac{1}{2\pi\tan(\alpha)}\right)} \quad (2)$$

$$\gamma = \frac{(t - t_0)\pi\tan(\alpha)}{T} \text{ (where, especially, } \pi - \beta = \alpha) \quad (3)$$

The value of γ can be computed by the arithmetic operation unit 166 where the angle γ is arithmetically obtained from the delay between times when the two fan-shaped beams 152 and 153 sweep the light receiving section one after another and the rotation cycle T of the rotary laser apparatus 151, and the display 157 indicates the computation result.

Figure 17:
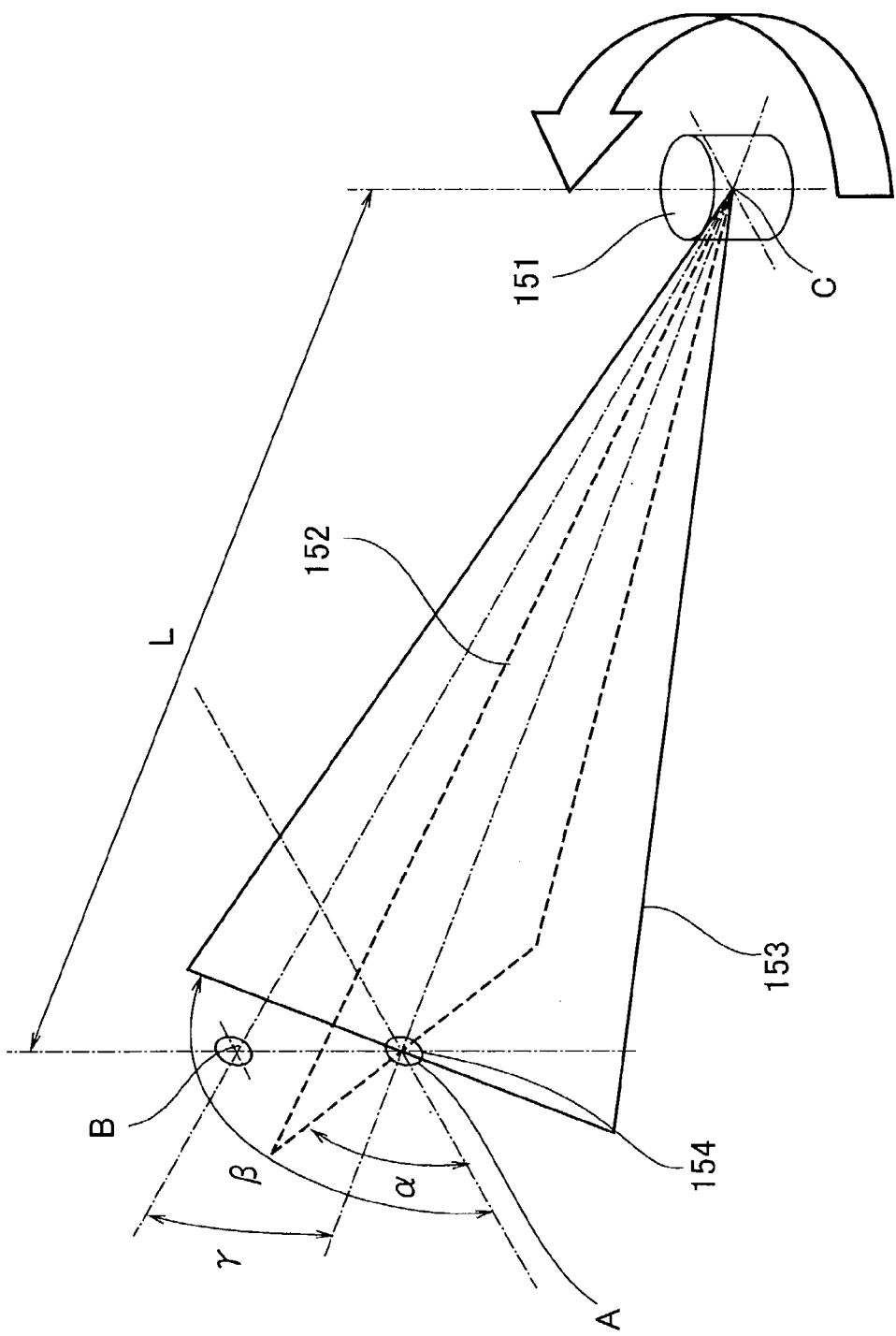
FIG. 17 is a perspective view illustrating the rotary laser apparatus that emits two fan-shaped laser beams intersecting with each other within horizontal plane.

Discussed below will be a case where the rotary laser apparatus 151 emits the two fan-shaped beams that intersect with each other in the horizontal plane, or a case under the condition that the angle δ in FIG. 3 is equal to 0°. This is illustrated in FIG. 17.

When the light receiving section of the optical sensor is in the position A within the horizontal plane, the revolving two fan-shaped beams 152 and 153 sweep the optical sensor 154 at the same time, which is represented as $t_0$=0. Thus, ∠BCA=γ, which is an angle at which a straight line passing the position B at an arbitrary elevation and the point C or the center of rotation of the rotary laser apparatus meets the horizontal plane, can be obtained by substituting $t_0=0$ in the formulae (2) and (3) as in the following equations (4) and (5):

$$\gamma = \frac{t}{T\left(\frac{1}{2\pi\tan(\pi-\beta)} + \frac{1}{2\pi\tan(\alpha)}\right)} \quad (4)$$

$$\gamma = \frac{t\pi\tan(\alpha)}{T} \text{ (where, especially, } \pi-\beta=\alpha\text{)} \quad (5)$$

As is recognized from the equations (4) and (5), $\alpha$ and $\beta$ are constants, and therefore, the angle $\gamma$ is expressed as a function of the rotation cycle T of the rotary laser apparatus 151 and the time delay between detections of the two fan-shaped laser beams. If rotation of the rotary laser 151 is somewhat irregular and this causes an error for the predetermined rotation cycle T, or rather, if some irregularity takes place in a single rotation whereas there is no error of the predetermined rotation cycle T, the time delay t between detections also has an error, which results in computing $\gamma$ with an error. In a measurement of the horizontal plane where the two fan-shaped beams 152 and 153 intersects with each other within the horizontal plane as in FIG. 17, t=0 is satisfied for given $\gamma=0$, and an error due to irregular rotation would not affects the measurement.

In a real construction site, the horizontal plane is often used for a reference plane, the arrangement in FIG. 17 where an error associated with the measurement in the horizontal reference plane is minimized is preferable to the arrangement in FIG. 1 where the fan-shaped beams 152 and 153 do not intersect with each other in the horizontal plane.

The aforementioned principle of measuring angles by the optical sensor 154 can apply to the optical sensor 154a that is designed to receive the fan-shaped beams 152a and 153a of different polarization.

Figure 18:
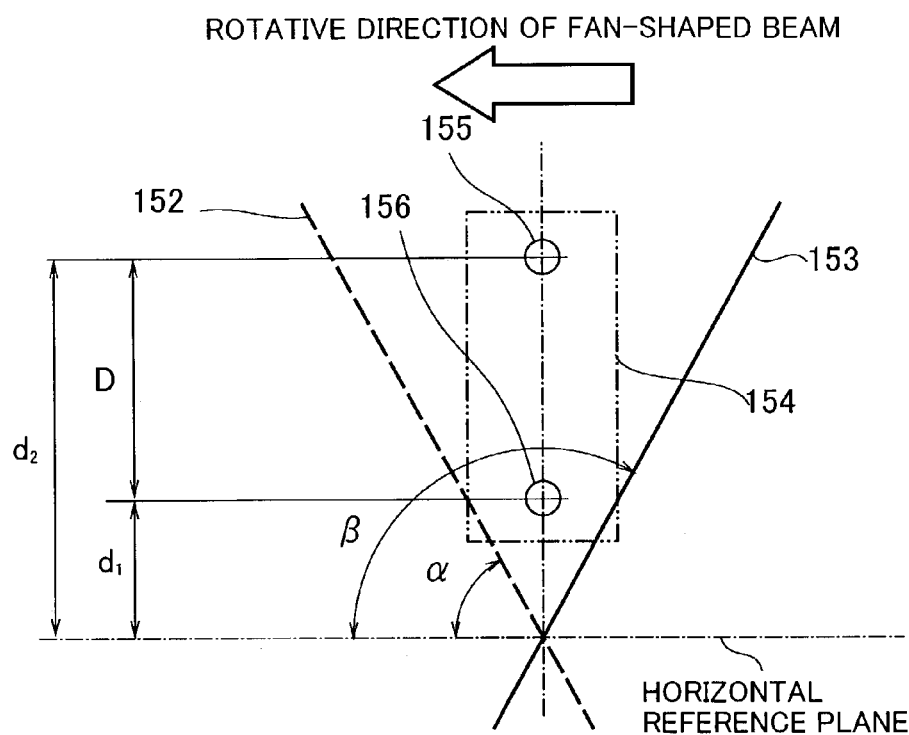
FIG. 18 is a diagram showing a positional relation of two light receiving sections to two fan-shaped beams in the position determining apparatus according to the present invention.

(1.3.1.2) Principle of Measuring Angles by Means of Two Light Receiving Sections in Optical Sensor Discussed below will be a principle of measuring angles by two of the light receiving sections of the optical sensor 154. With the two light receiving sections, a relative elevation of the optical sensor 154 to the rotary laser apparatus 151 and a distance between them can be obtained. As shown in FIG. 18, the light receiving sections are positioned vertically in series in the optical sensor 154.

Figure 19:
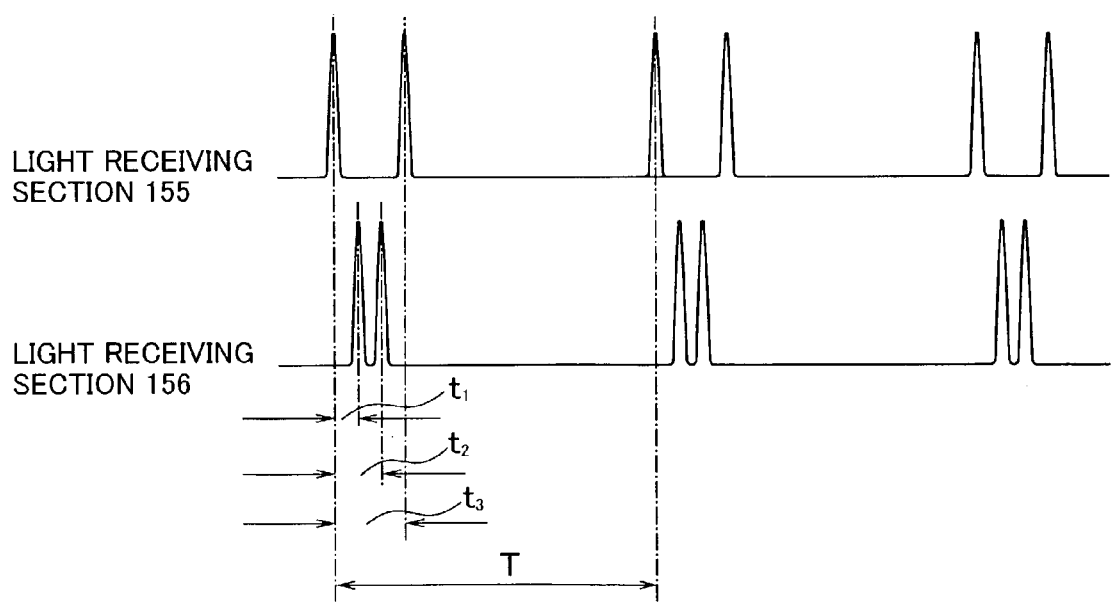
FIG. 19 is a graph of signals detected in a moment conditioned by the positional relation in FIG. 18.

The two diverging or fan-shaped beams 152 and 153 are emitted so that they intersect with each other in the horizontal plane, and the beam 152 circularly sweeps at angle $\alpha$ to the horizontal plane while the beam 153 does at angle $\beta$ to the same. The light receiving sections 155 and 156 are spaced from each other at a vertical interval D. The two fan-shaped beams 152 and 153 revolve under the conditions as mentioned above, and hence, the light receiving sections 155 and 156 in the optical sensor 154 detect a delay between times when the fan-shaped beams 152 and 153 respectively sweep the optical sensor 154, as depicted in FIG. 19.

From the time delays $t_1$, $t_2$, $t_3$, and T detected in this way and constants $\alpha$, $\beta$, and D, an elevation $d_1$ of the light receiving section 155 from the horizontal reference plane is given by the following equation (6) while an elevation $d_2$ of the light receiving section 156 is obtained by the following equation (7):

$$d_1 = \frac{D(t_2-t_1)}{(t_3-t_2+t_1)} \quad (6)$$

$$d_2 = \frac{D(t_2-t_1)}{(t_3-t_2+t_1)} + D \quad (7)$$

Assuming now that $\gamma_2$ is an angle at which a straight line passing the light receiving section 155 and the point C of emission of the fan-shaped laser beams meets the horizontal plane while $\gamma_1$ is an angle at which a straight line passing the light receiving section 156 and the point C meets the horizontal plane, $\gamma_2$ and $\gamma_1$ are obtained from the formula (4) as in the following equation (8):

$$\gamma_1 = \frac{t_2-t_1}{T\left(\frac{1}{2\pi\tan(\pi-\beta)} + \frac{1}{2\pi\tan(\alpha)}\right)} \quad (8)$$

$$\gamma_2 = \frac{t_3}{T\left(\frac{1}{2\pi\tan(\pi-\beta)} + \frac{1}{2\pi\tan(\alpha)}\right)} \quad (9)$$

On the other hand, a distance L from the rotary laser apparatus 151 to the optical sensor 154 is expressed with the terms $\gamma_2$, $\gamma_1$, $d_1$, and $d_2$ as in the equations (10) and (11) as follows:

$$L = \frac{d_1}{\tan(\gamma_1)} \quad (10)$$

$$L = \frac{d_2}{\tan(\gamma_2)} \quad (11)$$

Substituting the formulae (6) to (9) into the equations (10) and (11), the equations (12) and (13) are obtained as follows:

$$L = \frac{\left\{\frac{D(t_2-t_1)}{(t_3-t_2+t_1)}\right\}}{\tan\left[\frac{t_2-t_1}{T\left(\frac{1}{2\pi\tan(\pi-\beta)} + \frac{1}{2\pi\tan(\alpha)}\right)}\right]} \quad (12)$$

$$L = \frac{\left\{\frac{D(t_2-t_1)}{(t_3-t_2+t_1)} + D\right\}}{\tan\left[\frac{t_3}{T\left(\frac{1}{2\pi\tan(\pi-\beta)} + \frac{1}{2\pi\tan(\alpha)}\right)}\right]} \quad (13)$$

Although either the equation (12) or the equation (13) can give the distance from the rotary laser apparatus 151 and the optical sensor 154, with given $t_2-t_1=0$, there is an operation of dividing zero in the equation (12) while, with given $t_3=0$, there is an additional operation of dividing zero in the equation (13), and in either case, the formula including no such operation may be used.

Figure 20:
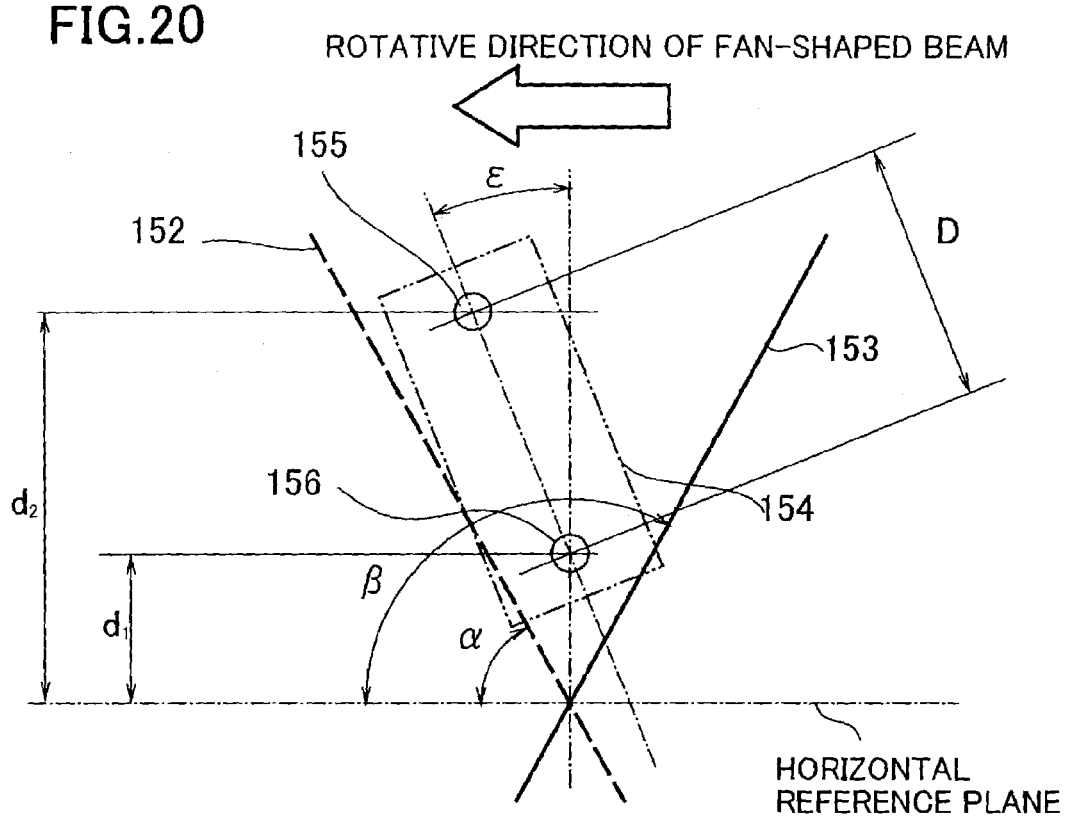
FIG. 20 illustrates a positional relation of two light receiving sections to two fan-shaped beams in a situation where the optical sensor is inclined in the position determining apparatus according to the present invention.

Then, referring to FIG. 20, a case where the optical sensor 154 is inclined at only an angle of $\epsilon$ will be simulated. In such a case, the time delays $t_1$, $t_2$, and $t_3$ and the rotation cycle T are used to correct the inclination, and thus, the relative elevation of the optical sensor 154 to the rotary laser apparatus 151 and the distance between them can be obtained.

Under the condition of α+ε<90°, the fan-shaped beams are detected at the light receiving sections 155 and 156 in the optical sensor 154 in the same procedure as in FIG. 19. With given conditions of the time delays $t_1$, $t_2$, and $t_3$, the rotation cycle T, the constants α and β, and the distance D between the two light receiving sections 155 an 156, vertical distances $d_1$ and $d_2$ from the horizontal reference plane to the light receiving sections 155 and 156 are obtained by the formulae (14) and (15) as follows:

$$d_1 = \cos(\varepsilon) \cdot \frac{D(t_2 - t_1)}{(t_3 - t_2 + t_1)} \quad (14)$$

$$d_2 = \cos(\varepsilon) \cdot \frac{D(t_2 - t_1)}{(t_3 - t_2 + t_1)} + D \quad (15)$$

The inclination angle ε of the optical sensor 154 is obtained by the following formula (16):

$$\varepsilon = \tan^{-1}\left(\frac{(t_3 - t_2)\tan(\pi - \beta) - t_1\tan(\alpha)}{(t_3 + t_1 - t_2)\tan(\alpha)\tan(\pi - \beta)}\right) \quad (16)$$

The distance L is obtained by substituting $d_1$, $d_2$, $\gamma_1$, and $\gamma_2$ as given in the formulae (14), (15), (8), and (9) into the formulae (10) and (11).

Figure 21:
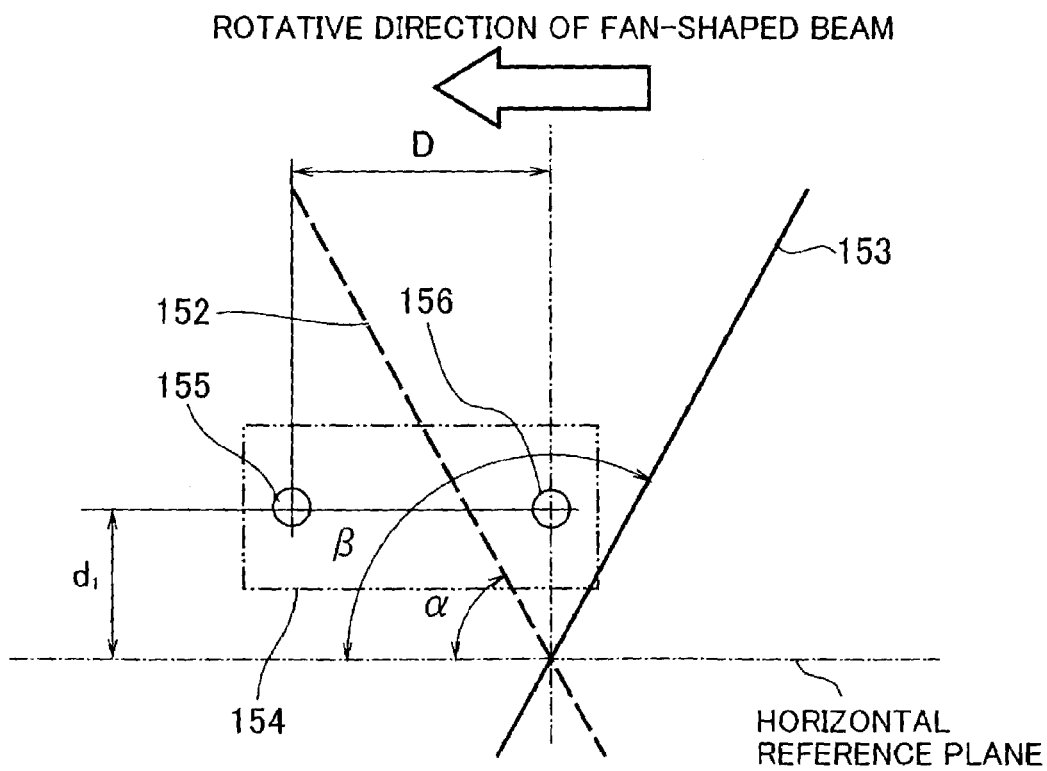
FIG. 21 illustrates a positional relation of two light receiving sections to two fan-shaped beams in a situation where the light receiving sections are kept horizontal in the position determining apparatus according to the present invention.
Figure 22:
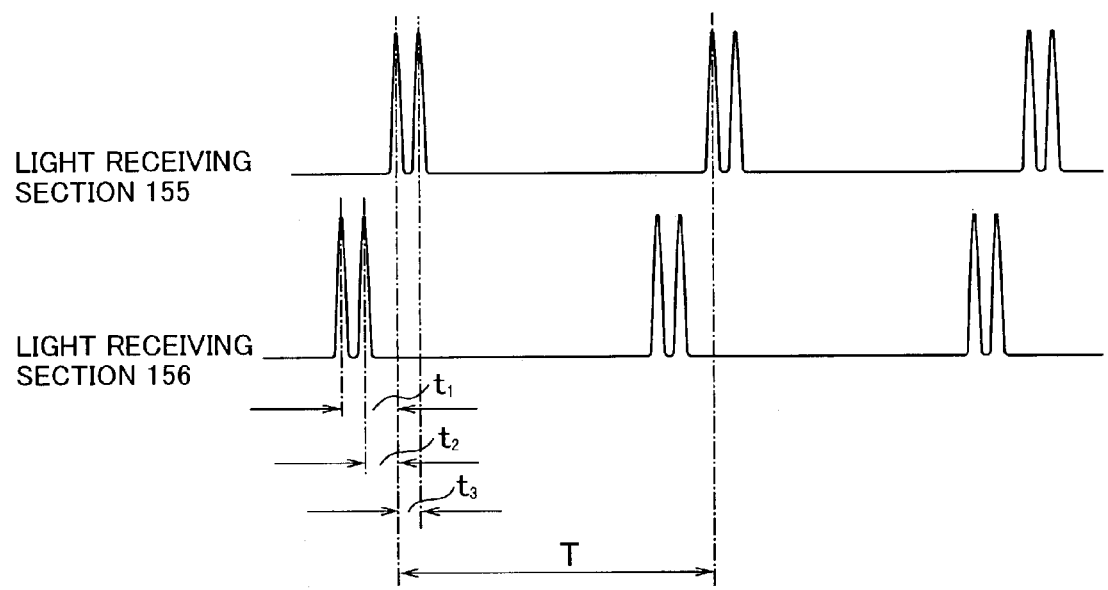
FIG. 22 is a graph of signals detected in a moment conditioned by the positional relation in FIG. 21.

With referring to FIGS. 21 and 22, discussed below will be a case where the light receiving sections 155 and 156 are located horizontally in series to detect the fan-shaped beams.

The two fan-shaped beams 152 and 153 are emitted so that they intersect with each other within the horizontal plane, and the beam 152 circularly sweeps at an angle α to the horizontal plane while the beam 153 does at an angle β to the same. The optical sensor 154 includes the two light receiving sections 155 and 156 horizontally spaced apart from each other at an interval D to detect the fan-shaped beams The fan-shaped beams, revolving under the conditions as mentioned above, are detected as illustrated in FIG. 22 when they sweep the light receiving sections 155 and 156 in the optical sensor 154. From the time delays $t_1$, $t_2$, $t_3$, and T detected in this way and constants α, β, and D, a horizontal distance from the rotation center C of the rotary laser apparatus 151 to the light receiving sections 155 and 156 of the optical sensor 154 can be given in the formula (17) as follows:

$$L = \frac{DT}{\pi(t_3 - t_2 - t_1)} \quad (17)$$

where $t_1 = t_3 - t_2$.

The vertical distances d1 and d2 from the horizontal reference plane to the light receiving sections 155 and 156, respectively, are given by transforming the formulae (10) and (11) to the equations (18) and (19) as follows:

$$d_1 = L \tan(\gamma_1) \quad (18)$$

$$d_2 = L \tan(\gamma_2) \quad (19)$$

Substituting the equations (8), (9) and (17) into the formulae (18) and (19) leads to the formulae (20) and (21) as follows:

$$d_1 = \frac{DT}{\pi(t_3 - t_2 - t_1)}\tan\left(\frac{t_2 - t_1}{T\left(\frac{1}{2\pi\tan(\pi - \beta)} + \frac{1}{2\pi\tan(\alpha)}\right)}\right) \quad (20)$$

$$d_2 = \frac{DT}{\pi(t_3 - t_2 - t_1)}\tan\left(\frac{t_3}{T\left(\frac{1}{2\pi\tan(\pi - \beta)} + \frac{1}{2\pi\tan(\alpha)}\right)}\right) \quad (21)$$

With given $\gamma_2 \approx 0$ and $\gamma_1 \approx 0$, $\tan(\gamma) \approx \gamma$ is satisfied, and therefore, the following formulae (22) and (23) are true:

$$d_1 = \frac{2D(t_2 - t_1)\tan(\alpha)\tan(\pi - \beta)}{(t_3 - t_2 - t_1)\{\tan(\alpha) + \tan(\pi - \beta)\}} \quad (22)$$

$$d_2 = \frac{2Dt_3\tan(\alpha)\tan(\pi - \beta)}{(t_3 - t_2 - t_1)\{\tan(\alpha) + \tan(\pi - \beta)\}} \quad (23)$$

In the formulae (14), (15), (16), (22), and (23) where d1, d2 and ε are obtained includes, none of operation elements of terms include the rotation cycle T. This means that even if the rotation of the rotary laser apparatus 151 is irregular and the predetermined rotation cycle T includes an error, the results of measurement would not be affected by such an error. Thus, when rotation irregularities that might affect the time delays $t_1$, $t_2$, and $t_3$, do not take place in a short period of time when both the fan-shaped beams 152 and 153 sweep the light receiving sections 155 and 156 in the optical sensor 154, measurements are accomplished without error.

This principle of measuring angles can apply to the fan-shaped beams 152a and 153a of different polarizations that are received at the optical sensor 154a.

(1.3.1.3) Principle of Measuring Positions of Optical Sensor

When the optical sensor 154 has the single light receiving section or two of the light receiving sections horizontally spaced from each other and when the two fan-shaped beams intersect with each other in the horizontal reference plane, detection of the time delay is insufficient to identify two positions that are vertically aligned and spaced equally from the horizontal reference plane. In this situation, in order to learn which side the optical sensor 154 is located above or below the horizontal reference plane, the optical sensor 154 must be moved up and down to check the state of receiving light. Specifically, if moving the optical sensor upward causes an increase in the time delay, the optical sensor 154 is above the horizontal reference plane while, if moving the optical sensor downward causes a reduction of the time delay, the optical sensor 154 is under the horizontal reference plane. When there are two or more of the light receiving sections spaced apart from one another at varied levels, respectively, it is possible to determine whether the optical sensor is located above or below the horizontal reference plane without the above-mentioned procedure. When properties such as polarization direction and frequency are useful to identify the two fan-shaped beams 152 and 153, either the single light receiving section or two of the light receiving sections horizontally spaced apart permits a recognition of whether the optical sensor is above or below the horizontal reference plane, depending upon which one of the fan-shaped beams is detected first.

Figure 23A:
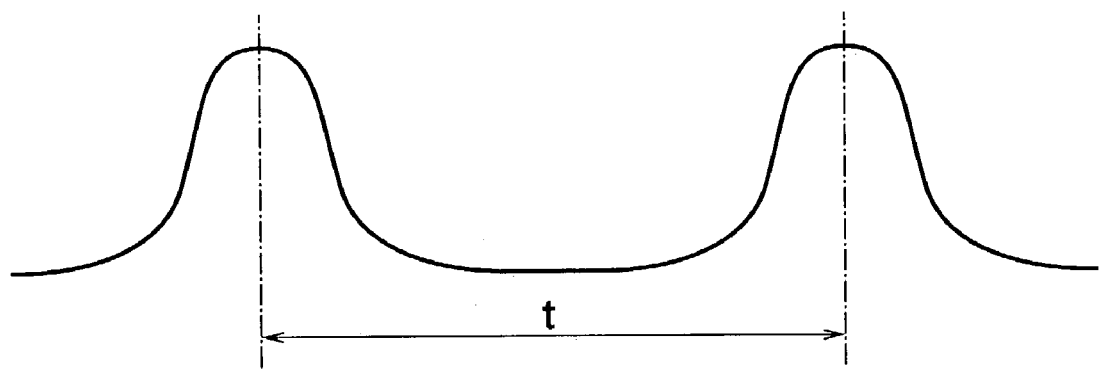
FIGS. 23A to 23C are graphs of signals detected at the light receiving sections where two fan-shaped laser beams are respectively received one after another at short delay in the rotary laser apparatus.

(1.3.1.4) Measurement Principle in the Event of Short Delay Between Detections of Diverging Beams As mentioned above, from the results of measurement and arithmetic operation on the delay t between times when two of the fan-shaped beams sweep the optical sensor 154, a relative elevation of the optical sensor to the rotary laser apparatus 151, a distance between them, and an inclination angle of the optical sensor are computed. When the light receiving section receives the two fan-shaped beams 152 and 153 with a longer delay of time as illustrated in FIG. 23A, the measurement result of the delay t is more accurate. In contrast, when the delay of time between detections of the two fan-shaped beams 152 and 153 is short, and additionally, when signals produced due to received light interfere each other, it is impossible to determine the delay accurately. Thus, distinguishing the signals derived from the two fan-shaped beams from their respective polarizations and identifying the signals separately, it becomes possible to obtain an accurate delay of time if it is short.

(1.3.2) Optical Sensor for Rotary Laser Apparatus Emitting Two Diverging Laser Beams of Different Polarizations Now discussed will be the optical sensor 154a designed to receive the two diverging or fan-shaped laser beams 152a and 153a of different polarizations. A configuration of a unit that identifies the laser beams from their respective varied polarizations will be detailed. Other components, and the principles of determining the relative elevation of the optical sensor to the rotary laser apparatus and determining the distance between them are similar to those of the aforementioned optical sensor 154.

Figure 24A:
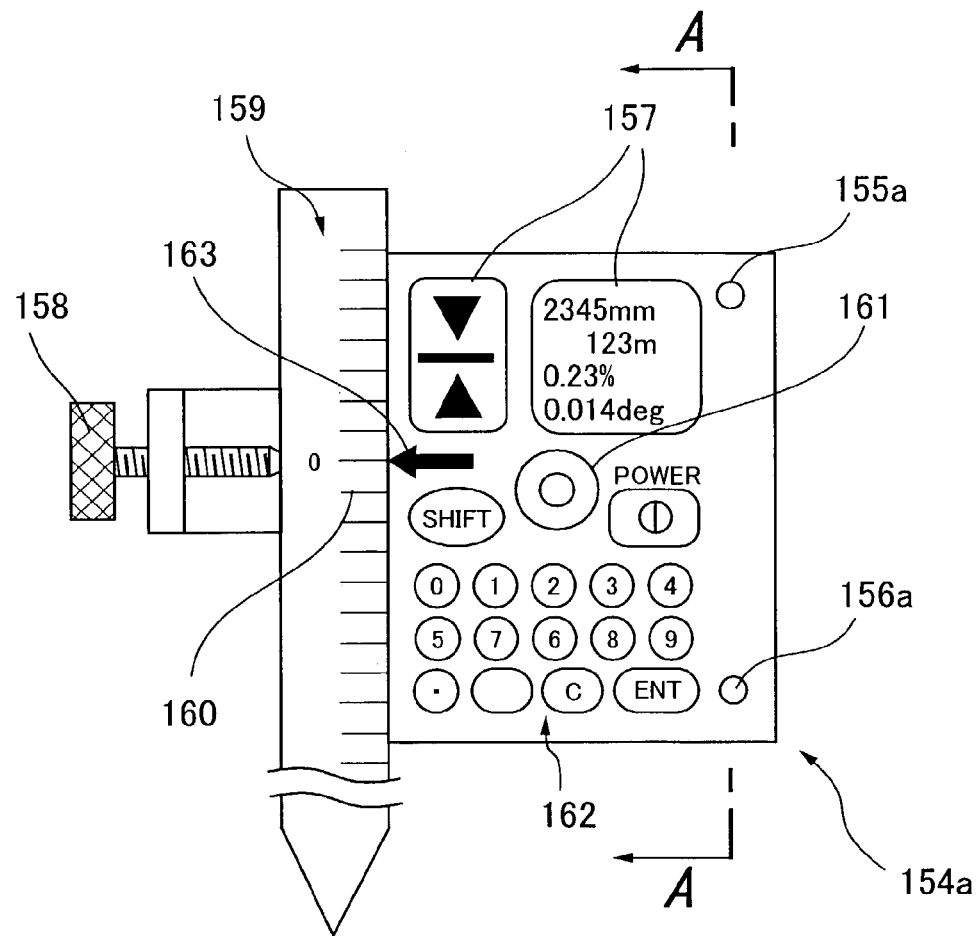
FIGS. 24A, 24B depict an arrangement of the optical sensor at which two fan-shaped laser beams of different polarizations are received in the position determining apparatus according to the present invention.
Figure 24B:
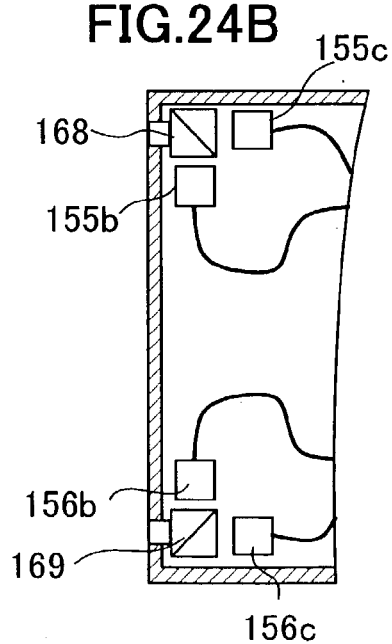

FIG. 24A is a front view of the optical sensor 154a while FIG. 24B is a sectional view of the same, taken along the line A—A of FIG. 24A. As shown in FIGS. 24A, 24B, a light receiving section 155a of the optical sensor 154a includes light receiving members 155b and 155c and a polarized beam splitter 168 located in a previous stage to them while a light receiving section 156a includes light receiving members 156b and 156c and a polarized beam splitter 169 located in a previous stage to them. The polarized beam splitters 168 and 169 transmit or reflect laser beams, depending upon a polarization direction of incident light. The light receiving members 155b and 156b are dedicated to reflected light while the light receiving members 155c and 156c are dedicated to transmitted light, and thus, the polarization direction of the incident light can be determined. In this way, in the event that the two fan-shaped laser beams 152a and 153a fall on the light receiving members 155a and 156a one after another at short delay of time, the light receiving members 155b and 156b detect the fan-shaped beam 152a while the light receiving members 155c and 156c detect the fan-shaped beam 153a, and thus, the delay of time can be accurately determined.

Alternatively, a one-quarter (¼) wave plate (not shown) may be added to a trailing end of the optical path of the rotary laser apparatus 151a to emit circularly polarized laser beam while another one-quarter wave plate (not shown) may be placed in a previous stage to the polarized beam splitters 168 and 169 in the light receiving sections 155 and 156, so that in the event that the optical sensor 154 is inclined, the beam splitters 168 and 169 accurately split the two fan-shaped beams.

(1.3.3) Measurement of Angular Position of Optical Sensor Relative to Rotary Laser Apparatus The optical sensor 154 has the angle signal receiving unit 170 (see FIG. 15) that successively receives data on emission angles forwarded by the angle signal transmitter 123 (see FIG. 3) provided in the rotary laser device 151. The emission angle data received at the very instance when the optical sensor 154 has received the fan-shaped beams 152 and 153 is utilized to determine an angular position of the optical sensor 154 relative to the rotary laser apparatus 151. Such a manner of determining the angular position by the angle signal receiving unit 170 can totally similarly be applied to the optical sensor 154a (see FIGS. 24A, 24B) that receives two of the fan-shaped beams varied in polarization from each other.

Also, in order to determine the angular position of the optical sensor 154 relative to the rotary laser apparatus 151, an additional position sensor may be provided which gives a direction indication of a relative position of the rotary laser apparatus 151 to the optical sensor 154. For instance, the position sensor may be a GPS (Global Positioning System) receiver, and the GPS seeks an angular position of the optical sensor 154 to the rotary laser apparatus 151 within the horizontal plane. As to a relative elevation, the above-mentioned method according to the present invention should be advantageous since a precision guaranteed by the GPS is relatively inferior. A measurement of the angular position by the position sensor can be applied in totally the same manner to the optical sensor 154a that emits two fan-shaped laser beams of different polarities.

Figure 25:
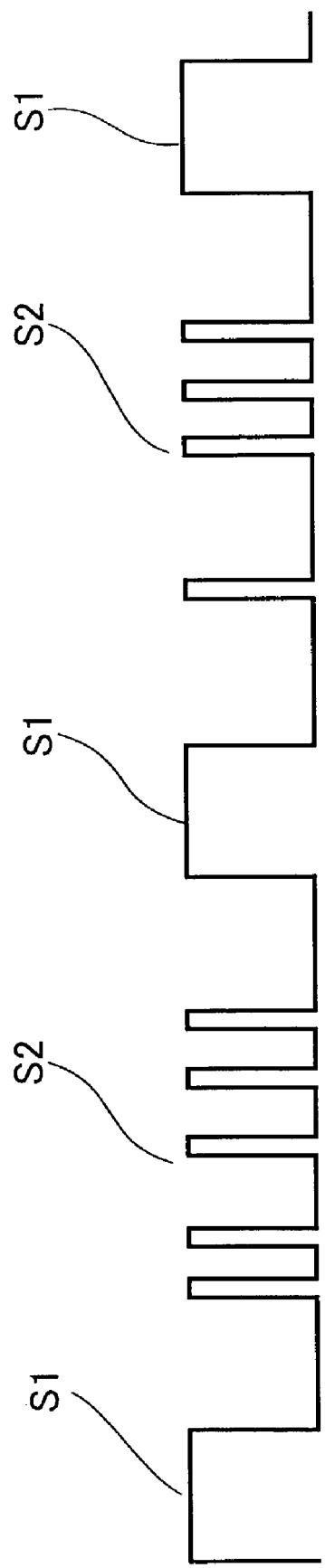
FIG. 25 depicts examples of transmitted signals carrying data on angular positions.

An alternative embodiment shown in FIG. 10 will be described which transmits laser light representing a rotational angular signal. The laser projector 172 emits laser light in a pattern where the laser light comes up and out, thereby transmitting signals carrying data on the angular position. Signals depicted in FIG. 25, for example, are a series of a reference signal S1 and a digital signal S2, and the latter flickers in accord with a digitized code of the angular position. The reference signal S1 is intermittently emitted at the same intervals while the digital signal S2 flickers in the pattern representing the digitized code. The digitized code is the angular position that is detected by the encoder 117 (see FIG. 3) and digitally coded.

In this embodiment, the optical sensor 154a is provided with a light sensing unit that receives light carrying angular information. The light sensing unit includes a color filter to receive only laser beam representing some angular information and is never influenced by the fan-shaped laser beams 152a and 153a. The optical sensor 154a, receiving the signal representing the angular position, uses digital information to obtain the angular position. However, the angular position is given merely by a rough value because the digital signal is intermittently transmitted at certain intervals. Thus, a delay of time between the times of detections of the two fan-shaped beams 152a and 153a and the reference signal S1 is utilized to interpolate the angular position information so as to determine a more accurate angle.

The fan-shaped beams 152a and 153a do not have to be detected at the same time as the laser beam emitted from the laser projector 172. For example, the rotary laser apparatus and the laser projector 172 may emit their respective laser beams, namely, the fan-shaped beams 152a and 153a and the beam carrying an angular signal, in varied directions. In this situation, a delay of time between detections of the fan-shaped beams 152a and 153a and the reference signal S1 is used to compute the angle. In this case, the fan-shaped beams 152a and 153a and the laser light of the laser projector 172 may be identical in wavelength (color), and the light receiving section can be shared among the fan-shaped laser beams 152a and 153 and the laser light carrying angle information.

Moreover, the laser light used to transmit angular information must have a sufficient angle of divergence to cover the whole range where the fan-shaped beams 152a and 153a can be detected to determine positions.

(1.3.4) Optical Sensor Having a Single Light Receiving Section

Either of the optical sensor 154 or 154a may be omitted. In such a case, after a single measurement by the optical sensor having the single light receiving section, the optical sensor is moved by a distance D, and then, the second measurement is carried out. A couple of data from the measurements taken twice are regarded as the detection results obtained at the two light receiving sections in the optical sensor, and the succeeding procedure is performed based upon the same principle of measurement. The distance D by which the optical sensor 154 has been moved is apparent from the scale 160 on the scale rod 159 and the index 163 marked on the box 164. The distance D is, after being read by the scale reader 167 contained by the box 164, transferred to the arithmetic operation unit 166 that determines a state of received light and then used along with other measurements for arithmetic operations. The remaining components and features of the optical sensor are all identical except that the optical sensor has the single light receiving section.

(1.3.5) Optical Sensor Apparatus Having Three or More Light Receiving Sections

Figure 23B:
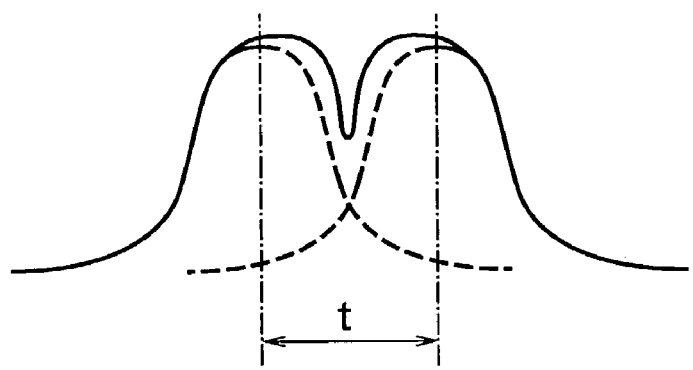
Figure 23C:
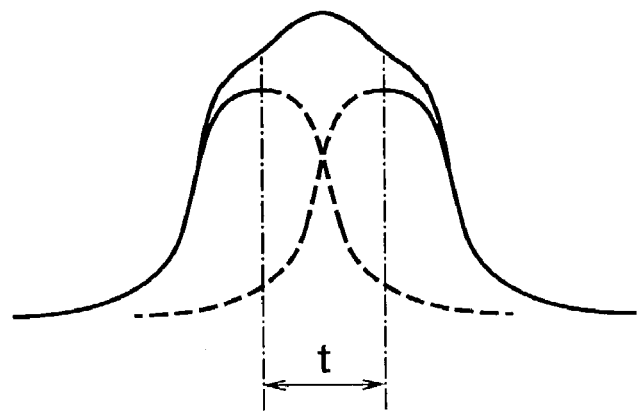

Alternatively, there are three or more light receiving sections in the optical sensor 154 or 154a. This embodiment is configured similar to the above-mentioned optical sensor except for the number of the light receiving sections. In this case, if interference of the signals derived from the two fan-shaped beams takes place in one of the light receiving section as explained in conjunction with FIGS. 23A to 23C, the same would not simultaneously occur in the remaining two or more light receiving sections. Thus, the measurement taken at the light receiving section where the interference is caused is abandoned, but instead the measurements at the remaining light receiving sections are validly used to accomplish an accurate determination if the two fan-beams cannot be identified from their respective polarizations.

Figure 26A:
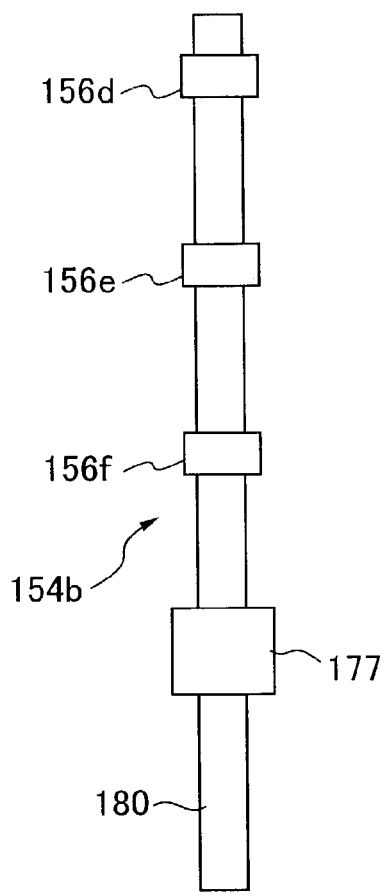
FIGS. 26A to 26F illustrate an embodiment of an omni-directional optical sensor incorporated in the position determining apparatus.
Figure 26B:
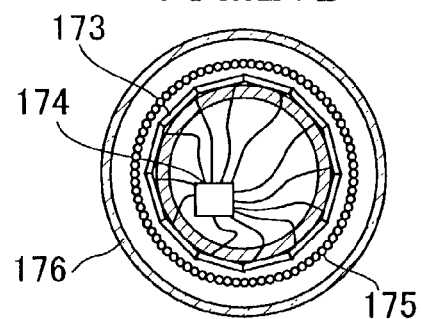
Figure 26C:
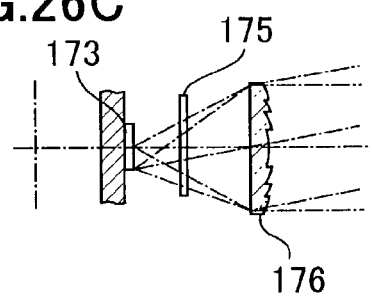
Figure 26D:
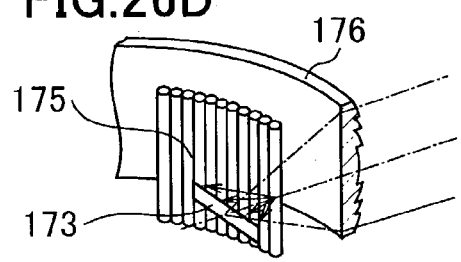
Figure 26E:
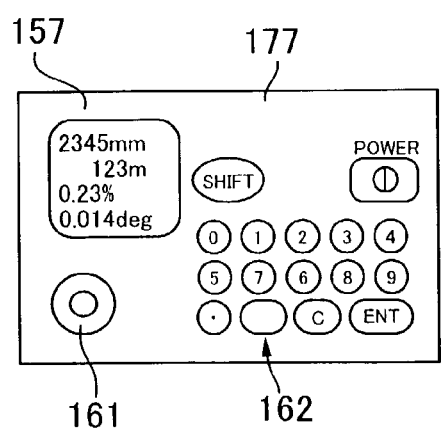
Figure 26F:
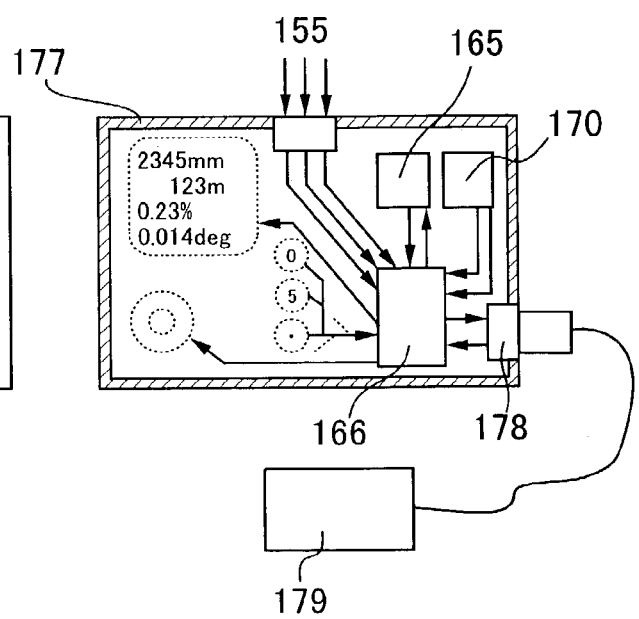

FIGS. 26A to 26F illustrate an embodiment of an omnidirectional optical sensor 154b. As can be seen in FIG. 26A, the omnidirectional optical sensor 154b is comprised of a hole 180, three light receiving sections 155d, 155e and 155f, and an optical sensor controller 177. The three light receiving sections 155d, 155e and 155f are respectively attached to the pole 180 equidistant to each other, and the optical sensor controller 177 is attached to a lower part of the pole. As recognized in FIGS. 26B to 26D, each of the light receiving sections 155d, 155e and 155f has an annular Fresnel lens 176, an annular fiber sheet 175, and annularly chained light receiving elements 173, and these components are all concentrically deployed. Inside the annularly chained light receiving elements 173, a light receiving element controller 174. As shown in FIGS. 26E and 26F, the optical sensor controller 177 has a display 157, an alarm 161 such as a buzzer, entry keys 162, a memory 165, an arithmetic operation unit 166 determining a state of received light, an angle signal receiving unit 170, and a transmitter 178 for external communication. The optical sensor controller 177 may be connected to an external computer through the transmitter 178. Various tasks such as data input, display of measurement results, subsequent process of the measurement results, and the like are performed on the external computer 179.

When the fan-shaped laser beam sweeps any of the light receiving sections, the cylindrical Fresnel lens focuses incident light onto the light receiving elements 173 through the fiber sheet 175. Upon receiving the light, the light receiving elements 173 transmit a signal due to the light to the light receiving element controller 174. The light receiving element controllers 174 built in any of the light receiving sections 155d, 155e and 155f transfer the signal to the optical sensor controller 177. The optical sensor controller 177 processes the signal as the optical sensor 154 does.

(1.4) Operation of Position Determining Apparatus (1.4.1) Procedure of Measuring Positions by Means of Rotary Laser Apparatus and Optical Sensor (1.4.1.1) Measurement by Means of Optical Sensor Having Two Light Receiving Sections A procedure of determining three-dimensional positions by means of the rotary laser apparatus 151 and the optical sensor 154 will be described.

Figure 27:
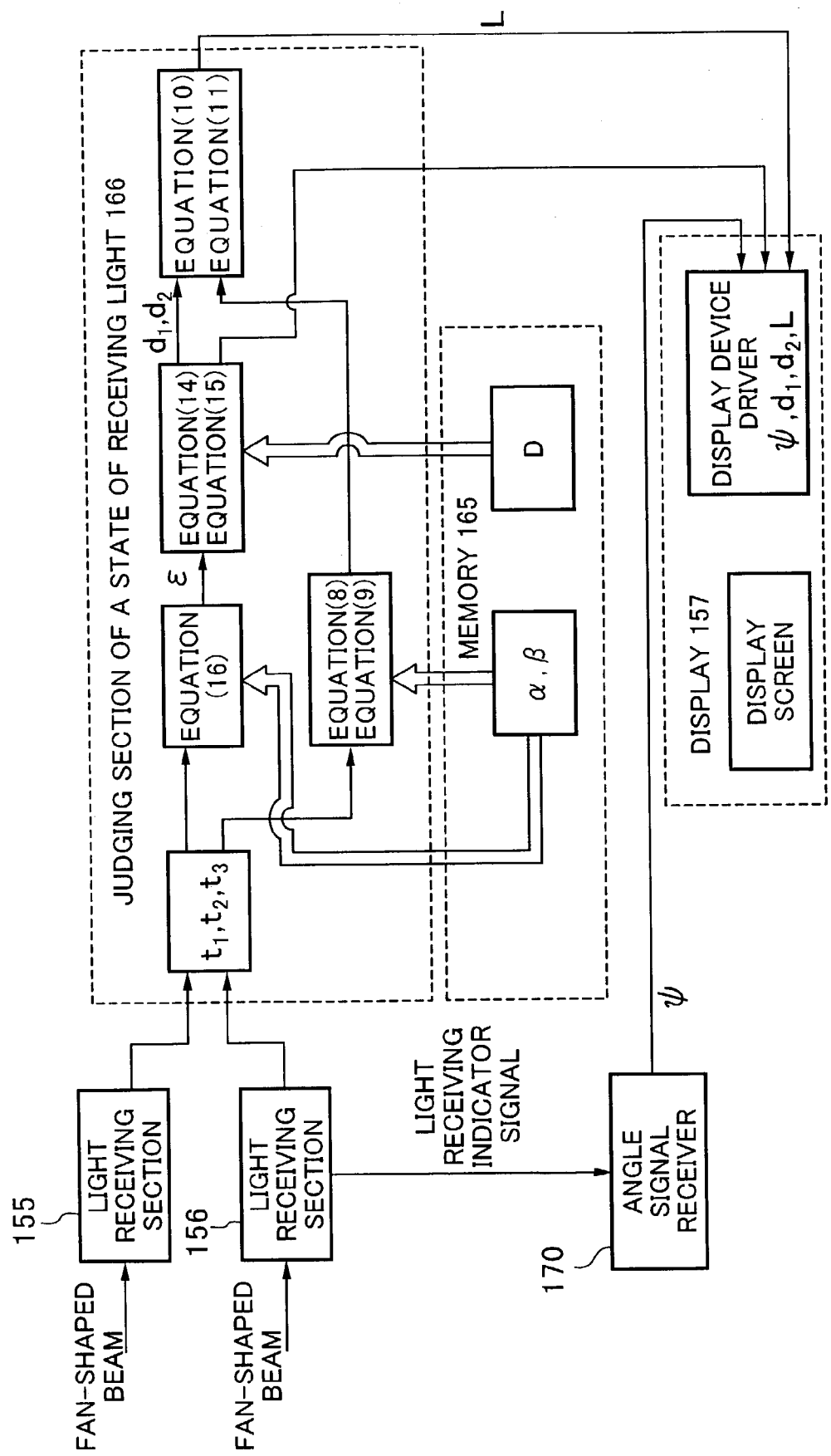
FIG. 27 is a block diagram showing a stepwise procedure of measuring positions according to the present invention.

Using a signal processing procedure depicted in FIG. 27, three-dimensional position measurement is carried out. First, the light receiving sections 155 and 156 receives the fan-shaped beams 152 and 153 emitted from the rotary laser apparatus 151. The light receiving sections 155 and 156, when sensing the beams, produces signals as illustrated in FIG. 19. The signals are transferred to the arithmetic operation unit 166 in the optical sensor 154 to calculate the time delays $t_1$, $t_2$ and $t_3$, respectively. Upon signaling to the arithmetic operation unit 166 that determines a state of received light, a signal representing the beam as been detected is sent to the angle signal receiving unit 170. Receiving this signal from the angle signal receiving unit 170, an angle signal received from the rotary laser apparatus 151 at the very moment is saved. The angle signal represents a relative angle $\Psi$ of the rotary laser apparatus 151 to the optical sensor 154 in the horizontal plane.

The arithmetic operation unit 166 uses the formula (16) to compute an inclination angle $\epsilon$ of the optical sensor 154 in terms of inclination angle $\alpha$ and $\beta$ of the fan-shaped beams 152 and 153 and the time delays $t_1$, $t_2$ and $t_3$, and it uses the formulae (8) and (9) to compute the angle $\gamma_1$ at which straight line passing the emission point C of the fan-shaped beams and the light receiving section 155 meets the horizontal reference plane, and the angle $\gamma_2$ at which straight line passing the point C and the light receiving section 156 meets the horizontal reference plane. The arithmetic operation unit 166 further uses the formulae (14) and (15) to computes vertical distances $d_1$ and $d_2$ from the horizontal reference plane to the light receiving sections 156 and 155, respectively, in terms of the distance D between the light receiving sections 155 and 156 stored in the memory 165, the time delays $t_1$, $t_2$ and $t_3$, and the inclination angle $\epsilon$ computed in advance. Finally, the formulae (10) and (11) are used to compute a distance L from the center point C to the optical sensor 154 in terms of the angles $\gamma_1$ and $\gamma_2$ computed in advance and the vertical distances $d_1$ and $d_2$.

The computation results $\Psi$, $d_1$, $d_2$, and L obtained in this way are transferred to and produced on the display 157, and thus, the three-dimensional relative position of the rotary laser apparatus 151 to the optical sensor 154 can be determined.

(1.4.1.2) Measurement by Means of Optical Sensor Having a Single Light Receiving Section In an embodiment where the single light receiving section is used, after conducting the first measurement, the optical sensor 154 is slid on the level rod 159 by the distance D from an initial position to carry out the second measurement.

As shown in FIG. 14, the box 164 of the optical sensor 154 is slidably attached to the level rod 159 by using a fixing knob 158. The index 163 imprinted or marked in the box 164 and the level rod 159 aid in learning a positional relation of the scale rod 159 and the box 164. With the scale reader 167 provided inside the box 164 of the optical sensor 154, the positional relation of the scale rod 159 and the optical sensor 154 can be perceived and taken by the arithmetic operation unit 166.

The distance D or the displacement of the optical sensor during the measurements taken twice is read by the scale reader 167 and transferred to the arithmetic operation unit 166. In terms of the data on received light and the distance D determined during the first and second measurements, the above-mentioned procedure is used to compute the position of the optical sensor 154.

(1.4.1.3) Measurement by Means of Optical Sensor Having Three or More Light Receiving Sections In an alternative embodiment where there are three or more light receiving sections, three of them receive the fan-shaped beams at the same time. Then, among data of received light, selected are two sets of the data characterized by no signal interference because of a sufficiently long delay of time between the detected fan-shaped beams. Computation after the selection of two sets of the data of received light is completely the same as the procedure illustrated in FIG. 27. In this case, however, the distance D between two of the selected light receiving sections is used for the computation.

An alternative rotary laser apparatus 151a emits two laser beams of different polarizations, and an alternative optical sensor 154a is capable of distinguishing the fan-shaped laser beams of different polarizations one from another. Hence, in the event of a short delay of time between detections of the laser beams, measurement can be accomplished with high accuracy. In this case, also, the measuring procedure is the same as that in the aforementioned embodiment.

(1.4.2) Other Measurement Procedures

Figure 28:
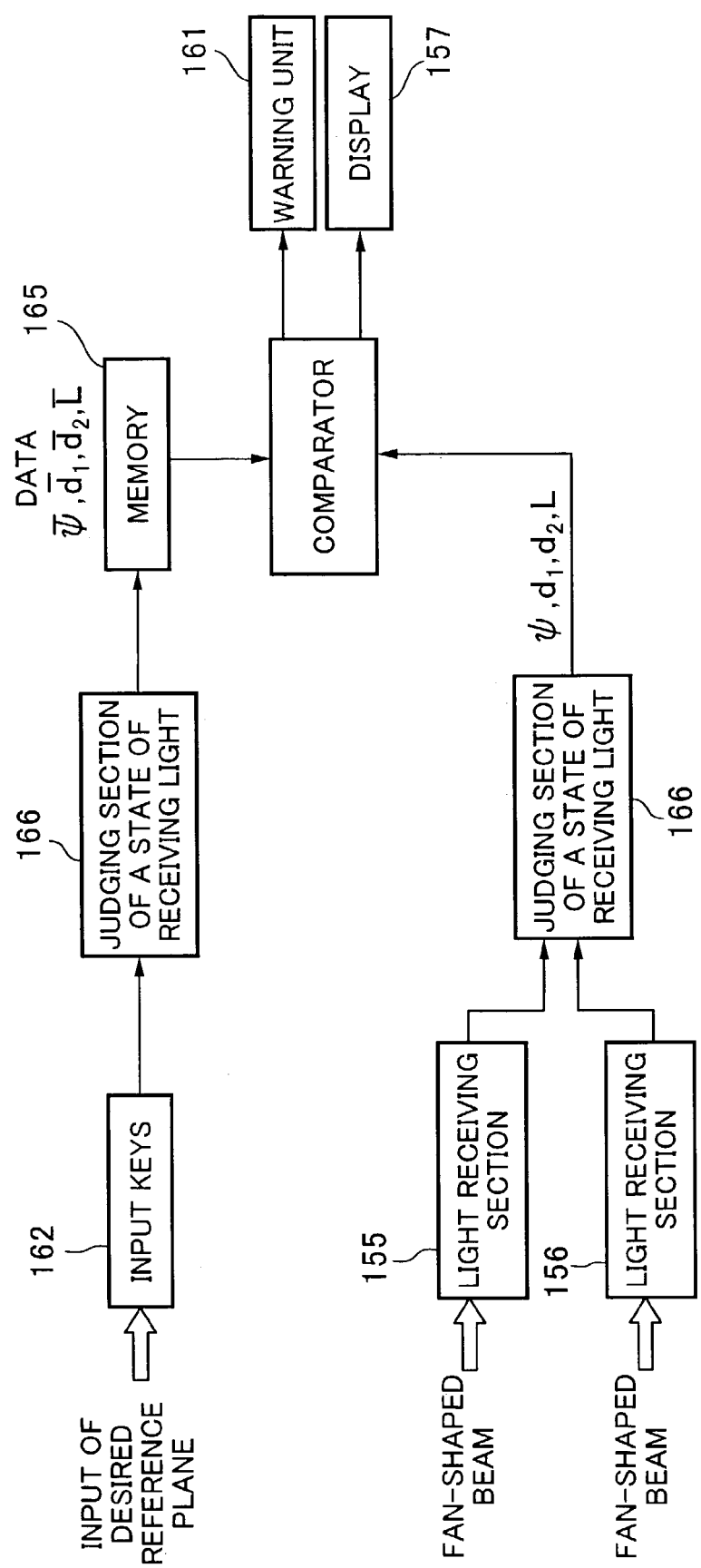
FIG. 28 is a block diagram showing another stepwise procedure of measuring positions according to the present invention.

Other embodiments of the position determining apparatus will be described with reference to FIG. 28. An operator of the position determining apparatus enters the intended or desired reference plane or reference conical surface on the entry keys 162. In terms of input data on the reference plane, two-dimensional coordinates in the desired reference plane are computed in the arithmetic operation unit 166, and the results are stored in the memory 165. Then, the rotary laser apparatus 151 is activated to have the fan-shaped laser beams 152 and 153 sweep the optical sensor 154. The arithmetic operation unit 166 in the optical sensor 154, using data on the delay of time between detections of the fan-shaped beams, computes components of three-dimensional position coordinates, $\Psi$, $d_1$, $d_2$ and L, through the above mentioned procedure. The computation results are transferred to a comparator to compare them with the coordinates of the desired reference plane that have been calculated and stored in the memory 165 in advance. If those coordinates are identified, the alarm unit 161 such as a buzzer is signaled to let the operator know the comparison result. In this way, the operator learns whether the optical sensor 154 is in the desired reference plane. Giving an instruction to make the display indicate a difference between the desired reference plane and the current position of the optical sensor 154, a seek for any preset plane can be facilitated. Thus, circular conical reference faces of any gradient, reference planes of any inclination, and horizontal plane at any elevation can be produced with the rotary laser apparatus being centered in the topographic area of interest.

The measurement procedure as mentioned above is similarly effective in other applications where the optical sensor emits two fan-shaped laser beams of different polarities and where the optical sensor has three or more of the light receiving sections.

(1.5) Other Advantages of the Position Determining Apparatus of the Invention In the prior art rotary laser apparatus, it is merely determined whether the light receiving section is located in the horizontal plane onto which laser beams are directed or it is in a given inclined plane, and therefore, the single laser projector is insufficient to produce two or more different plane simultaneously. On the contrary, the rotary laser apparatus used in the position determining apparatus according to the present invention is capable of determining elevations in relation with the fan-shaped laser beams, and therefore, using more than one optical sensors 154 at the same time enables detecting several reference positions of any elevation as desired in a single circular sweep of the laser beams. Thus, in an application of construction sites, the single rotary laser apparatus permits pursuit of tasks in several positions in the identical working area; that is, it enables more than one construction machines to simultaneously conduct various tasks to level the ground. Additionally, since the identical rotary laser apparatus controls more than one construction machines, undesired functions or malfunctions of the construction machines due to interference by other laser apparatus can be advantageously avoided.

(2) Embodiment 2

In a position determining apparatus incorporated with the prior art rotary laser apparatus, it is merely determined whether the light receiving section is located in the horizontal plane onto which laser beams are directed or it is in a given inclined plane, and therefore, the single laser projector is insufficient to level simultaneously two or more areas of different plane. On the contrary, the rotary laser apparatus used in the position determining apparatus according to the present invention is capable of determining elevations in relation with the fan-shaped laser beams, and therefore, it enables more than one construction machines each having the optical sensor 154 to simultaneously level the ground in several positions for any elevation as desired in a single circular sweep of the laser beams.

Moreover, with the position determining apparatus according to the present invention, not only the ground of horizontal surfaces but of slopes or contours can be leveled easily and assuredly without expertise skills of the worker. Additionally, since the identical rotary laser apparatus controls more than one construction machines, undesired functions or malfunctions of the construction machines due to interference by other laser apparatus can be advantageously avoided.

(2) Embodiment 2

In the following discussion, varied or modified points of a second preferred embodiment of the present invention from the first embodiment will be emphasized. Thus, any of particulars and details omitted herein has already been discussed in terms of the first embodiment.

(2.1) Entire Structure of the Position Determining Apparatus

Figure 29:
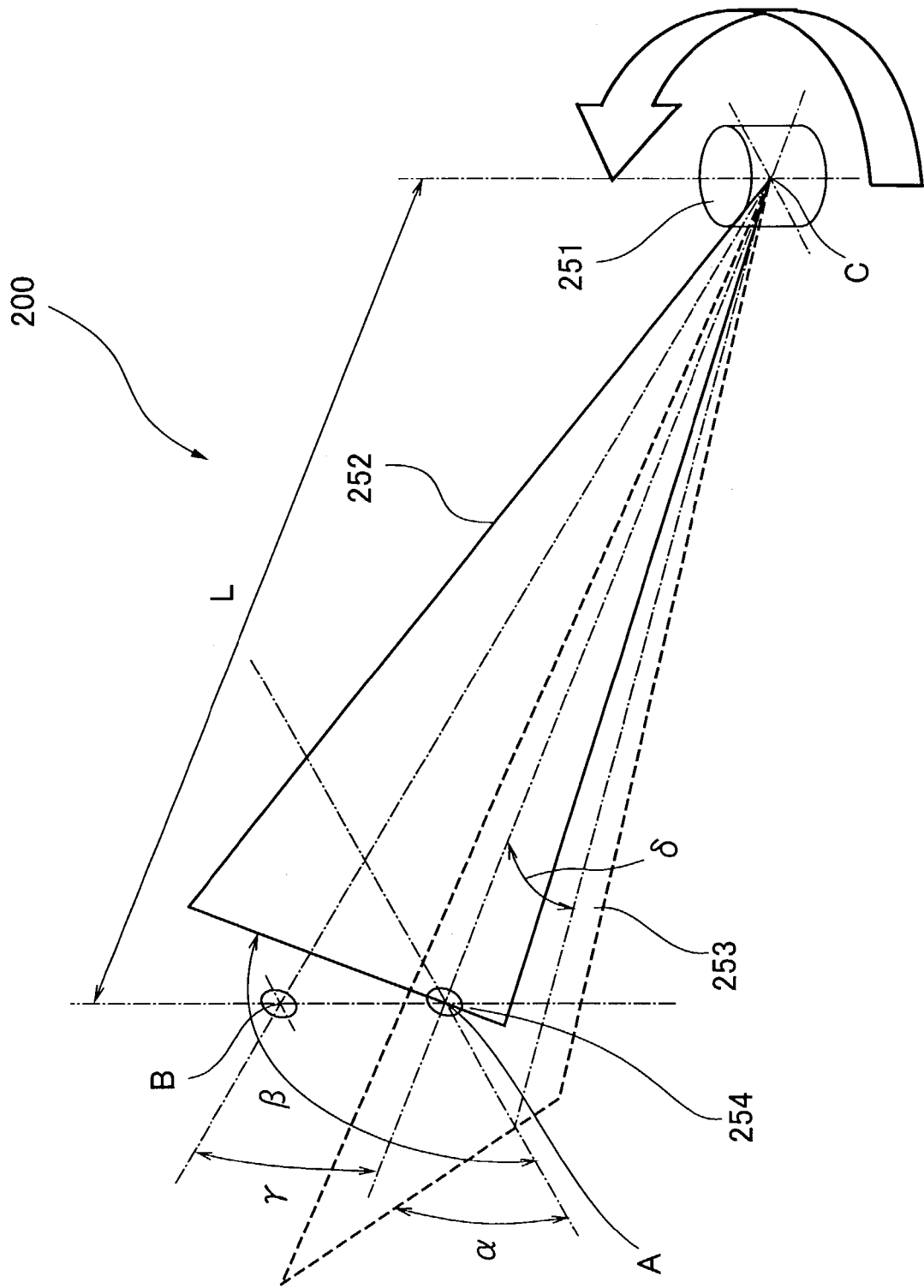
FIG. 29 is a perspective schematic view showing a second preferred embodiment of the position determining apparatus according to the present invention.

In the second preferred embodiment according to the present invention, as shown in FIG. 29, a position determining apparatus 200 has a rotary laser apparatus 251 and an optical sensor 254. The rotary laser apparatus 251 emits the fan-shaped beams 252 and 253 while rotating about the center point C, and the optical sensor 254 detects fan-shaped laser beams 252 and 253. Emission angles of the fan-shaped beams and other factors are all similar to those in the first embodiment.

Figure 30:
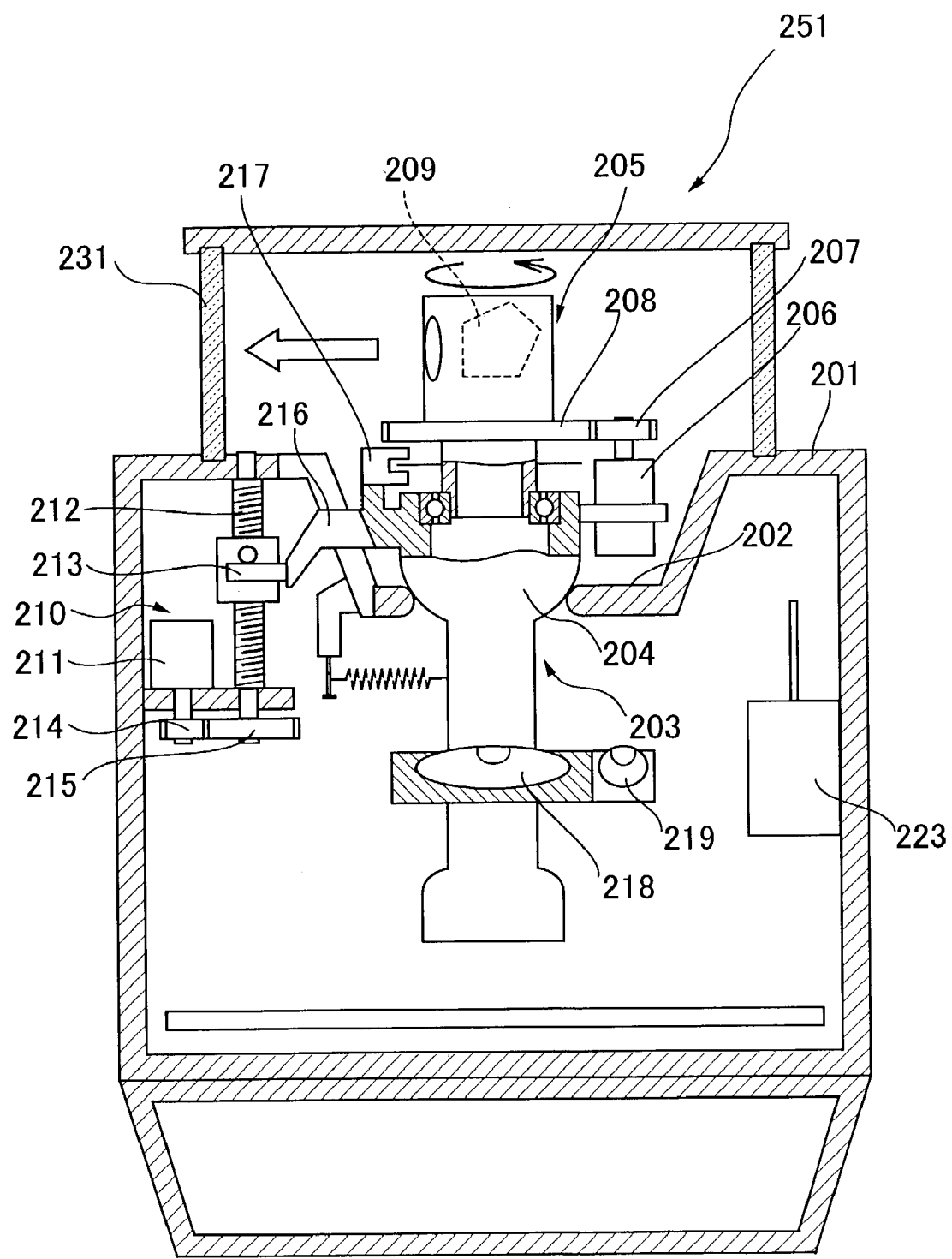
FIG. 30 is a sectional view showing a rotary laser apparatus in the second preferred embodiment of the present invention.

(2.2) FIG. 30 shows the rotary laser apparatus 251 in the second preferred embodiment that emits the fan-shaped laser beams of different wavelengths. In the second preferred embodiment of the present invention, components other than a laser projector 203 and its rotary unit 205 are similar to those in the first embodiment. All the remaining components shown in FIG. 30 corresponding to their counterparts in the first embodiment are denoted by reference numerals all of which have a prefixed 2 to lower two digits instead of 1.

Although two fan-shaped beams of different polarities are used in the first embodiment, two fan-shaped beams of different wavelengths are used in the second embodiment.

In the second embodiment, two fan-shaped beams 252 and 253, before emitted from the rotary laser apparatus, are modulated to be different in wavelength from each other so that they can be distinguished from each other. In such a manner, the similar effect to that attained with two differently polarized fan-shaped laser beams can be obtained.

Figure 31:
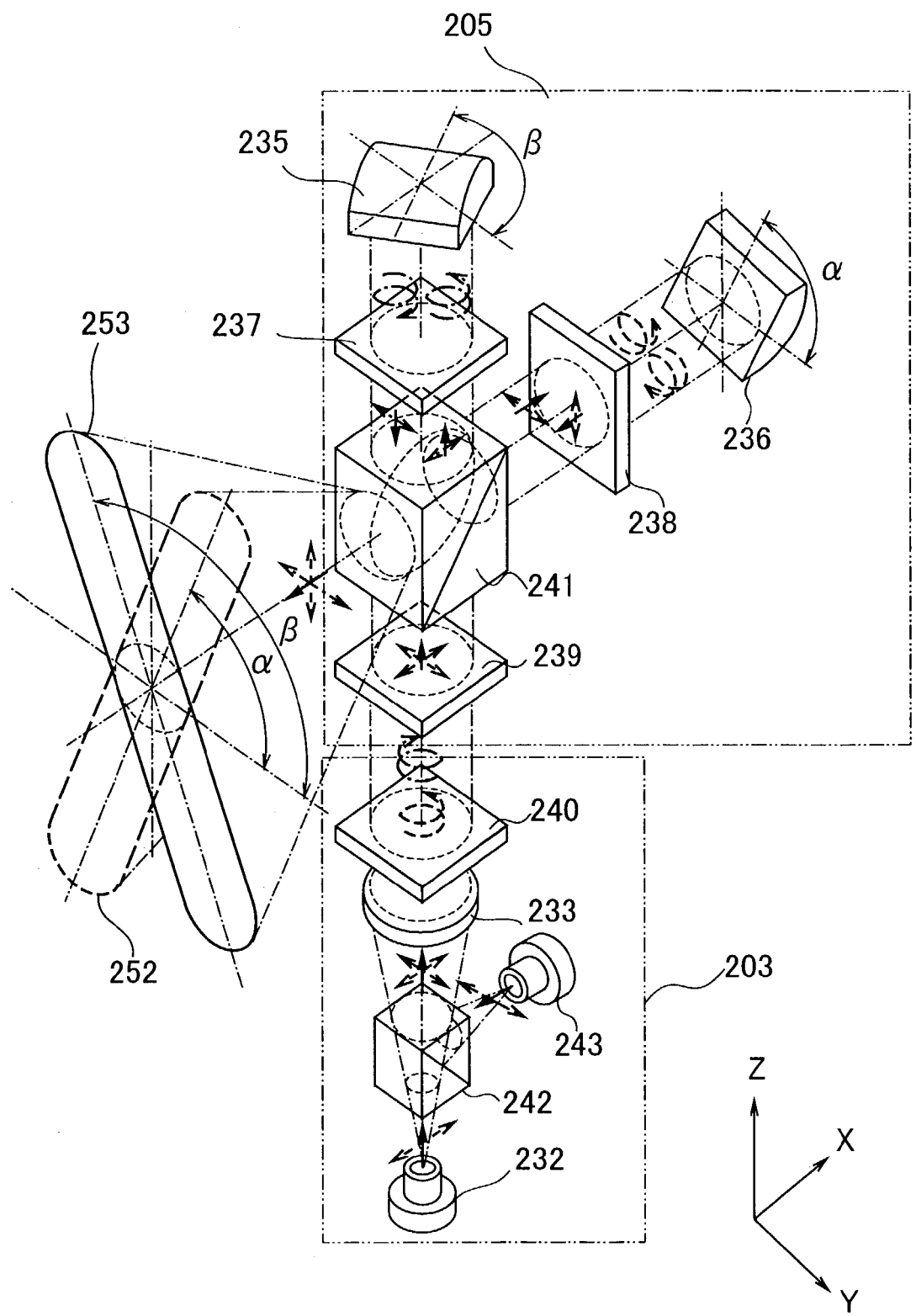
FIG. 31 is an exploded view of the rotary laser apparatus that emits two laser beams of different wavelengths in the second preferred embodiment of the present invention.

FIG. 31 depicts the laser projector 203 and the rotary unit 205 in the rotary laser apparatus 251 according to the present invention. As shown in FIG. 31, the laser projector 203 is incorporated with two laser illuminators 232 and 243, which emit light of different wavelengths. When laser illuminators 232 and 243 are laser diodes, the emitted laser beams are linearly polarized. In FIG. 31, a direction of polarization of the laser beam from the laser illuminator 232 is denoted by broken line while a direction of polarization of the laser beam from the laser illuminator 243 is designated by dot-dash line. The laser beams are guided into a polarized beam splitter 242. The polarized beam splitter 242 transmits laser light that is emitted from the laser illuminator 232 and polarized in an X-direction, and it reflects laser light that is emitted from the laser illuminator 243 and polarized in a Y-direction orthogonal to the X-direction. The laser beams transmitted through or reflected from the polarized beam splitter 242, after collimated by a shared collimator lens 233, fall upon a one-quarter (¼) wave plate 240. The one-quarter wave plate 240 is oriented so that the laser beams from the laser projector 203 are of reversely circular polarization to each other. The laser beams transmitted through the one-quarter wave plate 240 are, after falling on a one-quarter wave plate 239, linearly polarized.

Although the rotary unit 205 is rotatably supported, this does not affect the laser beams emitted therefrom since they are circularly polarized, and the beams transmitted through the additional one-quarter wave plate 239 assume linear polarizations of which directions are determined by the one-quarter wave plate 239. The laser beams transmitted through the one-quarter wave plate 239 fall on the polarized beam splitter 241. The beam splitter 241 reflects the laser light from the laser illuminator 232 and transmits the laser light from the laser illuminator 243.

Falling on the one-quarter wave plate 238, the reflected laser light is circularly polarized and then reflected by a cylinder mirror 236. The cylinder mirror 236 is oriented so that the laser beam emitted from the rotary unit 205 meets the horizontal plane at angel a. The laser light reflected from the cylinder mirror 236 is transmitted through the one-quarter wave plate 238 again, and when exiting, the resultant light is polarized in a direction turned by 90° from the light incident upon the plate. Thus, the laser light is, after transmitted through the one-quarter wave plate 238, transmitted through the polarized beam splitter 241 and then projected out of the rotary unit 205.

The laser light transmitted through the polarized beam splitter 241 is, after falling on the one-quarter wave plate 237, circularly polarized and then reflected from the cylinder mirror 235. The cylinder mirror 235 is oriented so that the laser beam projected out of the rotary unit 205 meets the horizontal plane at an angle β. The laser light reflected from the cylinder mirror 235 is transmitted through the one-quarter wave plate 237 again, and when exiting, the resultant light is polarized in a direction turned by 90° from the laser light incident upon the plate. In this way, the laser light is, after transmitted through the one-quarter wave plate 237, reflected by the polarized beam splitter 241 and then projected out of the rotary unit 205.

The polarized beam splitter 242 may be a die clock mirror.

(2.3) Optical Sensor

Figure 32A:
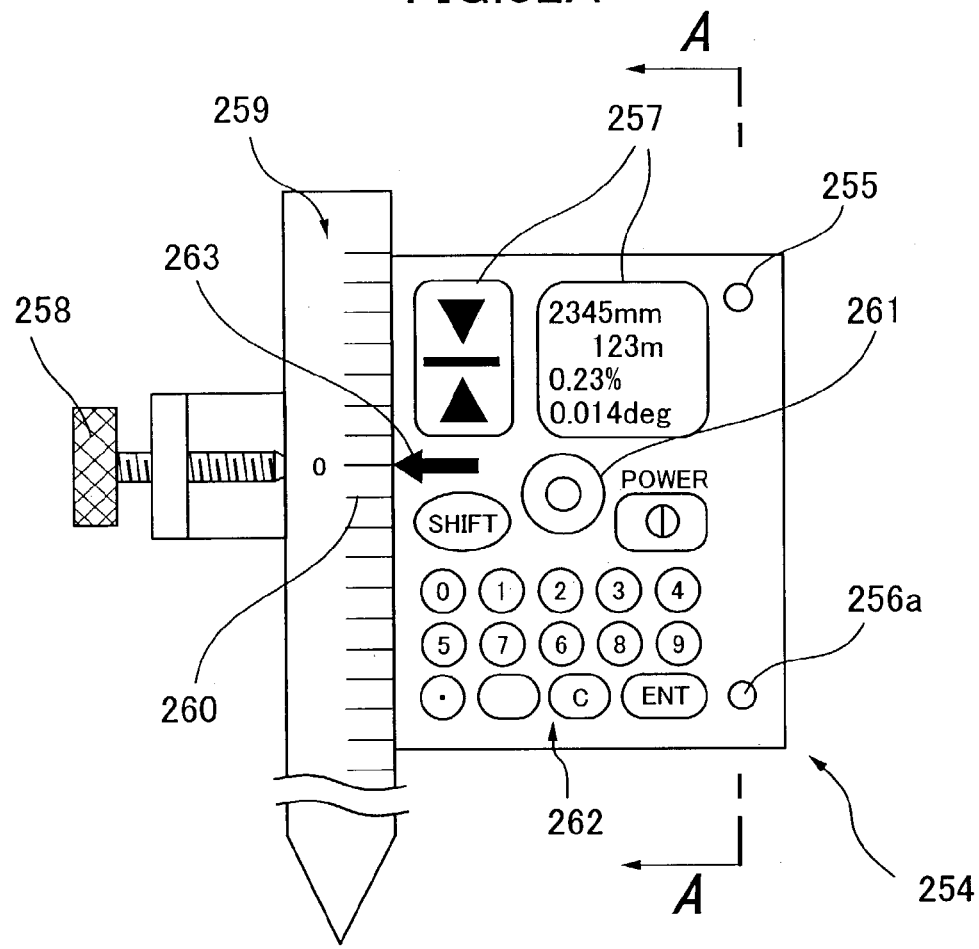
FIGS. 32A, 32B depict an arrangement of the light receiving section in a light receiving unit when the rotary laser apparatus is used in the second preferred embodiment of the present invention.
Figure 32B:
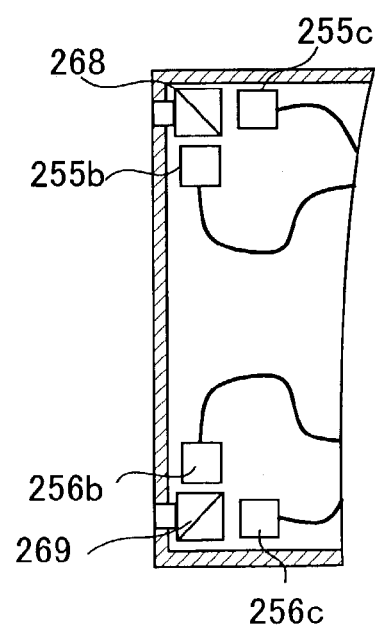

FIG. 32A is a front view showing an optical sensor 254 in the second embodiment of the present invention, and FIG. 32B is a sectional view taken along the line A—A of FIG. 32A. All the components are similar to those in the first embodiment except the light receiving section which identifies light from different wavelengths. All the remaining components shown in FIGS. 32A, 32B corresponding to their counterparts in the first embodiment are denoted by reference numerals all of which have a prefixed 2 to lower two digits instead of 1.

As shown in FIGS. 32A, 32B, the optical sensor 254 in the second embodiment identifies and distinguishes the fan-shaped beams 252 and 253 incident upon the light receiving sections 255 and 256 from their respective wavelengths. The light receiving sections 255 and 256 have die clock mirrors 268 and 269, respectively, that transmit or reflect laser light, depending upon the wavelengths of the incident laser beams. Light receiving sections 255c and 256c are provided for light transmitted through the die clock mirrors 268 and 269 while light receiving sections 255b and 256b are provided for light reflected from the mirrors, thereby distinguishing the wavelengths of the incident laser light.

(2.4) Operation of the Second Embodiment of the Position Determining Apparatus

The measurement procedure explained in terms of the first embodiment of the present invention may be used without change and modification in an application of the second embodiment of the present invention, namely, the position determining apparatus 200.

(3) Embodiment 3

In the following discussion, varied or modified points of a second preferred embodiment of the present invention from the first embodiment will be emphasized. Thus, any of particulars and details omitted herein has already been discussed in terms of the first embodiment.

(3.1) Entire Structure of the Position Determining Apparatus

Figure 33:
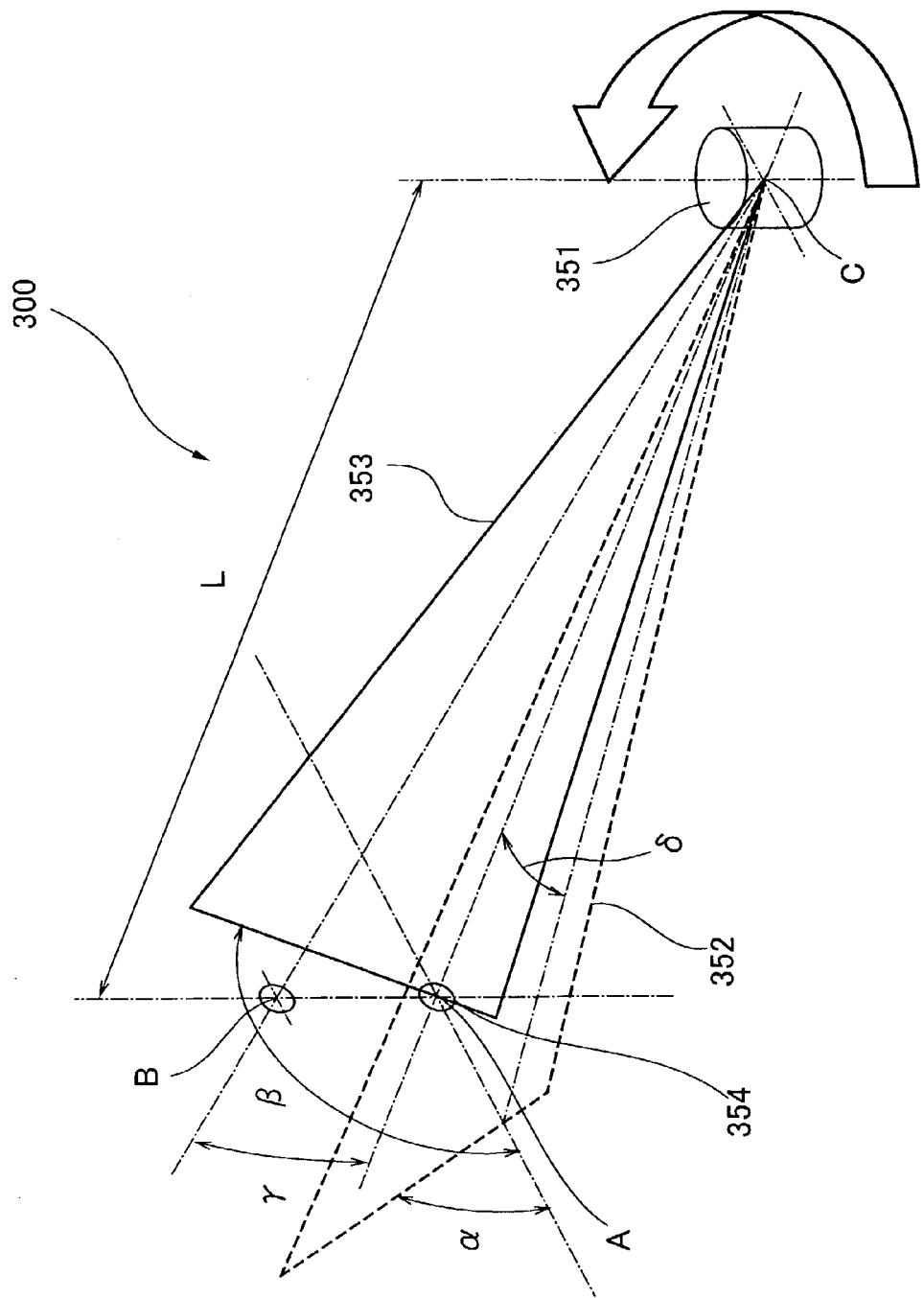
FIG. 33 is a perspective schematic view showing a third preferred embodiment of the position determining apparatus according to the present invention.

The third embodiment of the position determining apparatus according to the present invention will be outlined. As shown in FIG. 33, the third preferred embodiment, namely, a position determining apparatus 300 includes a rotary laser apparatus 351 and an optical sensor 354. The rotary laser apparatus 351 rotates about the point C while emitting diverging or fan-shaped beams 352 and 353, and the optical sensor 354 receives the fan-shaped beams 352 and 353. Details such as emission angles of the fan-shaped beams are all similar to those in the first embodiment.

Figure 34:
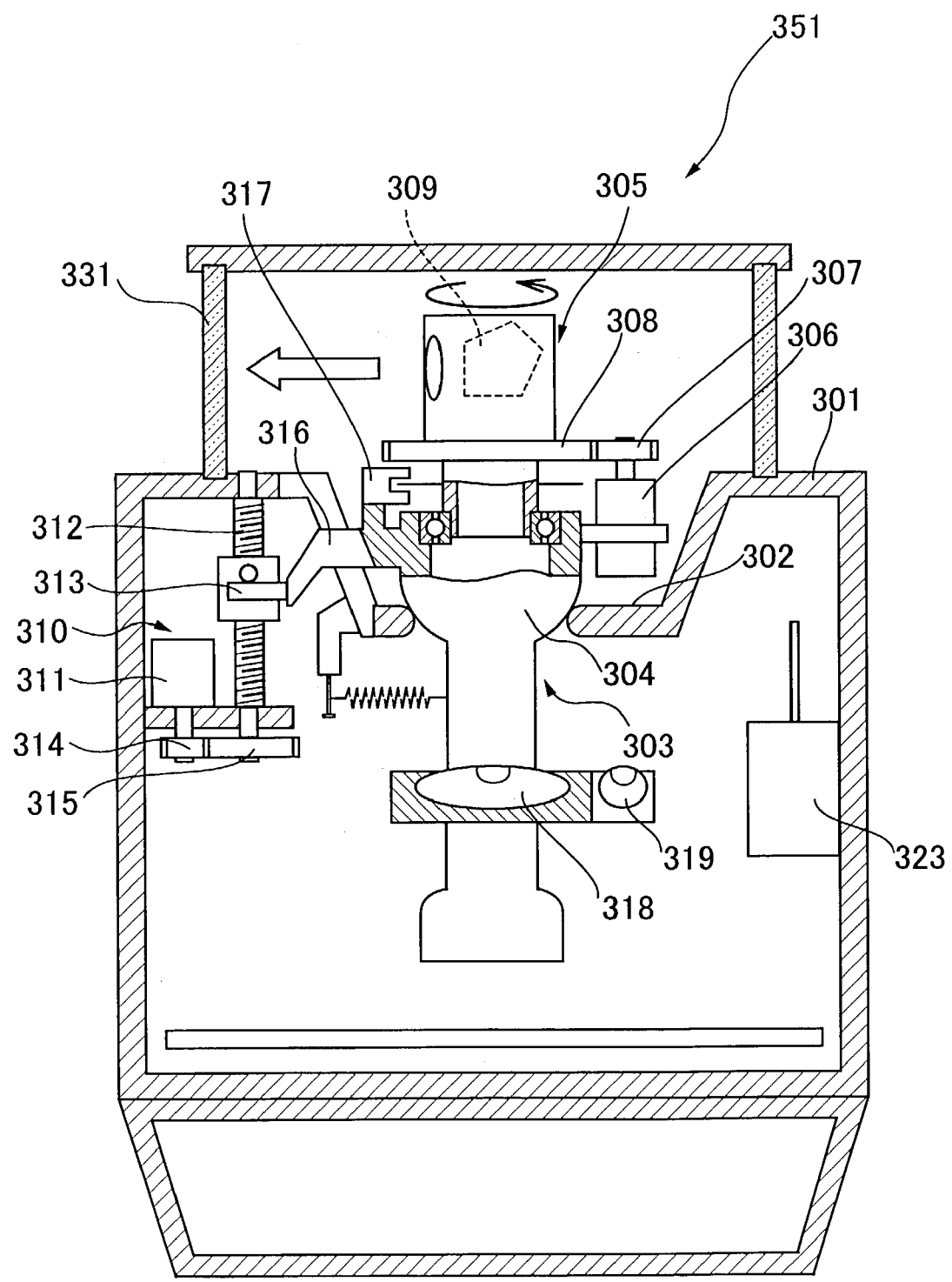
FIG. 34 is a sectional view of the rotary laser apparatus in the third preferred embodiment of the present invention.

(3.2) Rotary Laser Apparatus Emitting Two Fan-Shaped Laser Beams Modulated into Different Frequencies The third preferred embodiment, or namely, the rotary laser apparatus 351 is shown in FIG. 34. All the other components other than a laser projector 303 and a rotary unit 305 are similar to those in the first embodiment. In the third embodiment, all the remaining components shown in FIG. 33 corresponding to their counterparts in the first embodiment are denoted by reference numerals all of which have a prefixed 3 to lower two digits instead of 1.

Although the two fan-shaped beams of different polarizations are used in the first embodiment, two fan-shaped beams modulated into different frequencies are used in the third embodiment.

In the third embodiment, two fan-shaped beams 352 and 353 emitted from the rotary laser apparatus 351 are modulated to be different in frequency, so that the two beams can be distinguished from each other. Modified in this fashion, the similar effects to those attained by using the two fan-shaped beams of different polarizations can be obtained.

Figure 35:
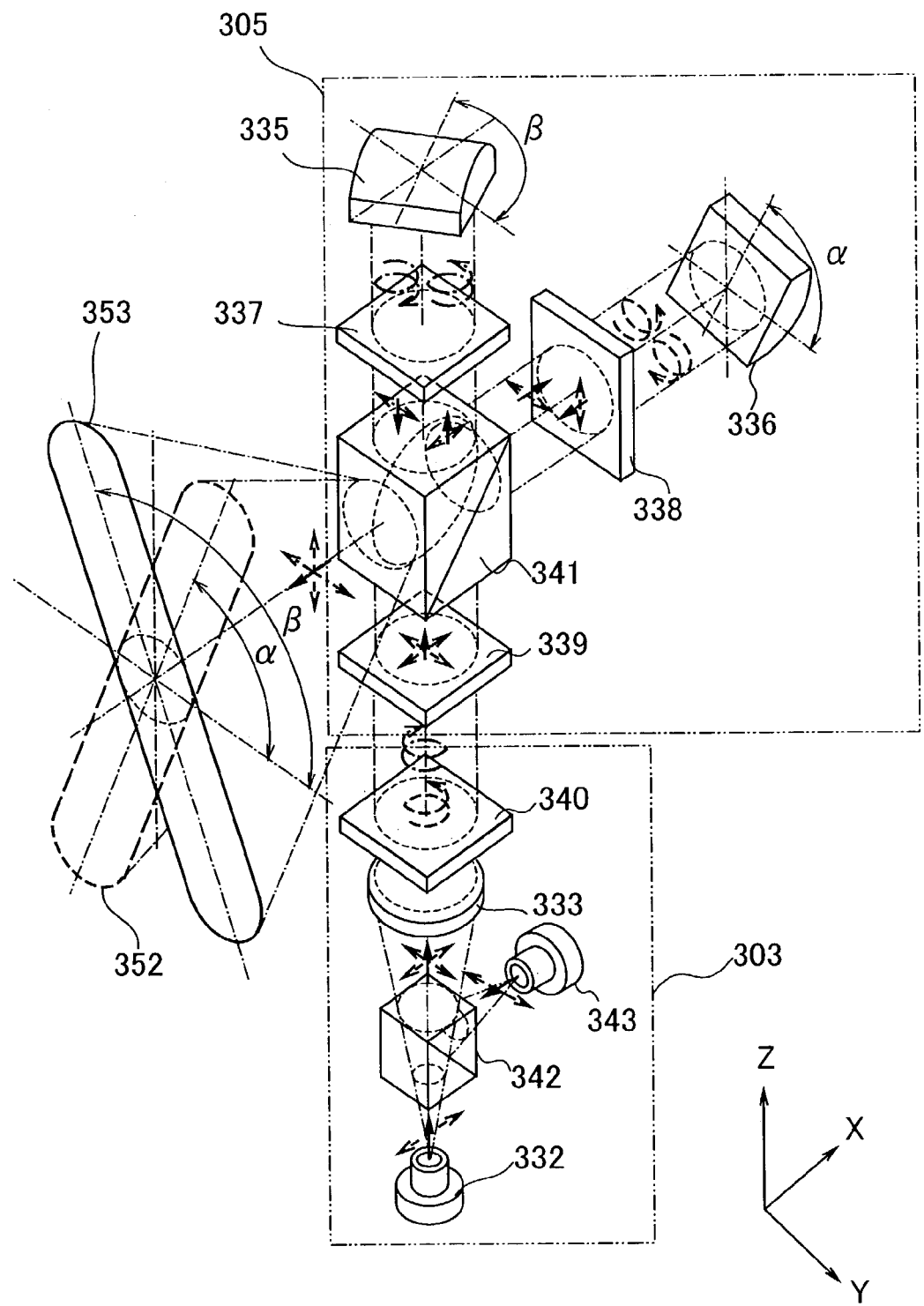
FIG. 35 is an exploded view of the rotary laser apparatus that emits two laser beams modulated into different frequencies in the third preferred embodiment of the present invention.

The laser projector 303 and the rotary unit 305 of the rotary laser apparatus 351 are shown in FIG. 35. As can be seen in FIG. 35, the laser projector 303 has two laser illuminators 332 and 343 which emit beams modulated into different frequencies. When the laser illuminators 332 and 343 are laser diodes, laser beams from them are linearly polarized. In FIG. 35, a polarization direction of laser light emitted from the laser illuminator 332 is denoted by broken line while a polarization direction of laser light emitted from the laser illuminator 343 is designated by dot-dash line. Optical system projecting laser light from the laser illuminators 332 and 343 is similar to that of the second embodiment.

(3.3) Optical Sensor

Figure 36A:
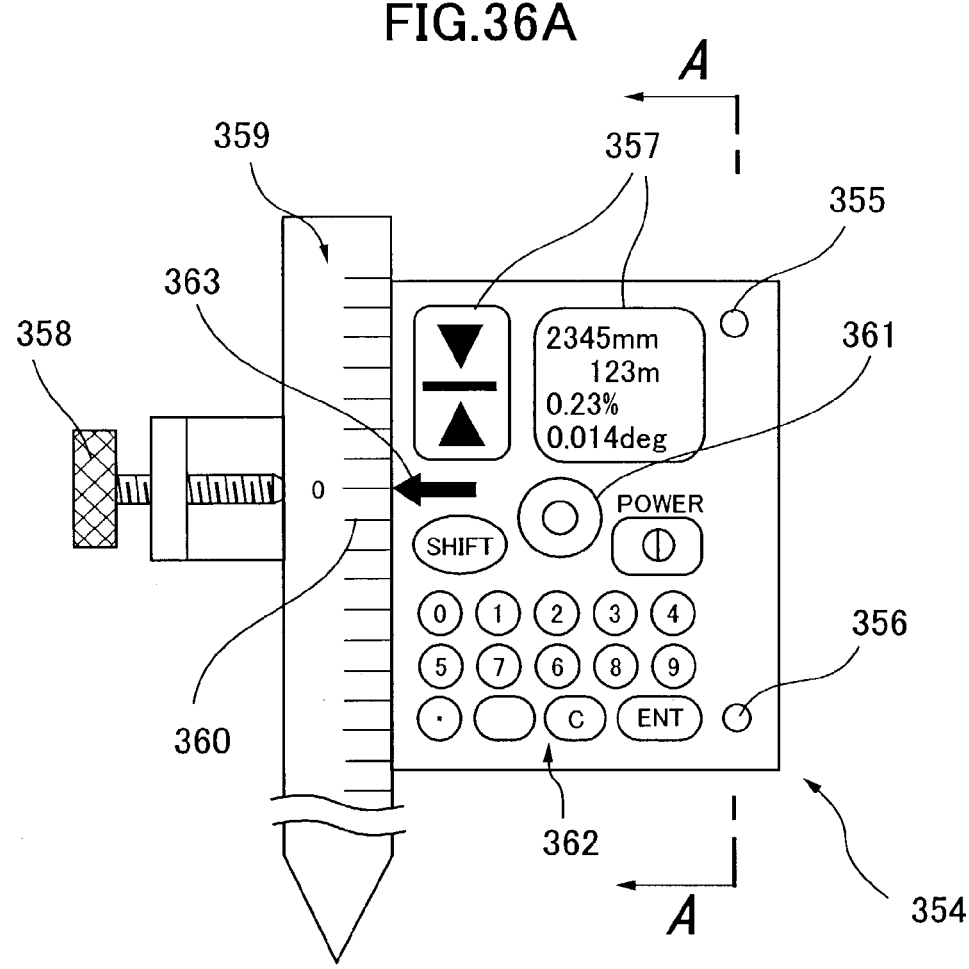
FIGS. 36A, 36B depict an arrangement of the light receiving section in a light receiving unit when the rotary laser apparatus is used in the third preferred embodiment of the present invention.
Figure 36B:
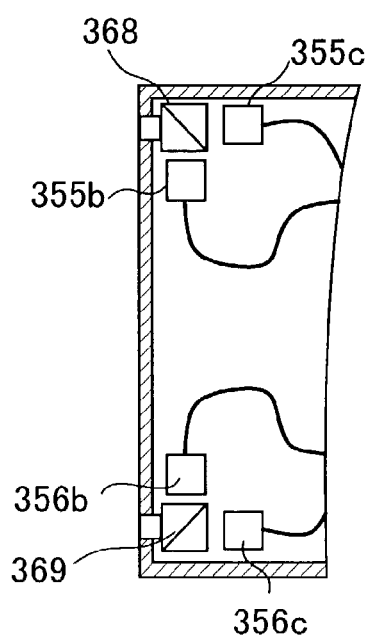

FIG. 36A is a front view showing an optical sensor 354 in the third embodiment of the present invention, and FIG. 36B is a sectional view taken along the line A—A of FIG. 36A. All the components are similar to those in the first embodiment except the light receiving section which identifies light from varied frequencies. All the remaining components shown in FIGS. 36A, 36B corresponding to their counterparts in the first embodiment are denoted by reference numerals all of which have a prefixed 3 to lower two digits instead of 1.

As shown in FIGS. 36A, 36B, the optical sensor 354 in the third embodiment has an arithmetic operation unit 366 that judges a state of received light, and it is used to identify and distinguish the fan-shaped beams 352 and 353 incident upon the light receiving sections 355 and 356 from their respective frequencies. The light receiving sections 355 and 356 have beam splitters 368 and 369, respectively, that transmit or reflect laser light, depending upon the frequencies of the incident laser beams. Light receiving sections 355c and 356c are provided for light transmitted through the beam splitters 368 and 369 while light receiving sections 355b and 356b are provided for light reflected from the splitters, thereby distinguishing the frequencies of the incident laser light.

(3.4) Operation of the Third Embodiment of the Position Determining Apparatus

The measurement procedure explained in terms of the first embodiment of the present invention may also be used without change and modification in an application of the third embodiment of the present invention, namely, a position determining apparatus 300.

(3.4.1) Modulation of Diverging Beams and Detection of Modulated Beams

Figure 37:
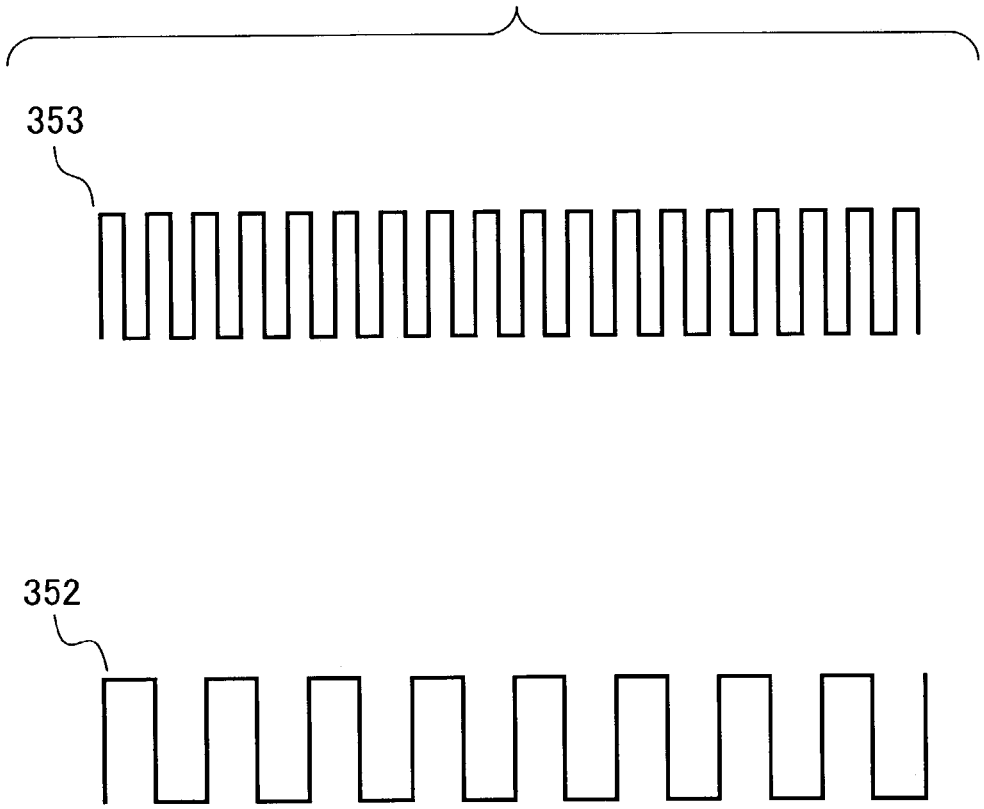
FIG. 37 depicts an example of two laser beams of different modulated frequencies.
Figure 38:
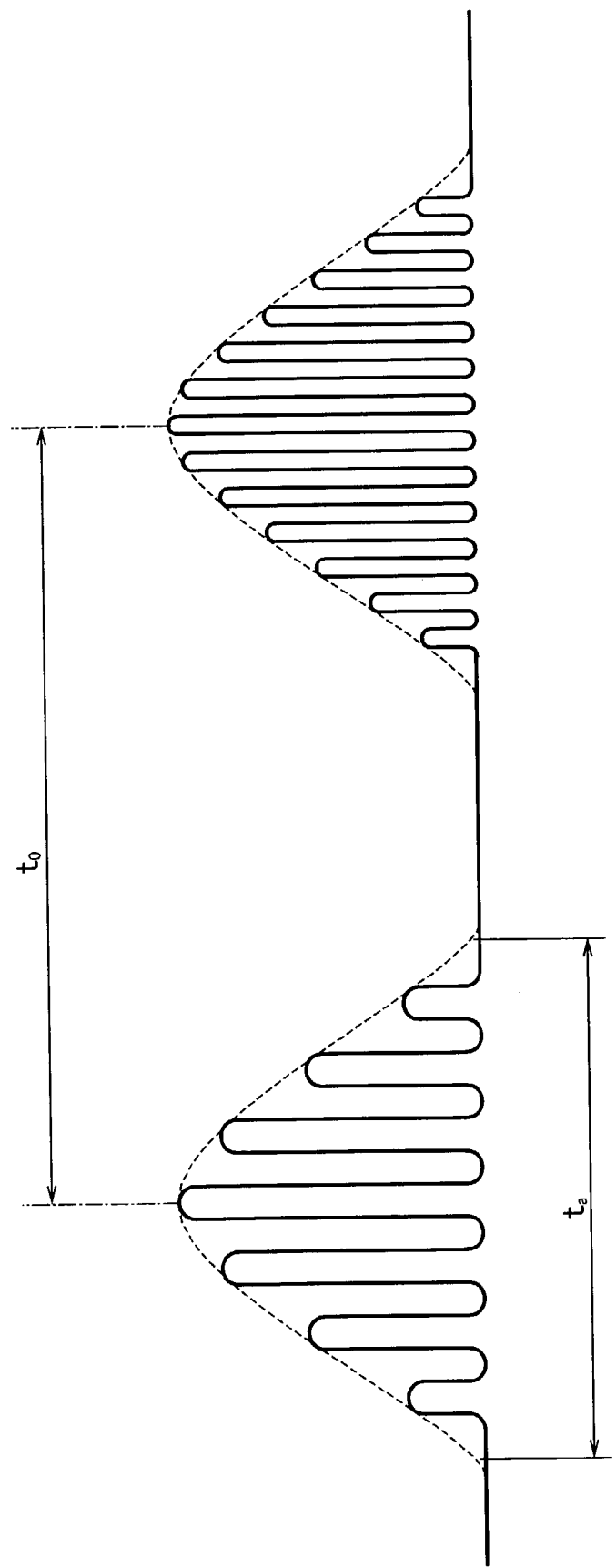
FIG. 38 depicts an example of two fan-shaped laser beams of different modulated frequencies detected at the light receiving section.

A manner of modulation of the two diverging or fan-shaped beams 352 and 353 will be described. The fan-shaped beams are, as illustrated in FIG. 37, modulated to come up and out in frequencies varied from each other. FIG. 38 shows an example of the fan-shaped beams 352 and 353 detected at the light receiving sections, respectively. Cycles of the flickering fan-shaped beams must be sufficiently varied from each other to distinguish the fan-shaped beams from each other. The cycles of the flickering should be sufficiently shorter than a period of time $t_a$ required to make the fan-shaped beams 352 and 353 sweep the light receiving sections 355 and 356 in the optical sensor 354. Detection signals of the fan-shaped beams 352 and 353 received at the light receiving sections are processed into expanded waves as represented by broken line in FIG. 38 so as to obtain a delay of time $t_0$ between detections of the fan-shaped beams 352 and 353.

The optical sensor is provided with a modulated frequency determining circuit, and the fan-shaped beams 352 and 353 are distinguishably detected. The modulated frequency determining circuit counts the number of pulses of each laser beam detected in a predetermined period of time to determine the modulated frequencies with which the two fan-shaped beams are identified. Distinguishing the two fan-shaped beams 352 and 353 upon detections permits a determination of whether the optical sensor is above or below the horizontal reference plane by a single measurement even if the optical sensor has only one light receiving section.

Figure 39:
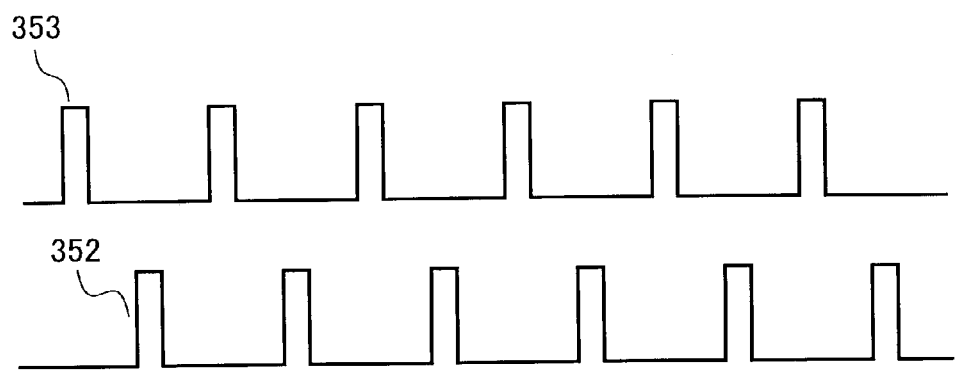
FIG. 39 depicts an example of two laser beams modulated to come up alternately.
Figure 40:
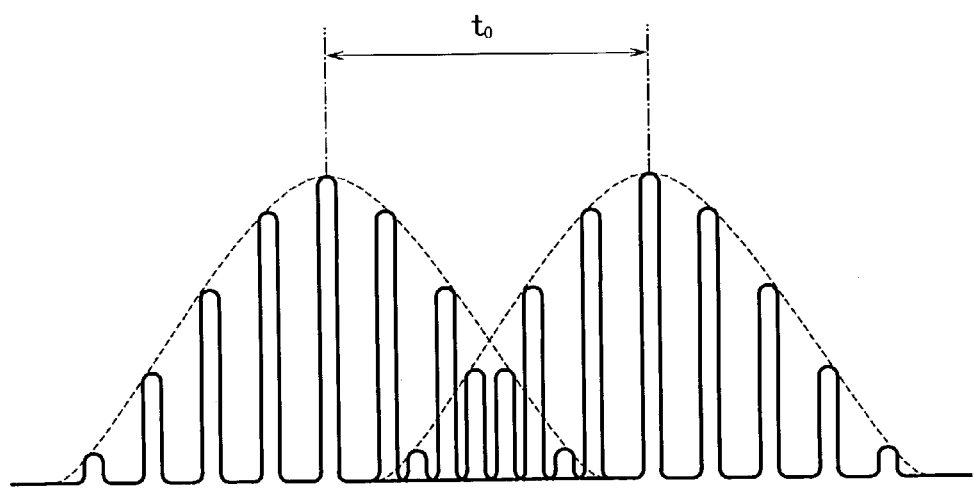
FIG. 40 depicts an example of signals when two laser beams, which are modulated to illumine alternately, are received at the light receiving section.

Alternatively, as shown in FIG. 39, the fan-shaped beams 352 and 353 may be modulated to illumine alternately. Modulated in this manner, the two fan-shaped beams, if detected one after another with a short delay of time, can be distinguished as can be seen in FIG. 40, and the time delay to can be determined with accuracy.

Figure 41:
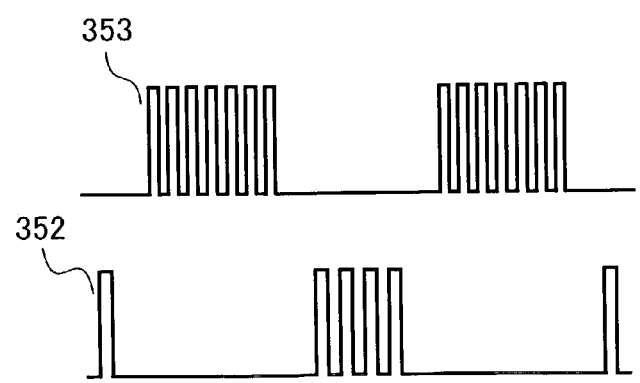
FIG. 41 depicts an example of two laser beams modulated to come up alternately and modulated to be of different frequencies.

Further alternatively, a modulation of combined modulation properties as in FIGS. 37 and 39 may be applied. Specifically, as shown in FIG. 41, the fan-shaped beams 352 and 353 are first modulated to illumine alternately and thereafter further modulated to flicker at fractions of cycles during which the fan-shaped beams continue to illumine. The cycles of the alternate lighting superposed with the fractions of the cycles of the flickering span alternate between the two fan-shaped beams 352 and 353. Modulated in this manner, the two fan-shaped beams 352 and 353 are distinguishable from each other, which enables a determination if the optical sensor is above or below the horizontal reference plane. Moreover, the time delay to between detections of the fan-shaped beams, if short, can be determined accurately.

(4) Other Embodiments (4.1) Variations of the Fan-Shaped Beams

Although in all the aforementioned embodiments, the rotary laser apparatus that emits two fan-shaped beams is detailed, the position determining apparatus may be completed with an alternative rotary laser apparatus that emits three or more fan-shaped laser beams simultaneously. In such a situation, two of the fan-shaped beams are appropriately selected to take a measurement in completely the same manner as in the aforementioned embodiments.

FIGS. 42A to 42J depict exemplary emission patterns of the fan-shaped beams. FIGS. 42A to 42J show cross sections of the fan-shaped beams viewed from the optical sensor where dot-dash line denotes the horizontal reference plane. In terms of the aforementioned embodiments, FIGS. 42C to 42J depicts various emission patterns of the three or more fan-shaped beams. Intersections of the fan-shaped beams with the horizontal reference plane are preferably spaced equidistant from one another. As for the emission patterns in FIG. 42A to FIG. 42C, the fan-shaped beams are not overlapped when the optical sensor is in the horizontal plane, and hence, the time delay among detections can be accurately determined without modulating the fan-shaped beams into different polarizations from one another.

Also, when emitted in the patterns as in FIGS. 42C to 42G and FIGS. 42I and 42J, three of the fan-shaped beams are sequentially detected one after another with time delays that are equivalent to each other if counted in the horizontal plane, and this is why finding the horizontal reference plane is facilitated. Also, as stated above, two of the fan-shaped laser beams may be appropriately selected among all to take a measurement in completely the same manner as in the aforementioned embodiments; that is, since a rate of the two time delays can be correlated with only one combination of an angular position of the optical sensor relative to the horizontal plane, finding the rate of one of the time delays to the other can directly lead to the angle of the optical sensor relative to the horizontal plane. When only two fan-shaped laser beams are considered, the rotary cycle T is required to obtain the angles, but not if three or more fan-shaped beams are used. This proves that the aforementioned embodiments can attain an accurate measurement without being affected by a rotation error of the rotary laser apparatus.

Figure 42A:
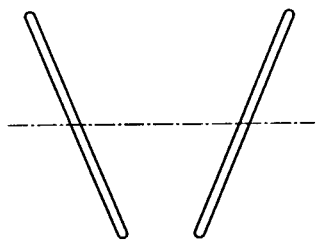
FIGS. 42A to 42J illustrate exemplary emission patterns of fan-shaped laser beams.
Figure 42B:
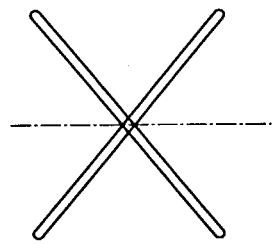
Figure 42C:
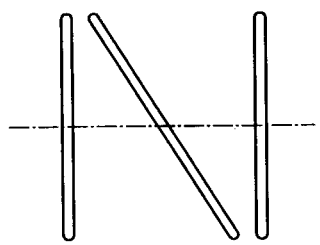
Figure 42D:
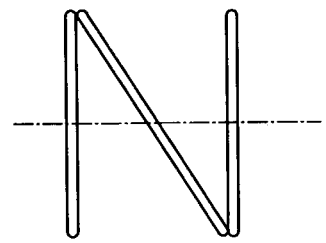
Figure 42E:
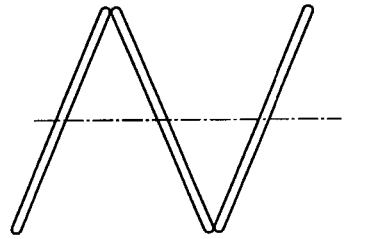
Figure 42F:
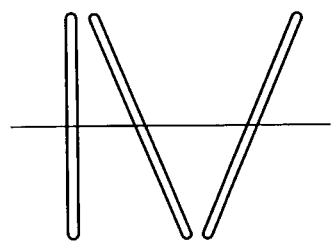
Figure 42G:
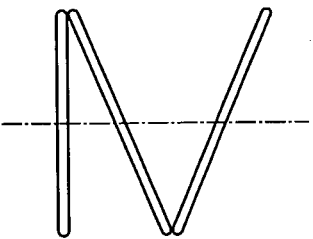
Figure 42H:
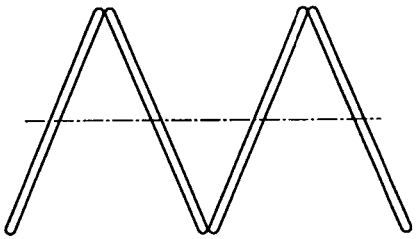
Figure 42I:
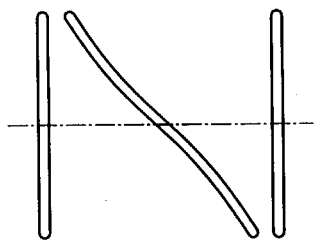
Figure 42J:
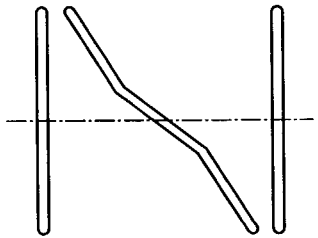

Patterned as in FIG. 42H, a sequential sensing of four of the fan-shaped beams produces three delays of time from one detection to another, and averaging them results in enhancing measurement accuracy. Patterning the beams as in FIGS. 42I and 42J, sensitivity of the optical sensor is varied from detections of light in the vicinity of the horizontal plane to detections in other areas. For instance, although a minor deviation of the optical sensor from the horizontal plane causes a large variation in the time delays between detections in the vicinity of the horizontal plane, a vertical displacement of the optical sensor does not influence the delays so much at levels far apart from the horizontal plane. In this way, the horizontal reference plane can be accurately detected from the time delays between detections at the optical sensor. In this specification, laser beams, like laser beams in the middle in FIGS. 42I and 42J, spreading into a curved or creased plane are referred to as fan-shaped beams. As for curved or creased fan-shaped beams, an inclination angle of the fan-shaped laser beam is an inclination of tangent passing an arbitrary point on the curved or creased plane.

A computation of finding an elevation from the horizontal reference plane based upon the received fan-shaped beams is carried out by repeating the aforementioned computation procedure in terms of arbitrary two of the fan-shaped beams for the emission patterns in FIGS. 42C to 42H. As to the emission patterns in FIGS. 42I and 42J, the computation procedure is appropriately changed to obtain the elevation from the horizontal reference plane.

Figure 43:
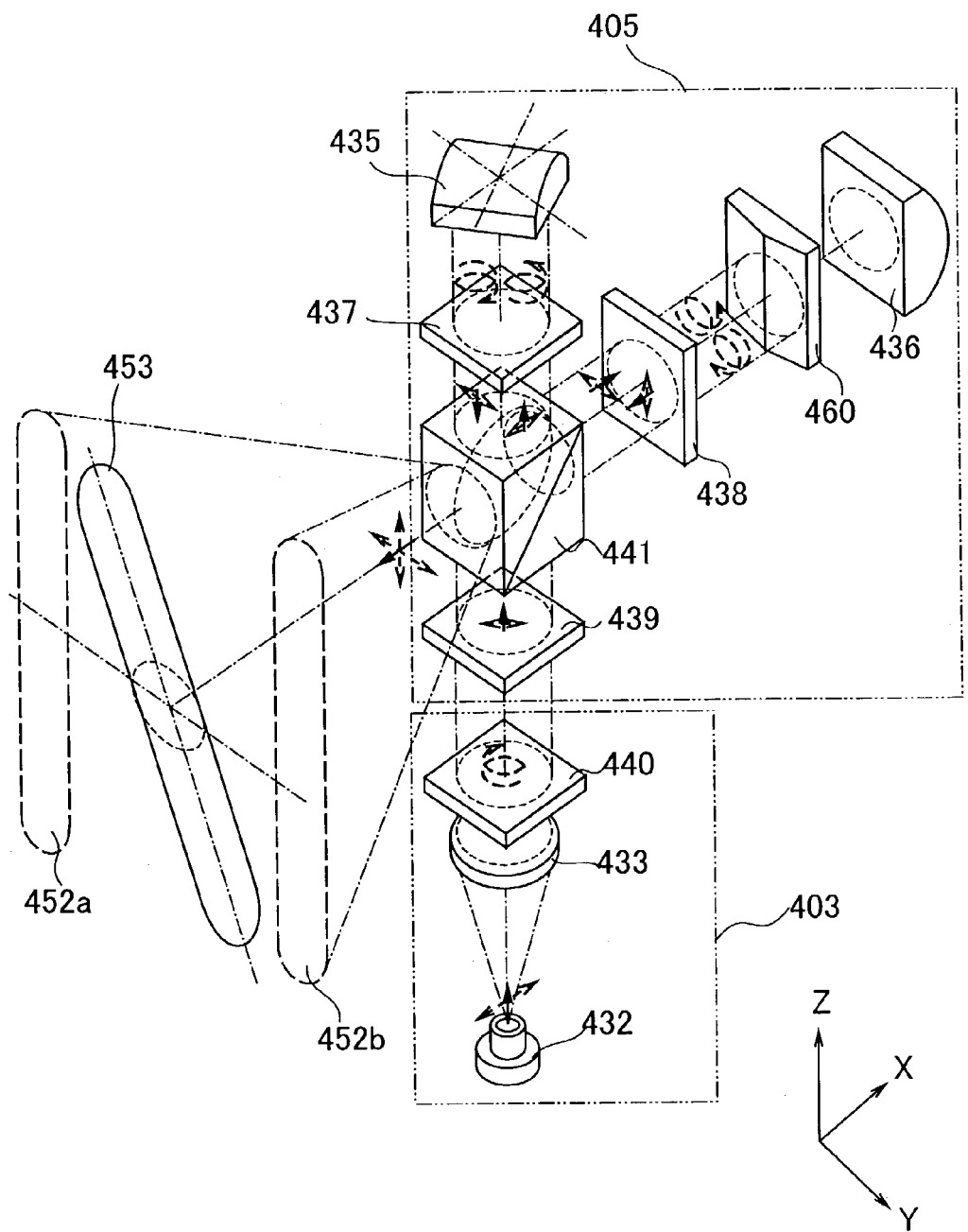
FIG. 43 is an exploded perspective view showing a laser light projector and a rotary unit in combination that rotationally emit three fan-shaped laser beams.

The emission patterns are all implemented, as shown in FIG. 6, by providing an appropriate diffraction grating across an optical path in the optical system emitting the fan-shaped beams. Without the diffraction grating, the aforementioned emission patterns can also be created. FIG. 43 shows an embodiment of a laser projector 403 and a rotary unit 405 of the rotary laser apparatus that produces the fan-shaped beams patterned as in FIG. 42C. In FIG. 43, all the components corresponding to their respective counterparts of the first embodiment are denoted by reference numerals having a prefix 4 to lower two digits instead of 1. Laser beam, after emitted from the laser illuminator, passes a collimator lens 433 and one-quarter (¼) wave plates 440 and 439 and then falls upon a polarized beam splitter 441. The laser beam incident upon the polarized beam splitter 441, which, in part, is transmitted through the same, is transmitted through a one-quarter wave plate 437 and reflected by a cylinder mirror 435, and thereafter, transmitted through the one-quarter wave plate 437 again to fall on the polarized beam splitter 441. The incident laser light is reflected by the beam splitter 441, and thus, a fan-shaped beam 453 is projected, meeting the horizontal reference plane at an inclination of β.

On the other hand, the laser light, which exits the one-quarter wave plate 439 and falls on the polarized beam splitter 441, is in part reflected by the beam splitter 441 and then falls upon a one-quarter wave plate 438. The laser light incident upon the one-quarter wave plate 438, after passing the same, is transmitted through a deflecting prism 460 and then reflected by a cylinder mirror 436. The cylinder mirror 436 is oriented so that it projects fan-shaped beam diverging vertically. The laser light reflected by the cylinder mirror 436 reenters the deflecting prism and is shaped into two fan-shaped beams that diverge vertically. The fan-shaped beams are transmitted through the one-quarter wave plate 438 and the beam splitter 441, and thus, fan-shaped beams 452a and 452ba are projected.

Figure 44:
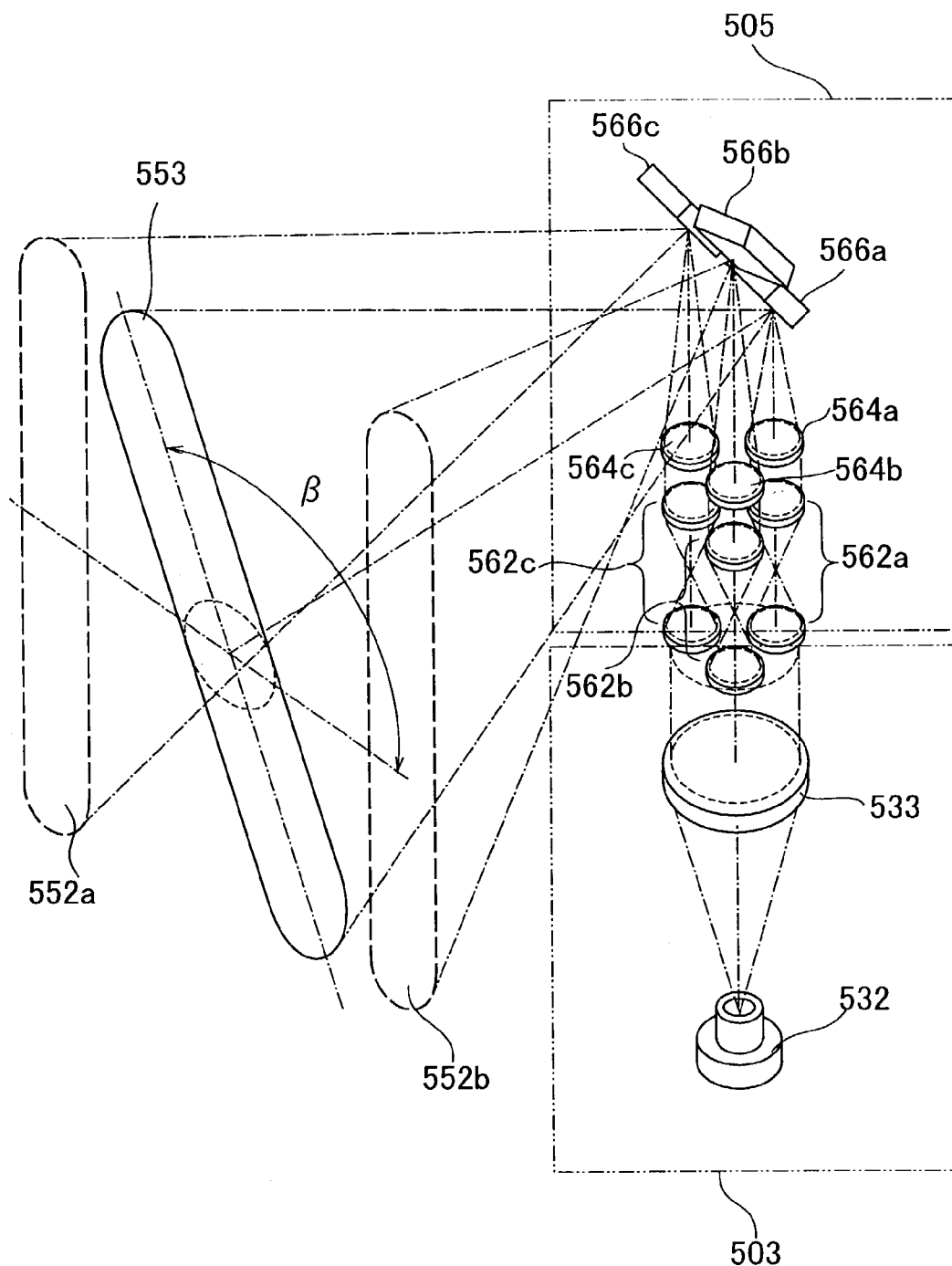
FIG. 44 is an exploded perspective view of another embodiments of the laser light projector and the rotary unit that rotationally emit three fan-shaped laser beams.

With reference to FIG. 44, discussed now will be varied or modified embodiments of the laser illuminator and the rotary unit of the rotary laser apparatus that emits the diverging or fan-shaped beams patterned as in FIG. 42C. A laser projector 503 of this embodiment includes a laser illuminator 532 and a collimator lens 533. A rotary unit 505 of this embodiment has three equi-magnification beam expanders 562a, 562b and 562c, three cylindrical lenses 564a, 564b and 564c, and three mirrors 566a, 566b and 566c.

Laser light emitted from the laser illuminator 532 is collimated by the collimator lens 533. The laser light transmitted through the collimator lens 533 falls on the three equi-magnification beam expander 562a, 562b and 562c of the rotary unit 505. The laser beam incident upon the equi-magnification beam expander 562 is declined at a predetermined ratio. The laser light transmitted through the equi-magnification beam expander 562a, 562b and 562c is split and spread into fan-shaped beams 553, 552b and 552a by the cylindrical lens 564a, 564b and 564c, respectively. The fan-shaped laser beams exiting the cylindrical lens 564a, 564b and 564c are reflected by the mirrors 566a, 566b and 566c, respectively, and projected in directions orthogonal to the rotation axis of the rotary laser apparatus, respectively.

In this situation, since the laser light is once reflected by the mirror 566 after transmitted through the equi-magnification beam expander 562, a deflection angle of the laser beam is simply dependent upon a deflection angle in transmission through the rotary unit 505. Thus, emission directions of the fan-shaped beams 553, 552b and 552a are not influenced by maladjustment between the laser illuminator 503 and the rotary unit 505. In some application, for the purpose of shielding from light other than laser beam emitted from the laser projector 503 and entering the equi-magnification beam expander 562, a shield mask (not shown) may be provided beneath the equi-magnification beam expander 562. Alternatively, for the purpose of shielding from light other than laser beam emitted from the laser illuminator 532 and entering the collimator lens 533, a shield mask (not shown) may be provided between the laser illuminator 532 and the collimator lens 533.

Figure 45:
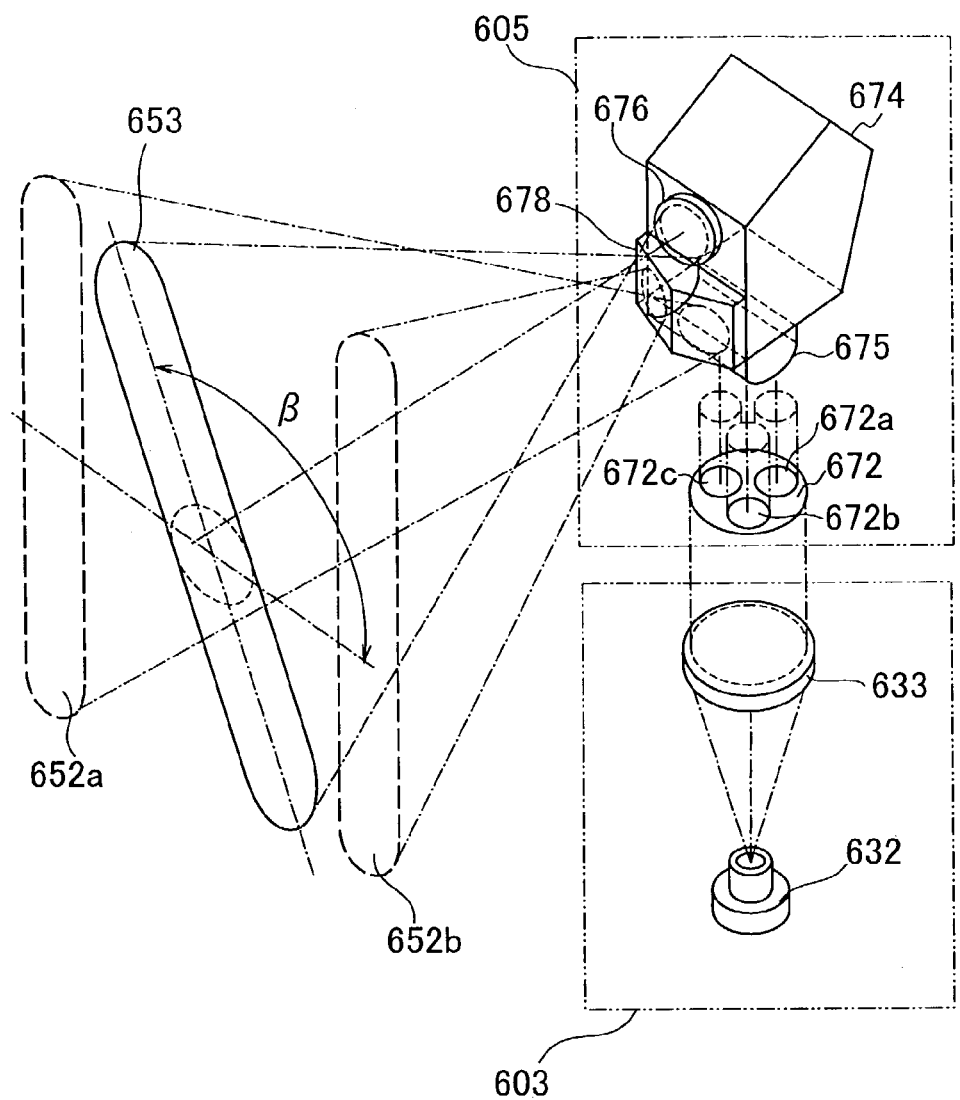
FIG. 45 is an exploded perspective view of still another embodiment of the laser light projector and the rotary unit that rotationally emit three fan-shaped laser beams.
Figure 46:
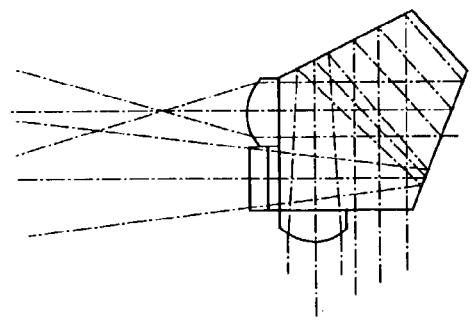
FIG. 46 is a side view showing an optical path in a pentaprism.
Figure 47:
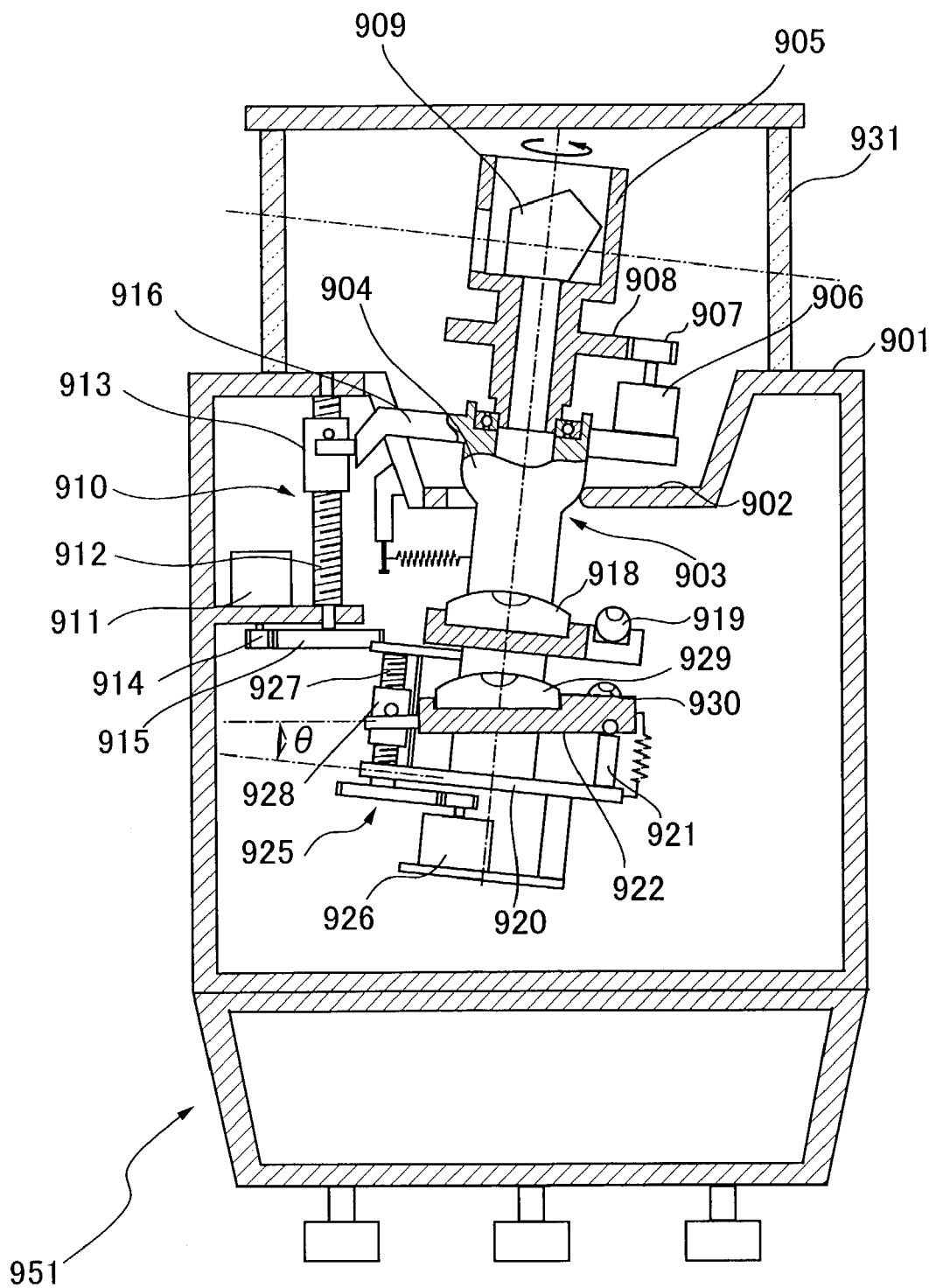
FIG. 47 is a schematic diagram showing a prior art position determining apparatus.

With reference to FIGS. 45 and 46, described below will be additional varied or modified embodiments of the laser illuminator and the rotary unit of the rotary laser apparatus that emits the fan-shaped laser beams patterned as in FIG. 42C. A laser projector 603 of this embodiment includes a laser illuminator 632 and a collimator lens 633. A rotary unit 605 of this embodiment has a shield mask 672 having three apertures 672a, 672b and 672c, a pentaprism 674 deflecting laser light that has passed the mask 672, cylindrical lenses 675 and 676 attached to the pentaprism 674 to spread beam into diverging fan-like shape, and a wedge prism 678 deflecting and collimating laser beam from the pentaprism 674.

Laser light emitted from the laser illuminator 632 is collimated by the collimator lens 633. The laser light transmitted through the collimator lens 633 falls on the shield mask 672 in the rotary unit 605. The laser beam, after passing the aperture 672a in the mask 672, falls on the pentaprism 674 and is deflected therein. In FIG. 46, the laser beam from the aperture 672a directly falls on the bottom of the pentaprism 674, which deflects the beam by 90° to let it exit from its vertical face. The laser light falls on the cylindrical lens 676 attached to the vertical face of the pentaprism 674, and it is spread into fan-shaped beam 653 which meets the horizontal plane at a predetermined inclination angle. On the other hand, the laser light that passes the aperture 672b and 672c falls on the cylindrical lens 675 attached to the bottom of the pentaprism 674, and the resultant separate laser beams are spread into diverging fan-like shape and then deflected by 90° in the pentaprism 674. The laser beams are directed to the wedge prism 678 that is attached to a lower portion of the cylindrical lens 676 mounted on a vertical face of the pentaprism 674, and then horizontally deflected, and thus, fan-shaped beams 652a and 652b are projected.

In this situation, the laser beams are respectively reflected twice in the pentaprism 674, and angles at which the laser beams are deflected simply depend upon a deflection angle in transmission through the pentaprism 674. Thus, directions of the emergent fan-shaped beams 653, 652b and 652a are not influenced by maladjustment between the laser projector 603 and the rotary unit 605. In some application, for the purpose of blocking light other than the laser beams emitted from the laser illuminator 632 and entering the collimator lens 633, a shield mask (not shown) may be provided between the laser illuminator 632 and the collimator lens 633.

(4.2) Other Variations and Modifications of the Position Determining Apparatus

Various embodiments of the position determining apparatus have been described, emphasizing specific examples including the rotary laser apparatuses that respectively emit two fan-shaped laser beams intersecting each other in and outside the horizontal reference plane, the rotary laser apparatus that emits three or more fan-shaped laser beams, the rotary laser apparatus that emits two fan-shaped laser beams polarized differently, the rotary laser apparatus that emits laser beams modulated to have different frequencies or wavelengths, respectively, the optical sensor having a single light receiving section, the optical sensor that has more than one light receiving sections located vertically or horizontally, the optical sensor capable of distinguishing differently polarized fan-shaped beams, and an optical sensor capable of distinguishing fan-shaped beams modulated to have different frequencies or wavelengths, respectively. Any person having ordinary skills in the art would envision appropriately combined revisions of the aforementioned embodiments of the position determining apparatus without departing true scope of the invention as implied in the appended claims.

In accordance with the present invention, a rotary laser apparatus may be combined with an optical sensor incorporated in a position determining apparatus, or rather, it may be used independently or may be combined with a prior art optical sensor.

What is claimed is:

1. An apparatus for determining positions, comprising:
  (a) a rotary laser apparatus for emitting two or more fan-shaped laser beams, said rotary laser apparatus including a laser projector and a rotary unit rotating relative to said laser projector, wherein:
    said laser projector has:
      (1) a first laser illuminator for emitting a first linearly polarized laser beam;
      (2) a second laser illuminator for emitting a second linearly polarized laser beam;
      (3) a first polarized beam splitter for directing the laser beams emitted from said first laser illuminator and said second laser illuminator in the same direction; and
      (4) a first one-quarter wave plate for converting said first and second linearly polarized laser beams from said first polarized beam splitter into circularly polarized laser beams; and said rotary unit has:
      (1) a second one-quarter wave plate for converting the circularly polarized laser beams from said first one-quarter wave plate into linearly polarized laser beams;
      (2) a second polarized beam splitter for splitting the linearly polarized laser beams from said second one-quarter wave plate;
      (3) a third one-quarter wave plate for converting the laser beams split and reflected by said second polarized beam splitter into circularly polarized laser beam;
      (4) a first cylinder mirror for converting the circularly polarized laser beam from said third one-quarter wave plate into a first fan-shaped laser beam and reflecting back and emitting said fan-shaped laser beam through said third one-quarter wave plate and said second polarized beam splitter;
      (5) a fourth one-quarter wave plate for converting laser beams transmitted through said second polarized beam splitter into a circularly polarized laser beam; and
      (6) a second cylinder mirror for converting said circularly polarized laser beam from said fourth one-quarter wave plate into a second fan-shaped laser beam and reflecting back and emitting said second fan-shaped laser beam through said fourth one-quarter wave plate and said second polarized beam splitter; and
(b) optical sensor means for receiving the fan-shaped laser beams to determine a position.

2. An apparatus for determining positions according to claim 1, wherein said rotary unit further includes a deflecting prism between said third one-quarter wave plate and said first cylinder mirror and said rotary laser apparatus emits three fan-shaped laser beams.

3. An apparatus for determining positions according to claim 1, wherein said fist and second cylinder mirrors are oriented so that the first and second fan-shaped laser beams emitted from said rotary laser apparatus are inclined relative to the horizontal plane respectively.

4. An apparatus for determining positions according to claim 1, wherein said rotary laser apparatus emits fan-shaped laser beams of different polarized direction by 90°.

5. An apparatus for determining positions according to claim 1, wherein said rotary laser apparatus emits fan-shaped laser beams modulated into different frequencies to distinguish these fan-shaped laser beams.

6. An apparatus for determining positions according to claims 1, wherein said rotary laser apparatus emits fan-shaped laser beams of different wavelengths to distinguish the fan-shaped laser beams.

7. An apparatus for determining positions according to claim 1, wherein said optical sensor further includes a GPS (global positioning system) position sensor that detects the relative position of said optical sensor to said rotary laser apparatus.

8. An apparatus for determining positions, comprising:
(a) a rotary laser apparatus for emitting two or more fan-shaped laser beams, said rotary laser apparatus including a laser projector and a rotary unit rotating relative to said laser projector, wherein
  said laser projector has:
   (1) a laser illuminator; and
   (2) collimator lens means for collimating the laser beam emitted from said laser illuminator; and
  said rotary unit has:
   (1) beam expanders for receiving the laser beam collimated by said collimator lens;
   (2) cylindrical lenses for converting the laser beams from said beam expanders into fan-shaped laser beams; and
   (3) mirrors for reflecting the fan-shaped laser beams and emitting the fan-shaped laser beams from said rotary laser apparatus; and
(b) optical sensor means for receiving the fan-shaped laser beams to determine a position.

9. An apparatus for determining positions, comprising:
(a) a rotary laser apparatus for emitting two or more fan-shaped laser beams, said rotary laser apparatus including a laser projector and a rotary unit rotating relative to said laser projector, wherein:
  said laser projector has:
   (1) a laser illuminator and
   (2) a collimator lens for collimating the laser beam emitted from said laser illuminator; and
  said rotary unit has:
   (1) a shield mask having at least three apertures;
   (2) a first cylindrical lens for converting the laser beams passing through at least two of said apertures into fan-shaped laser beams;
   (3) a wedge prism for deflecting the fan-shaped laser beams from said first cylindrical lens and emitting the fan-shaped laser beams from said rotary laser apparatus; and
   (4) a second cylindrical lens for converting the laser beams passing through at least one of said apertures into fan-shaped laser beams and emitting the fan-shaped laser beams from said rotary laser apparatus; and
(b) optical sensor means for receiving the fan-shaped laser beams to determine a position.

* * * * *